(12) United States Patent
Gabai et al.

(10) Patent No.: US 6,356,867 B1
(45) Date of Patent: Mar. 12, 2002

(54) SCRIPT DEVELOPMENT SYSTEMS AND METHODS USEFUL THEREFOR

(75) Inventors: Oz Gabai; Jacob Gabai, both of Tel Aviv; Nimrod Sandlerman, Ramat Gan, all of (IL)

(73) Assignee: Creator Ltd., Givat Shmuel (IL)

( * ) Notice: Subject to any disclaimer, the term of this patent is extended or adjusted under 35 U.S.C. 154(b) by 0 days.

(21) Appl. No.: 09/225,136

(22) Filed: Jan. 4, 1999

(30) Foreign Application Priority Data

Nov. 26, 1998 (IL) .................................................. 127293

(51) Int. Cl.[7] .............................................. G10L 11/00
(52) U.S. Cl. .......................... 704/27; 704/278; 704/235; 704/260; 704/27
(58) Field of Search ................................. 704/235, 260, 704/270, 272, 270.1, 275, 276, 278; 345/302, 333; 318/568.11; 40/457; 707/3

(56) References Cited

U.S. PATENT DOCUMENTS

| | | | | | |
|---|---|---|---|---|---|
| 3,767,901 A | * | 10/1973 | Black et al. | ........... | 318/568.11 |
| 3,898,438 A | * | 8/1975 | Nater et al. | ................. | 700/264 |
| 4,177,584 A | * | 12/1979 | Villa | ........................... | 40/457 |
| 5,111,409 A | * | 5/1992 | Gasper et al. | .............. | 704/260 |
| 5,278,943 A | * | 1/1994 | Gasper et al. | .............. | 704/260 |
| 5,724,605 A | * | 3/1998 | Wissner | ...................... | 345/302 |
| 5,752,880 A | | 5/1998 | Gabai et al. | ................... | 463/1 |
| 5,873,080 A | * | 2/1999 | Coden et al. | ................... | 707/3 |
| 5,903,892 A | * | 5/1999 | Hoffert et al. | ................ | 707/10 |
| 5,983,190 A | * | 11/1999 | Trower, II et al. | .......... | 704/276 |
| 6,128,010 A | * | 10/2000 | Baxter et al. | ............... | 345/333 |
| 6,160,986 A | | 12/2000 | Gabai et al. | ................ | 434/308 |

FOREIGN PATENT DOCUMENTS

WO    WO 97/18871    5/1998

OTHER PUBLICATIONS

U.S. Patent Application No.: 09/062,500, filed Apr. 17, 1998.
U.S. Patent Application No.: 09/081,889 filed May 20, 1998.
U.S. Patent Application No.: 09/062,502, filed Apr. 17, 1998.
U.S. Patent Application No.: 09/062,547, filed Apr. 17, 1998.
U.S. Patent Application No.: 09/062,499, filed Apr. 17, 1998.
U.S. Patent Application No.: 09/062,579, filed Apr. 17, 1998.
http://www.macromedia.com/software/director/productinfo/whatis.html, "shockware product description", p. 1, Nov. 19, 1998.
http://www.legomeda.com/creator/creatorscreenshots−2.asp, "A screen shot print−out of Lego Creator", p. 1, Jun. 23, 1999.

* cited by examiner

Primary Examiner—David D. Knepper
(74) Attorney, Agent, or Firm—Abelman, Frayne & Schwab

(57) ABSTRACT

A system for generating scripts having verbal content. The system includes a computer having a user input receiver operative to receive a user's definition of a script for at least one computer-controllable animated physical figure. The script includes a plurality of interconnected script elements each representing an action performable by the computer-controllable animated figure. The script comprises at least one verbal script element representing a verbal action performable by the computer-controllable animated figure. A graphics interface is operative to generate a pictorial image of the script as the script is generated by the user. The graphics interface including a drag and drop facility and a flowchart generating facility.

18 Claims, 56 Drawing Sheets

Microfiche Appendix Included
(7 Microfiche, 686 Pages)

To ListenAndSense2
in FIG. 30B

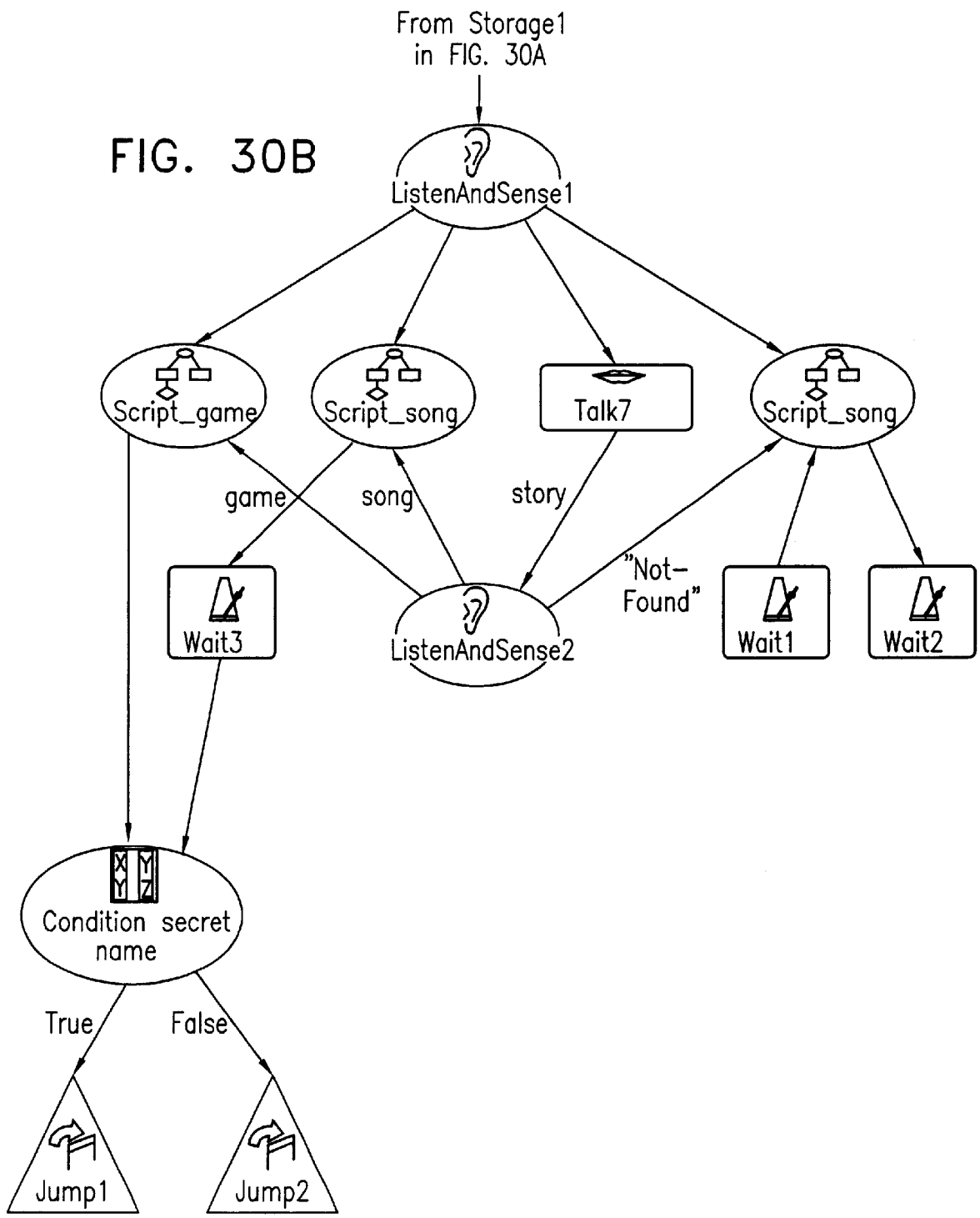

SCRIPT DEVELOPMENT SYSTEMS AND METHODS USEFUL THEREFOR

REFERENCE TO A MICROFICHE APPENDIX

This specification includes a microfiche appendix including 7 microfiche and 686 frames.

FIELD OF THE INVENTION

The present invention relates to apparatus and methods for generating verbal content and for controlling toys and other manipulable objects.

BACKGROUND OF THE INVENTION

Technologies and systems related to the subject matter of the present application are described in the following documents:

Published PCT Application No. WO97/18871 (PCT/IL96/00157); and in U.S. patent application Ser. Nos. 09/062,500 and 09/081,255, both to Gabai et. al., and U.S. Pat. No. 5,752,880 to Gabai et. al.;

"Using the Microsoft Agent Character Editor", is available at following URL: http://premium.microsoft.com/msdn/library/sdkdoc/msagnet/deschar2zip__8r8x.htm "Designing characters for Microsoft Agent", is available at following URL: http://premium.microsoft.com/msdn/library/sdkdoc/msagnet/deschar2zip__67zl.htm Director, by Macromedia, is described at the following URL: http://www.macromedia.com/software/director/productinfo/whatis.html Creator, by LEGO Media International is described at the following URL: http://www.legomedia.com/creator/creatorscreenshots2.asp UniTools by Unitel Inc. is available at the following URL: http://unitel.inc.com/website/unitools.htm The disclosures of all publications mentioned in the specification and of the publications cited therein are hereby incorporated by reference.

SUMMARY OF THE INVENTION

The present invention seeks to provide apparatus and methods for generating scripts having verbal contents.

There is thus provided in accordance with a preferred embodiment of the present invention a system for generating scripts having verbal content, the system including a computer having a user input receiver operative to receive a user's definition of a script for at least one computer-controllable animated figure, the script including a plurality of interconnected script elements each representing an action performable by the computer-controllable animated figure, the script including at least one verbal script element representing a verbal action performable by the computer-controllable animated figure, and a graphics interface operative to generate a pictorial image of the script as the script is generated by the user, the graphics interface including a drag and drop facility operative to drag and drop script elements and a flowchart generating facility, the facilities being operative to provide a flowchart of script elements including illustrated connections, having respective illustrated directions, interconnecting illustrations of each dragged and dropped script element, and a verbal output generator controlled by the user's definition of the script and operative to generate verbal output as defined in the script.

Further in accordance with a preferred embodiment of the present invention the animated figure includes a virtual animated figure on a computer screen.

Still further in accordance with a preferred embodiment of the present invention the animated figure includes a physical animated figure.

Additionally in accordance with a preferred embodiment of the present invention the physical animated figure is wirelessly connected to the computer.

There is further provided in accordance with another preferred embodiment of the present invention a script definition method including accepting a user's definition of a speech recognition script element including a designation of a plurality of keywords to be recognized, and providing a flowchart generation user interface operative to facilitate generation of a flowchart by a user representing a script defined by the user, the flowchart including a conditional flowchart element representing the speech recognition script element, the providing step including prompting the user to associate each branch of the conditional flowchart element with one of the plurality of keywords.

There is also provided in accordance with another preferred embodiment of the present invention a method for generating a computerized script including a speech recognition script element, the method including generating a speech recognition script element including selecting n keywords to be recognized, and generating a script junction having at least n+1 branches corresponding respectively to the n keywords to be recognized and to a "not found" option which is followed if none of the n keywords are recognized in a user's utterance.

Further in accordance with a preferred embodiment of the present invention the method includes automatically running the script.

There is also provided in accordance with another preferred embodiment of the present invention a script generating method including providing a flowchart generation user interface operative to facilitate generation of a flowchart by a user representing a script defined by the user, the script including a plurality of script elements represented respectively by a plurality of flowchart elements, and using a computer to run the script defined by the user including highlighting, for the user, the flowchart element corresponding to the script element currently being executed.

Further in accordance with a preferred embodiment of the present invention the script is defined for an animated figure capable, in conjunction with the computer, of executing each of the script elements and wherein the using step includes activating the animated figure by running at least a portion of the script on the computer.

Still further in accordance with a preferred embodiment of the present invention the computer includes a simulator operative to simulate at least a portion of the script without utilizing the animated figure.

Additionally in accordance with a preferred embodiment of the present invention the computer includes a computer speaker and wherein the simulator is operative to simulate speech of the animated figure by activating the computer speaker.

Further in accordance with a preferred embodiment of the present invention the computer includes a computer microphone and wherein the simulator is operative to simulate reception of speech by the animated figure by activating the computer microphone.

Still further in accordance with a preferred embodiment of the present invention the computer includes a computer screen and a stored representation of the figure's performance of individual physical-action script elements and wherein the simulator is operative to simulate physical action of the animated figure by displaying, on the computer screen, an image of at least a portion of the figure performing the physical action.

Additionally in accordance with a preferred embodiment of the present invention the system also includes an Internet searcher.

Further in accordance with a preferred embodiment of the present invention the computer includes at least one input device and wherein the simulator is operative to simulate sensing activities of the animated figure by receiving mock sensory inputs via the input device.

There is also provided in accordance with another preferred embodiment of the present invention a computerized script generating system including a user input receiver operative to receive a user's definition of a script including a plurality of interconnected script elements each representing an action performable by a computer-controllable device, and a script implementer receiving the user's definition of the script and operative to generate an integrated command, for transmission to the device, which command combines at least two adjacent script elements.

Further in accordance with a preferred embodiment of the present invention the script implementer is operative, for at least one pair of first and second script elements, to generate a single command, for transmission to the device, when the first and second script elements occur adjacently in the script and to generate a separate command for each of the first and second script elements when the first and second script elements occur separately rather than adjacently in the script.

There is also provided in accordance with another preferred embodiment of the present invention a system for generating scripts having verbal content, the system including a computer having a user input receiver operative to receive a user's definition of a script for at least one computer-controllable physical animated figure, the script including a plurality of interconnected script elements each representing an action performable by the computer-controllable animated figure, the script including at least one verbal script element representing a verbal action performable by the computer-controllable animated figure, and a verbal output generator controlled by the user's definition of the script and operative to generate verbal output as defined in the script, wherein the computer includes a simulator operative to simulate at least a portion of the script without utilizing the animated figure.

Further in accordance with a preferred embodiment of the present invention the system also includes a computerized scheduler operative to control the animated figure according to a user-determined schedule received by the scheduler.

Still further in accordance with a preferred embodiment of the present invention the system also includes an e-mail function.

Additionally in accordance with a preferred embodiment of the present invention the e-mail function includes apparatus for reading e-mail and apparatus for sending e-mail.

Further in accordance with a preferred embodiment of the present invention the system is operative to generate a computer executable file operative to manipulate the toy without recourse to generation of scripts.

There is also provided in accordance with another preferred embodiment of the present invention a toy content development system for developing content for interactive computerized toys, the development system including for each of at least one computerized toy, a preprogrammed library of software functions which are executable by the toys, and a computing environment within which a user of the system can program at least one of the computerized toys by generating at least one combination of software functions in the library.

Further in accordance with a preferred embodiment of the present invention the combination includes a logical combination.

There is additionally provided in accordance with another preferred embodiment of the present invention a visual toy development system providing a visual environment for developing toy content, the system including a visual computing environment within which a user of the system can visually program at least one computerized toy by generating at least one combination of software functions, the environment being operative to provide a library of visual software functions which are executable by at least one toy.

Further in accordance with a preferred embodiment of the present invention the environment includes a preprogrammed library of visual software functions.

There is also provided in accordance with another preferred embodiment of the present invention a verbal interaction development system providing a visual environment for developing a verbal interaction, the system including a visual computing environment within which a user of the system can visually program a verbal interaction, the visual computing environment including a visual representation of at least one of a speech comprehension function and a speech generation function.

There is further provided in accordance with another preferred embodiment of the present invention a verbal interaction development system providing a visual environment for developing a verbal interaction, the system including a visual computing environment within which a user of the system can visually program a verbal interaction, the visual computing environment including a visual representation of at least one of a speech recognition function and a speech articulation function.

Further in accordance with a preferred embodiment of the present invention the visual computing environment is operative to accept a user's definition of at least one of the following logical structures: a decision tree, a flowchart, and a state diagram, and to generate a manipulable visual representation thereof, wherein the visual representation includes a simulation of performance, by the toy, of the combination of software functions generated by the user, the simulation including a traversal of at least one of the logical structures.

There is also provided in accordance with another preferred embodiment of the present invention a verbal interaction development system providing a visual environment for developing a verbal interaction, the system including a computing environment within which a user of the system can program a verbal interaction, the computing environment including a representation of at least one of a speech recognition function and a speech articulation function, the speech recognition function including a speech template generator operative to accept, for at least one speech input, a user's definition of a set of templates, to each of which the speech input is to be compared, and a template recognition probability evaluator operative to evaluate the probability of correct matching of at least one speech input to each of the templates in the set.

Further in accordance with a preferred embodiment of the present invention the system also includes a developed content simulator operative to generate, on a screen display, a simulation of a programmed computerized toy performing a plurality of software functions in accordance with the programming of the toy by the user, using the computing environment.

Still further in accordance with a preferred embodiment of the present invention the system also includes a user workstation serving the user which is located remotely relative to the preprogrammed library and the computing environment.

Additionally in accordance with a preferred embodiment of the present invention the remotely located user workstation is connected to the preprogrammed library and the computing environment via the Internet.

Further in accordance with a preferred embodiment of the present invention the remotely located user workstation includes an Internet browser.

Still further in accordance with a preferred embodiment of the present invention the apparatus is substantially as shown and described above.

Additionally in accordance with a preferred embodiment of the present invention the apparatus is substantially as illustrated in any of the drawings.

Further in accordance with a preferred embodiment of the present invention the method is substantially as shown and described above.

Still further in accordance with a preferred embodiment of the present invention the method is substantially as illustrated in any of the drawings.

Preferably, the stored representation includes a plurality of graphic representations of the figure performing a corresponding plurality of script elements.

BRIEF DESCRIPTION OF THE DRAWINGS AND APPENDICES

The present invention will be understood and appreciated from the following detailed description, taken in conjunction with the drawings and appendices in which.

Figure 1:
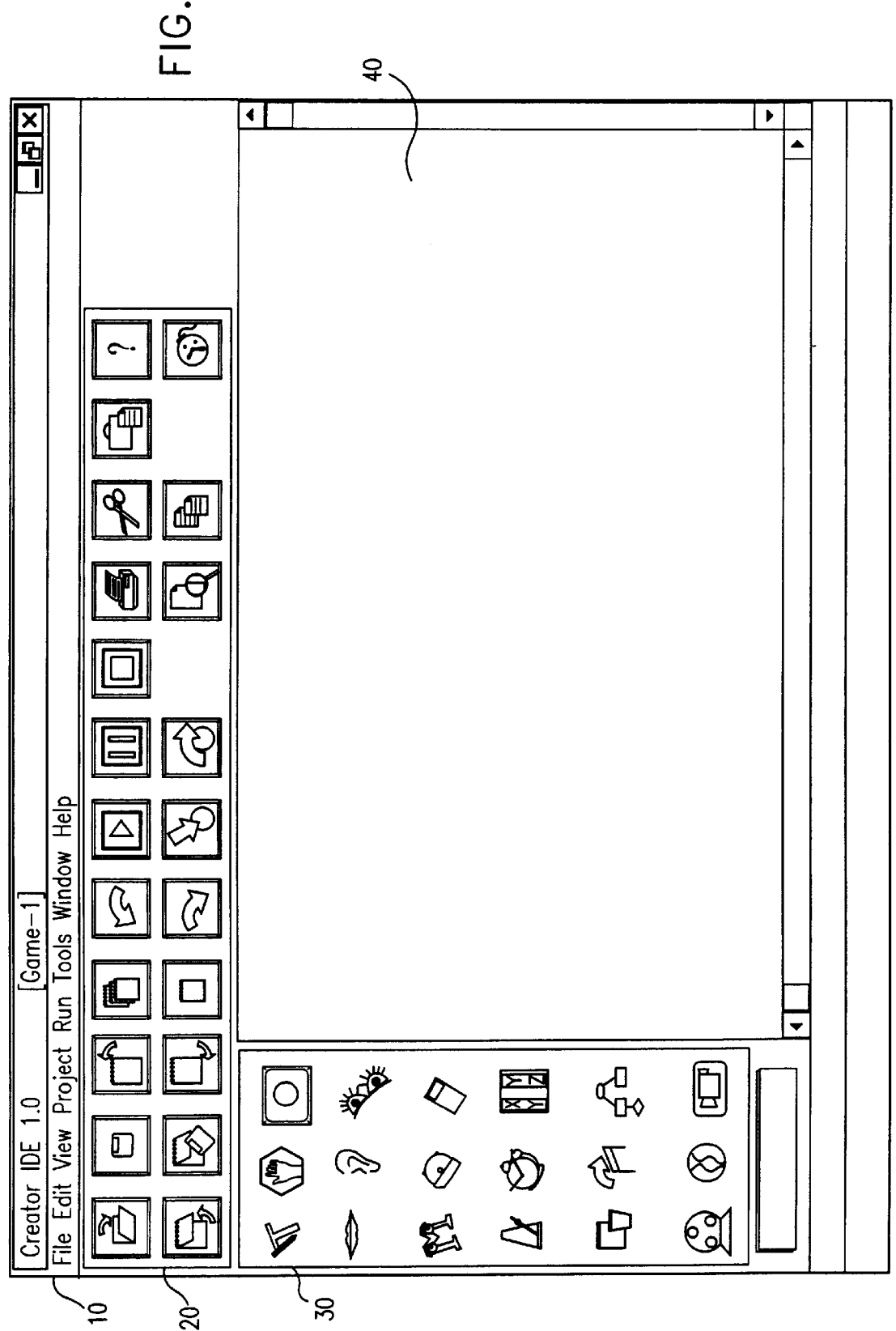
FIG. 1 is a screen display generated by an interactive script development system constructed and operative in accordance with a preferred embodiment of the present invention.
Figure 30A:
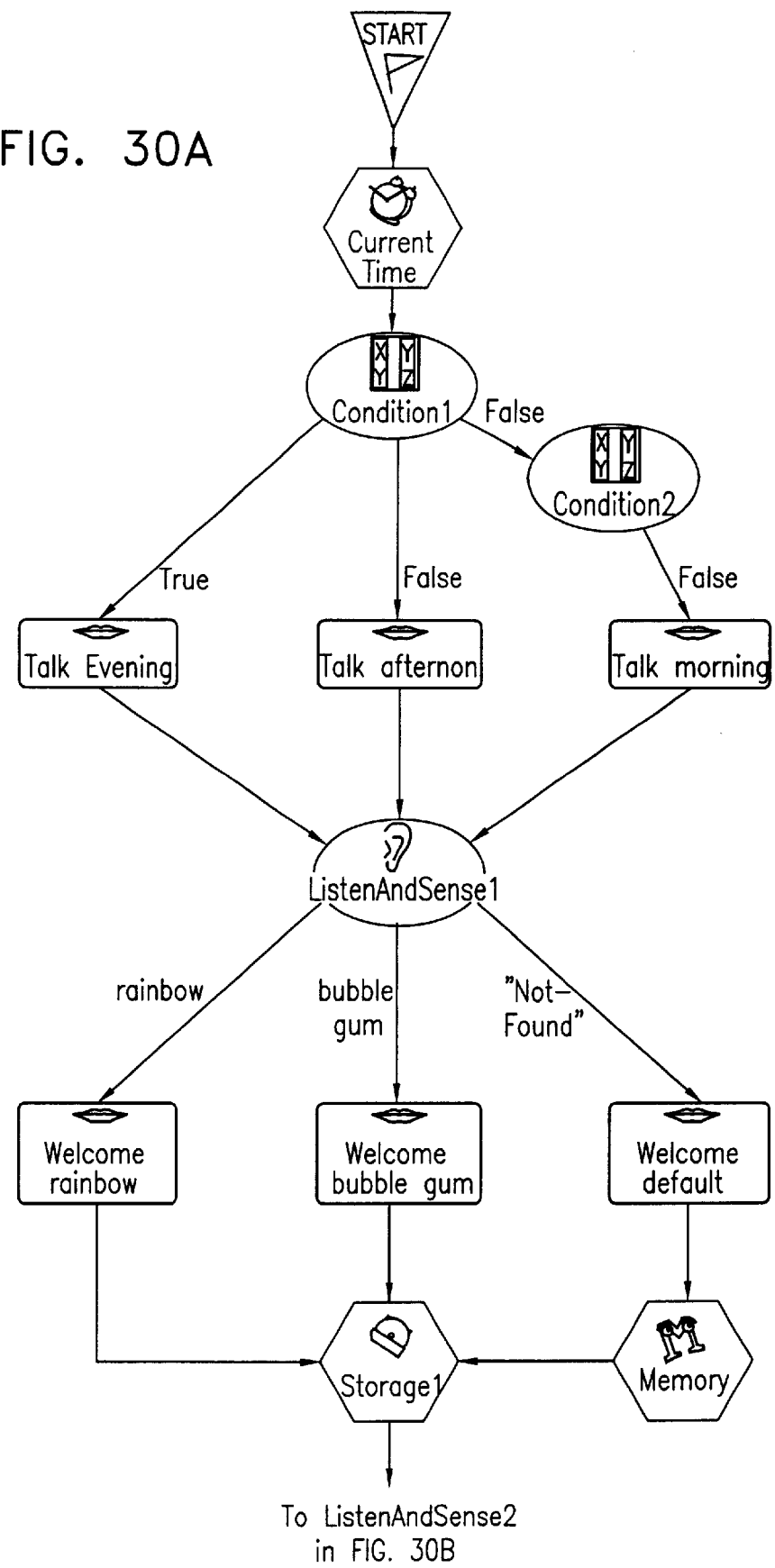
Figure 31A:
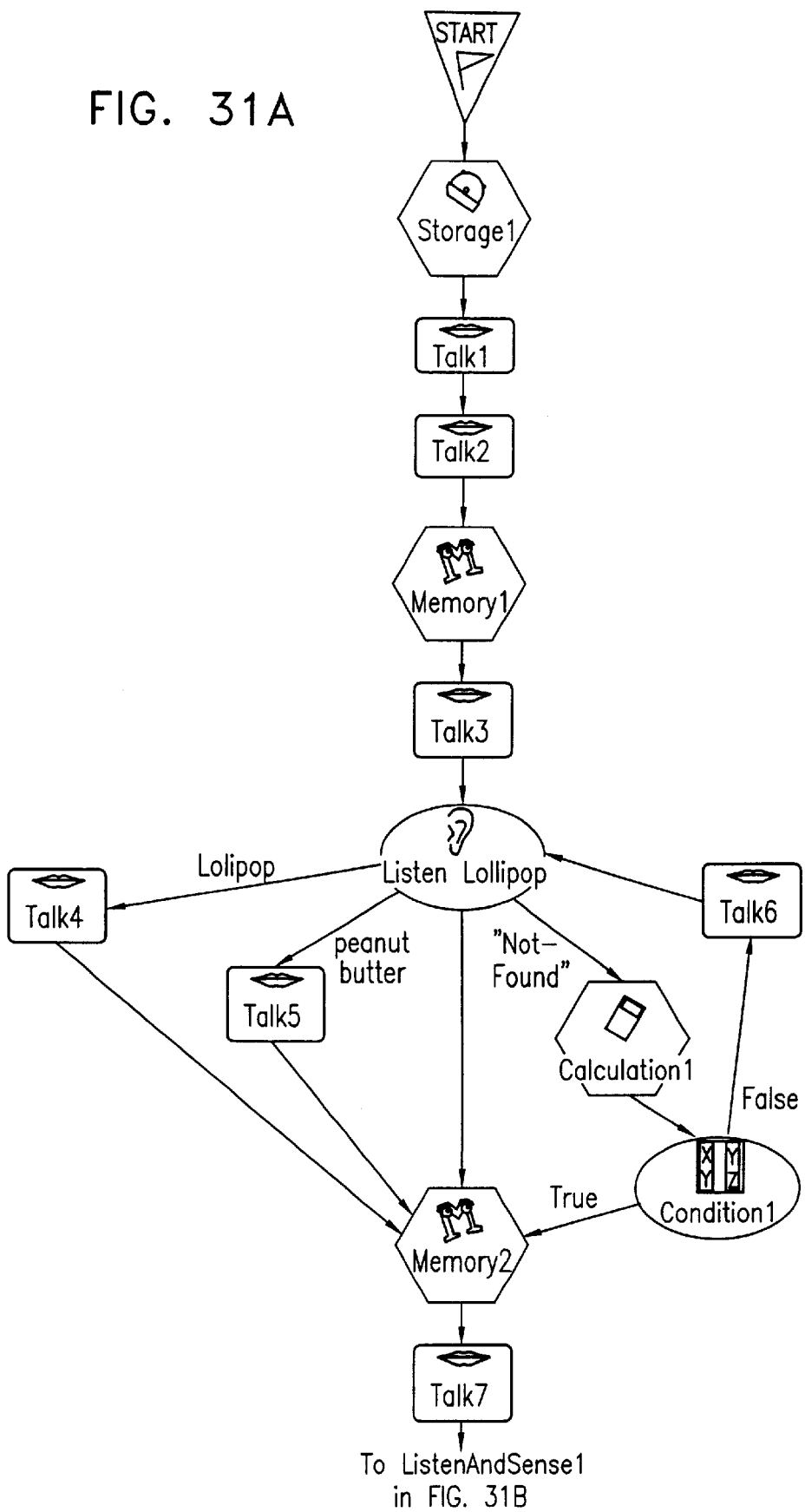
Figure 31B:
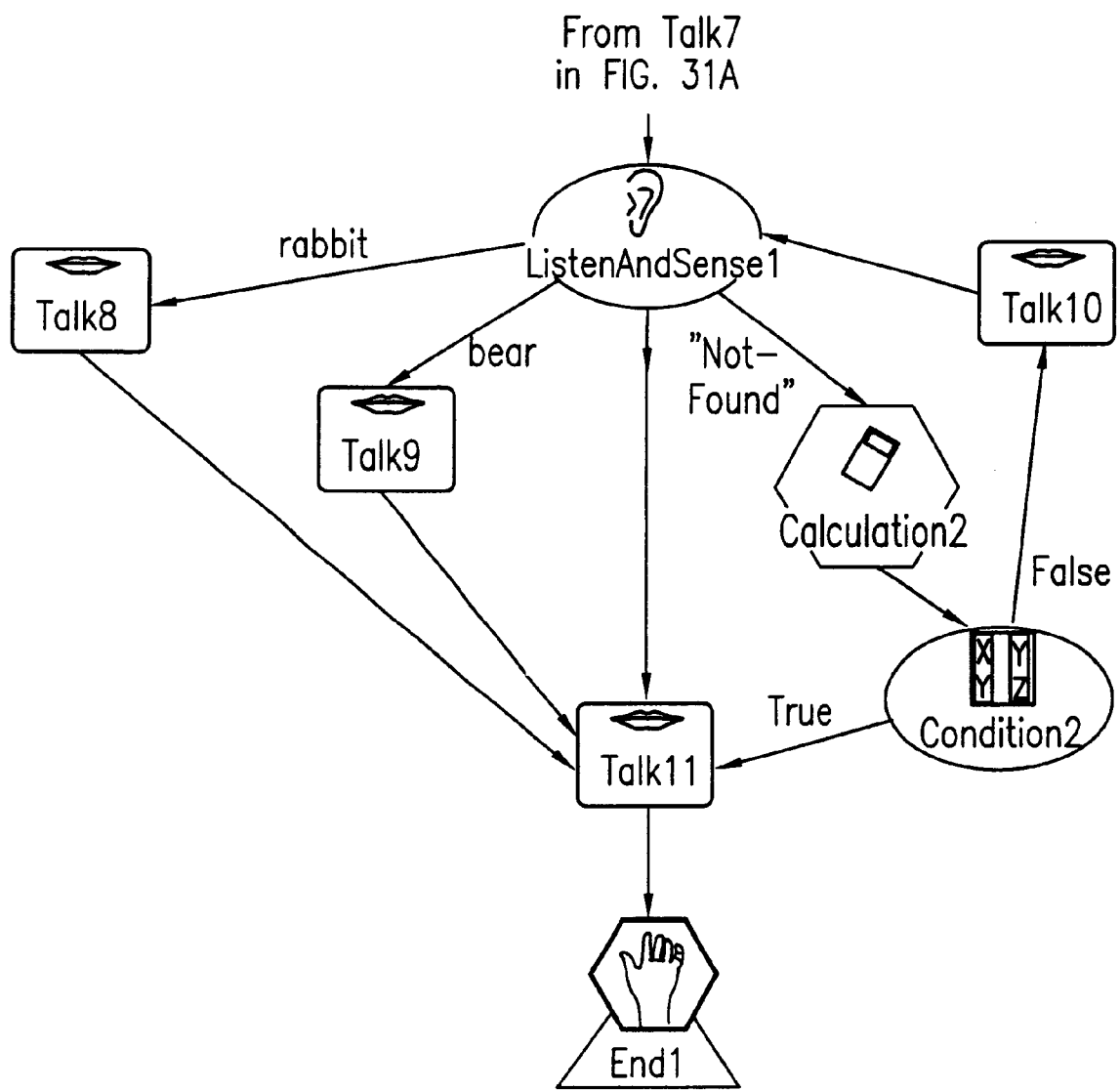
Figure 32A:
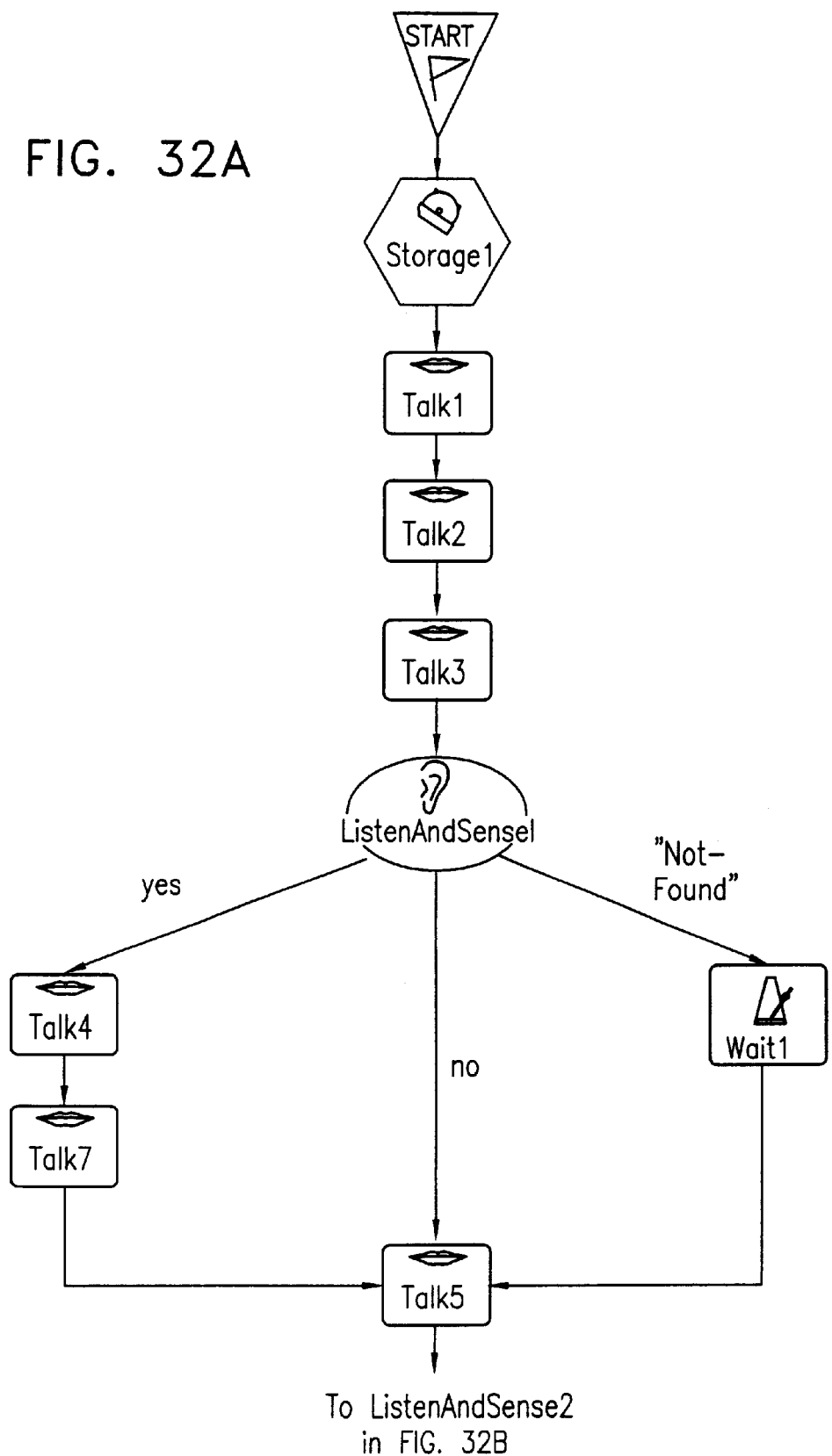
Figure 32B:
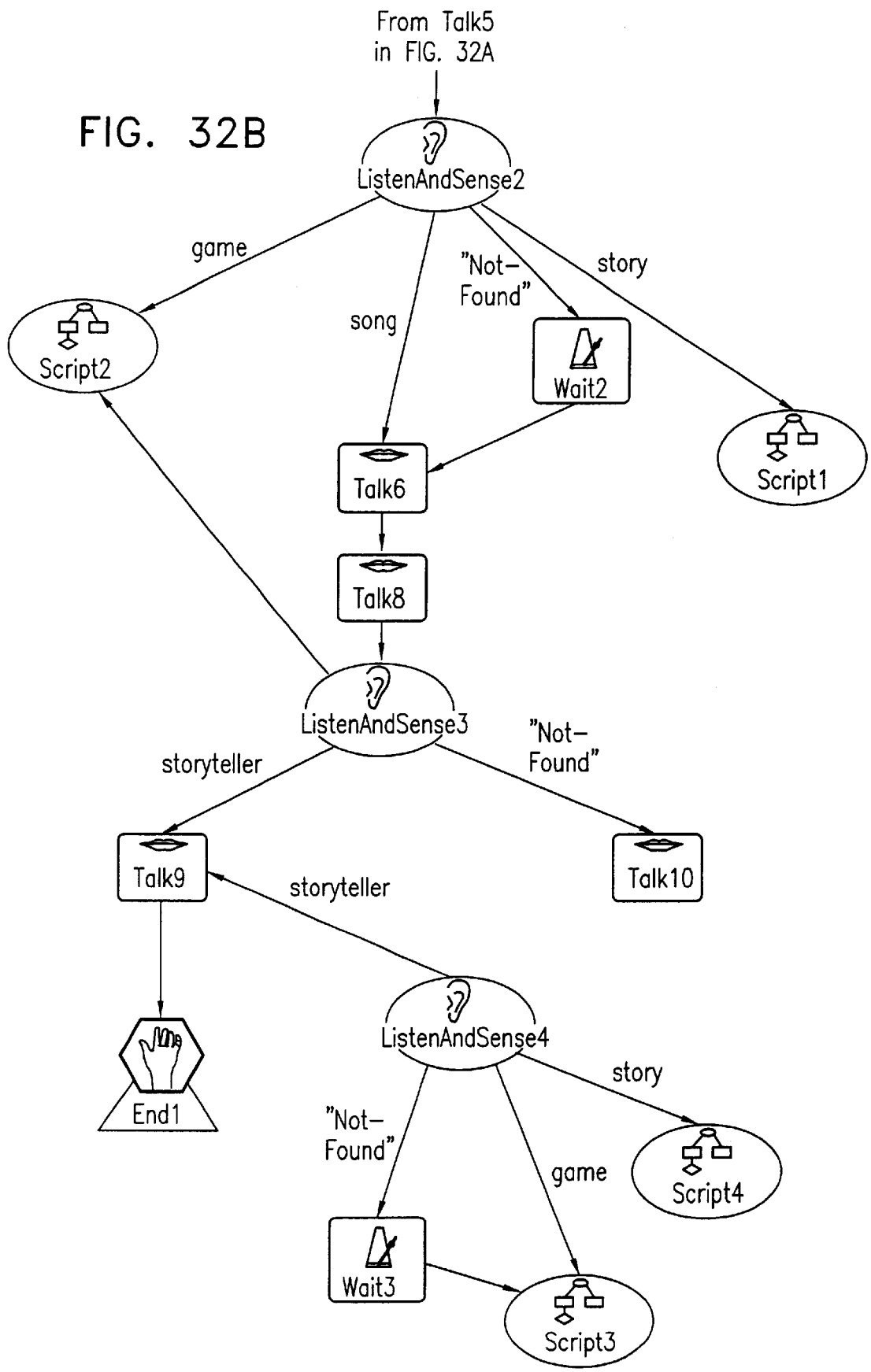
Figure 33A:
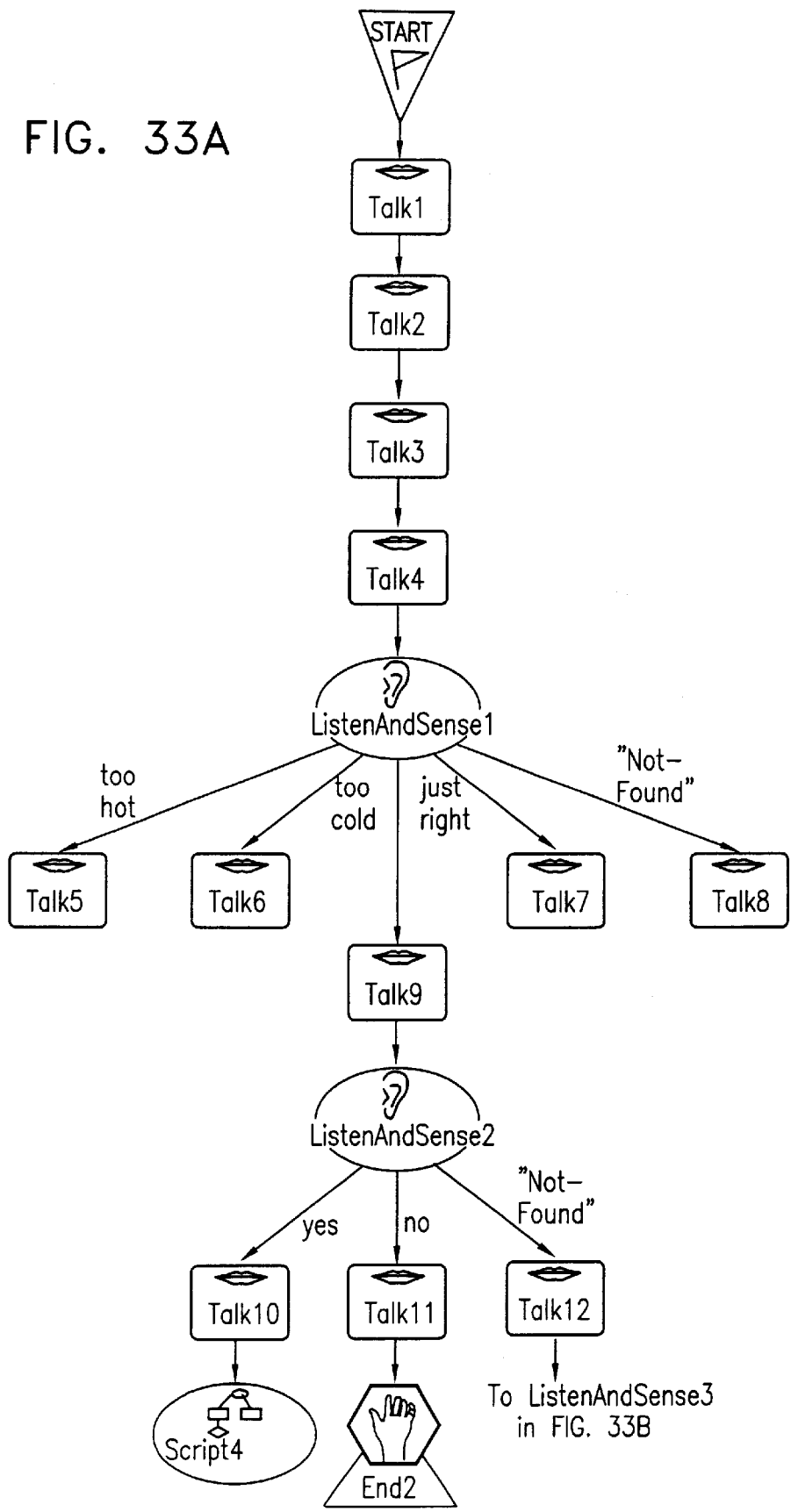
Figure 33B:
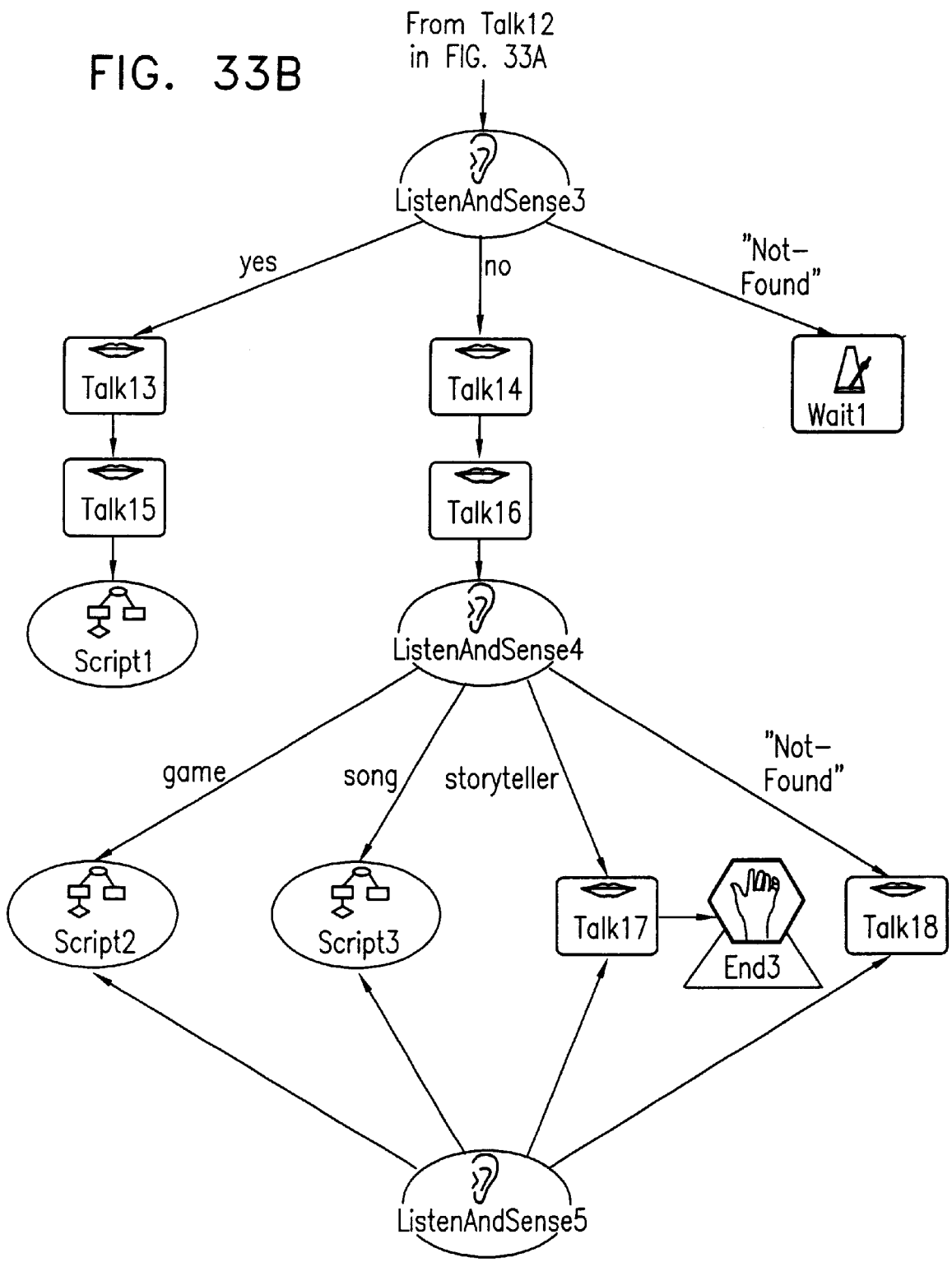
Figure 34:
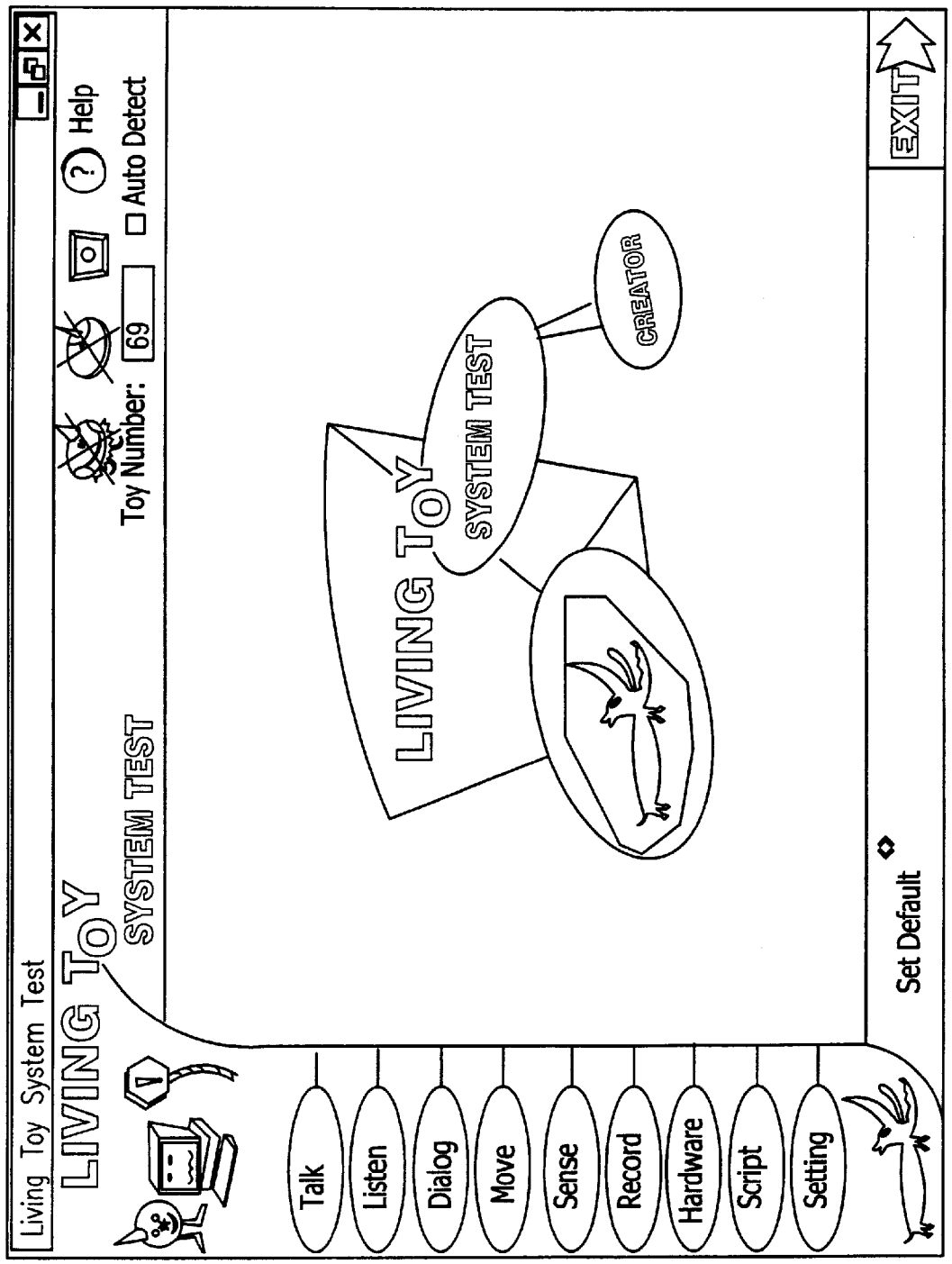
Figure 35:
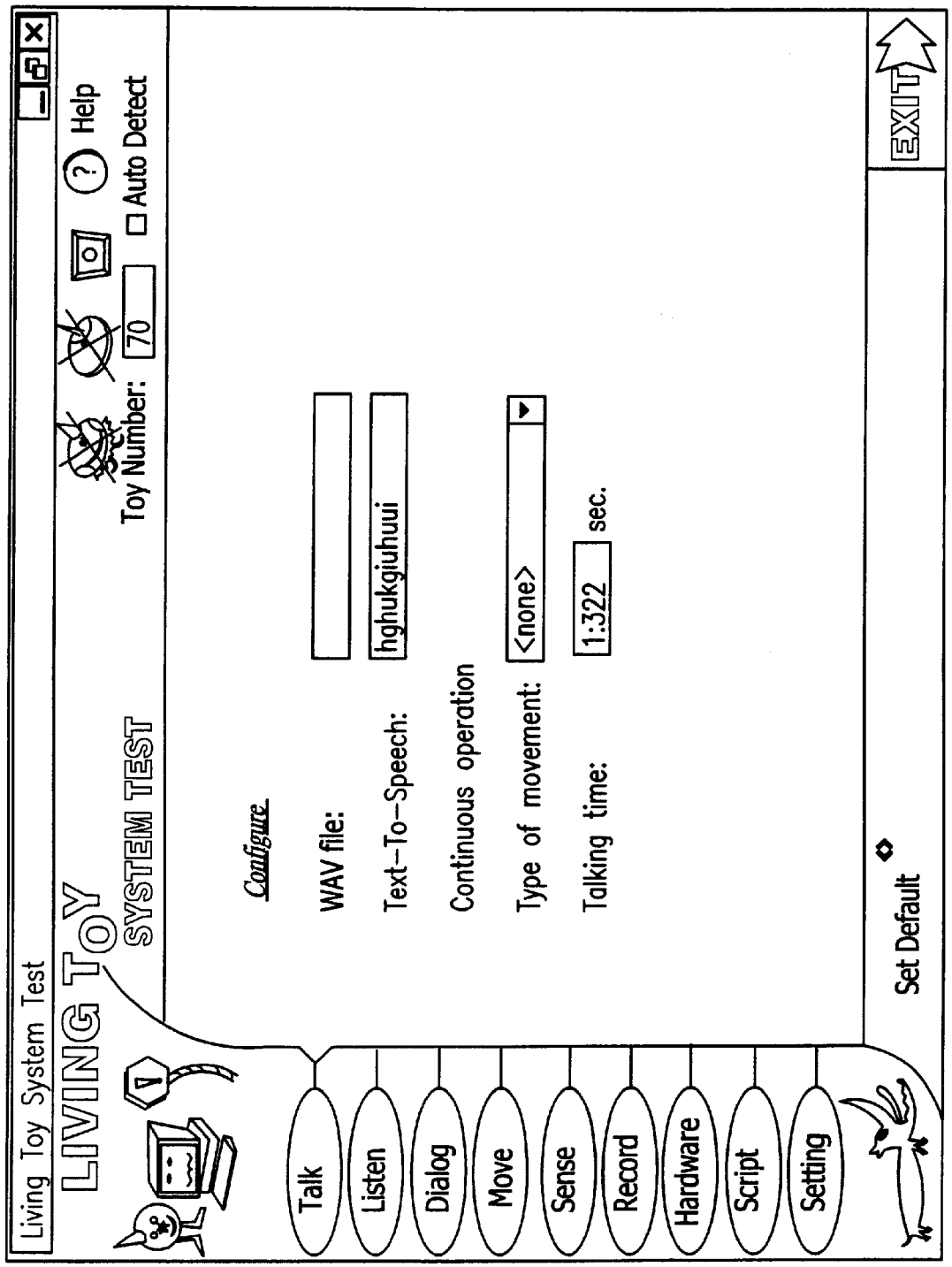
Figure 36:
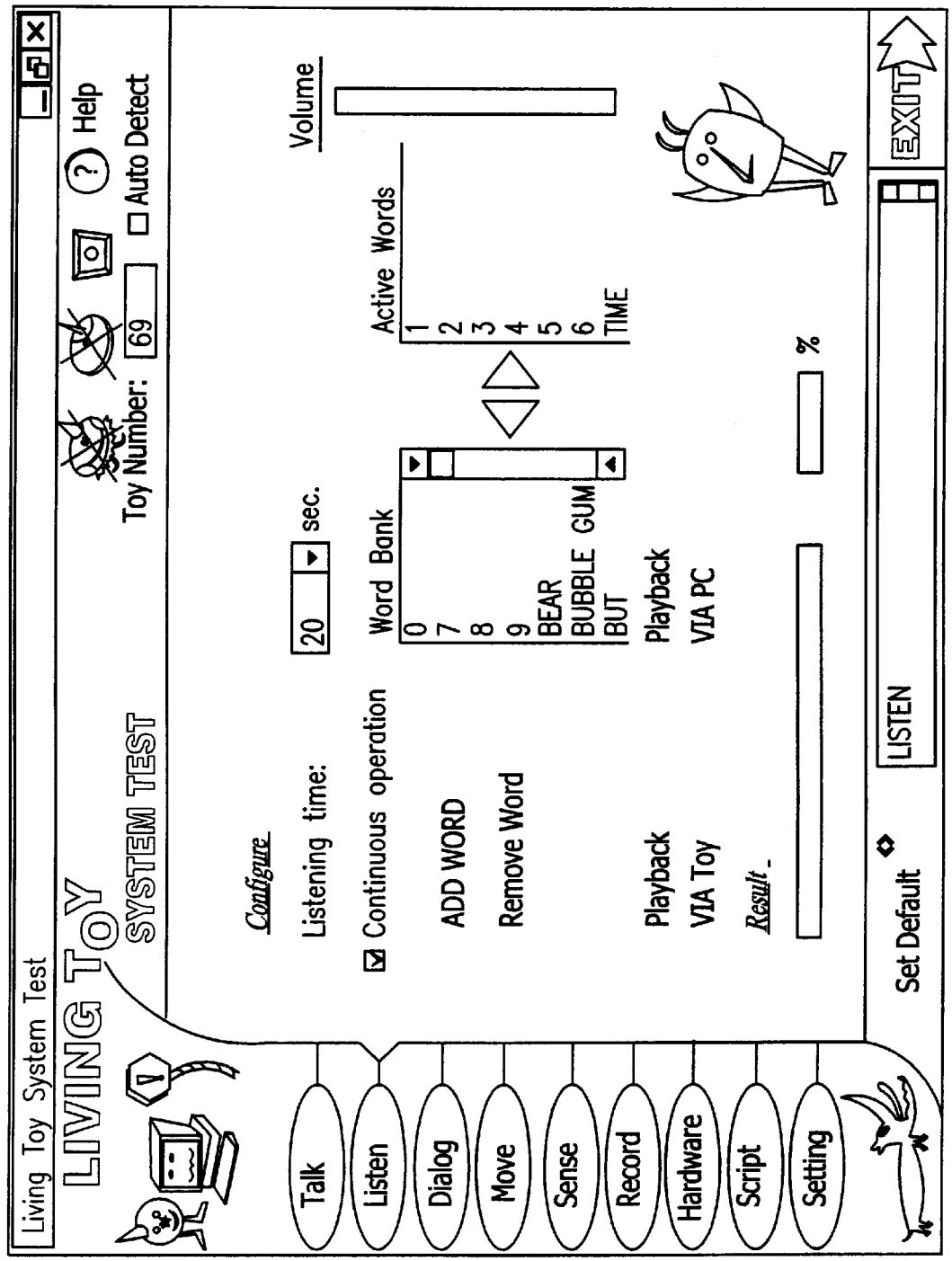
Figure 37:
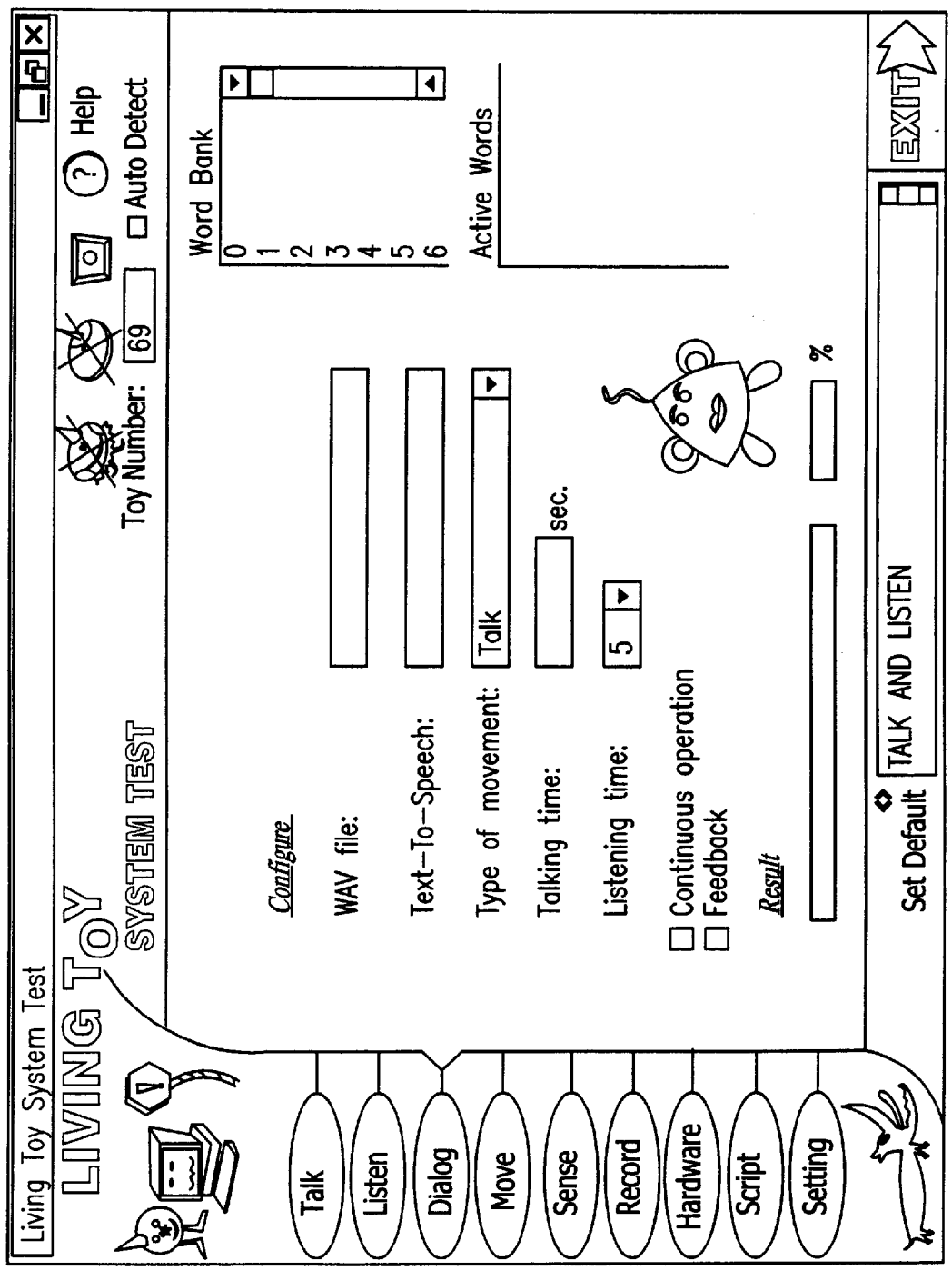
Figure 38:
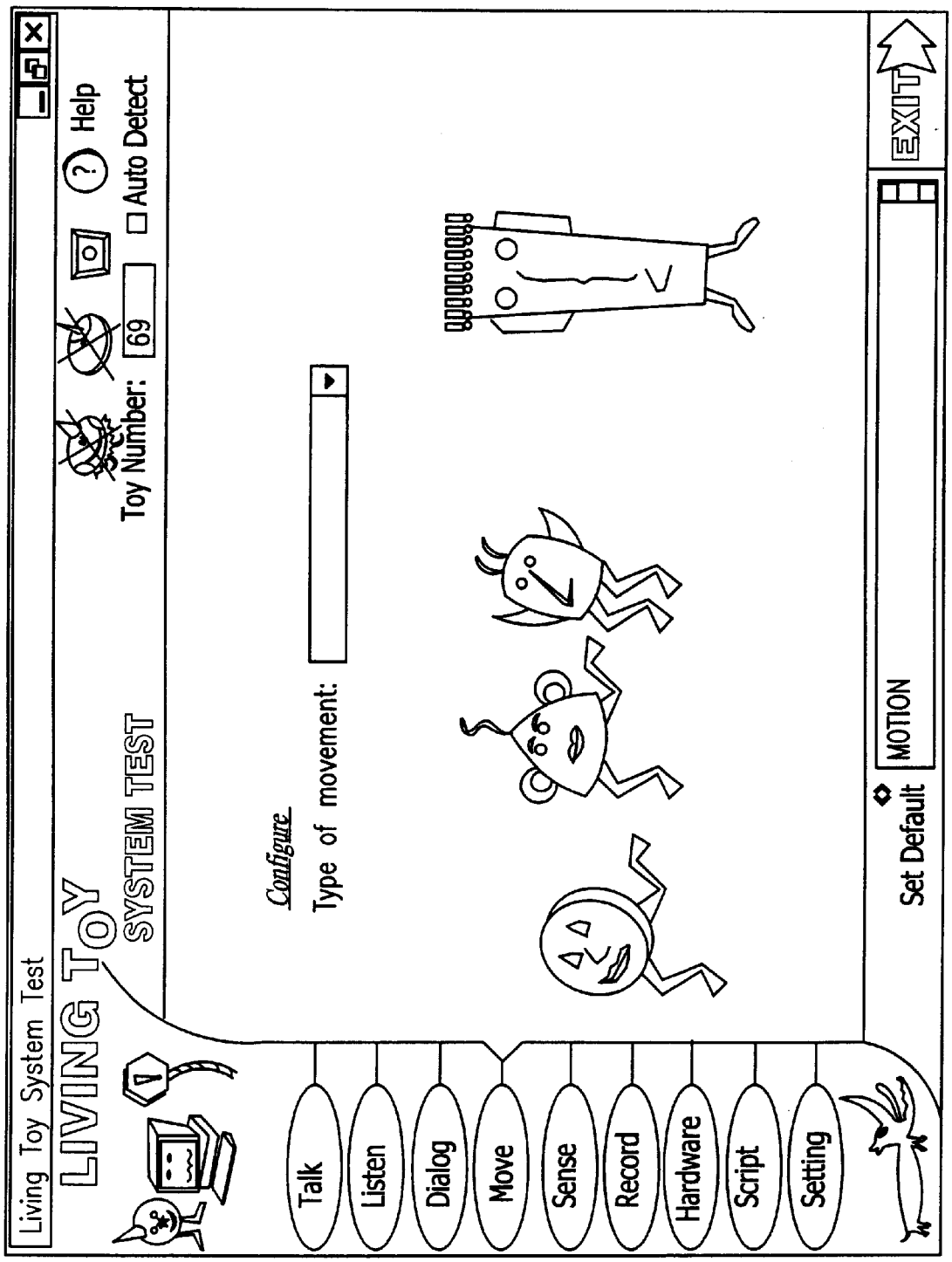
Figure 39:
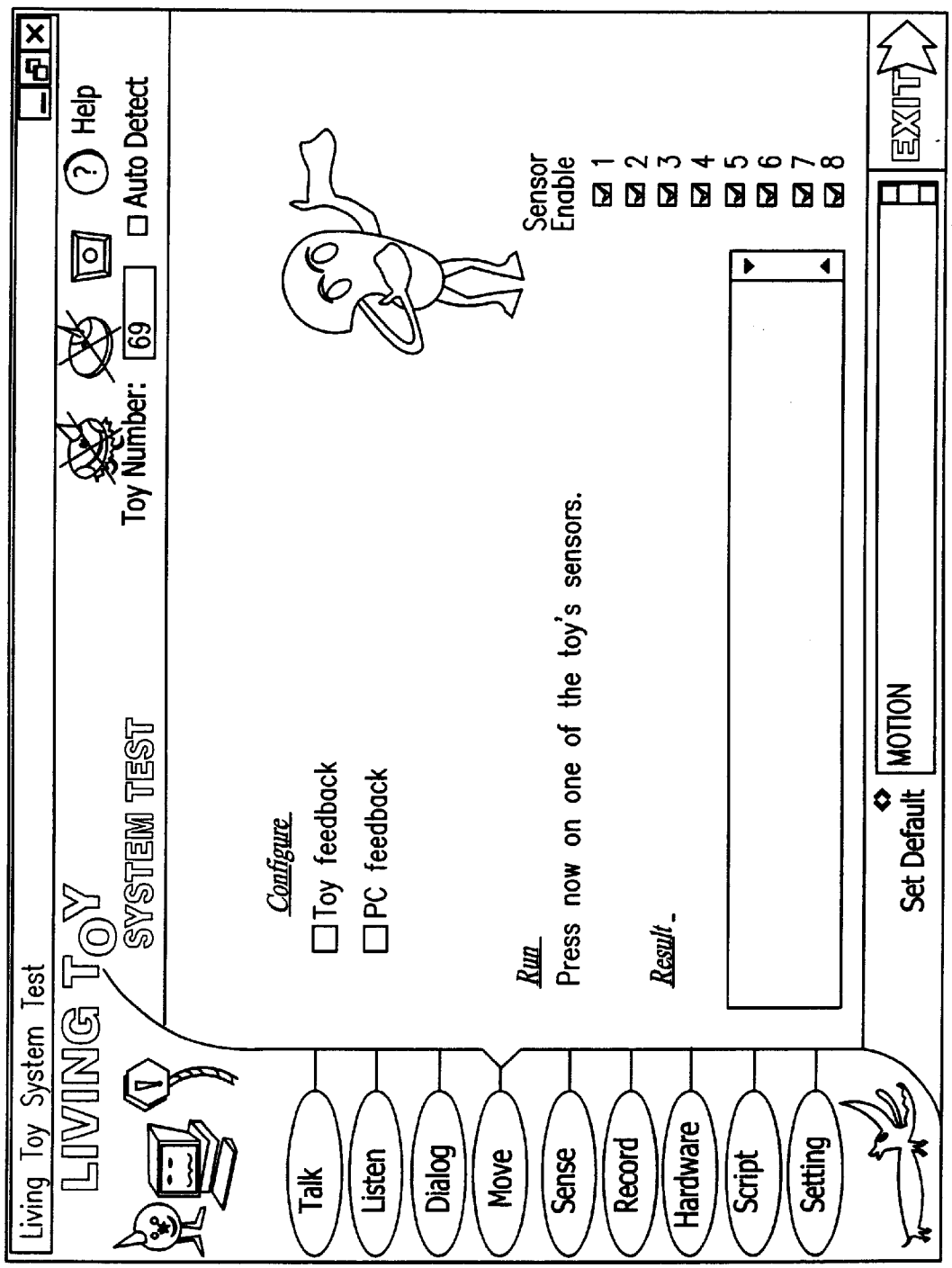
Figure 40:
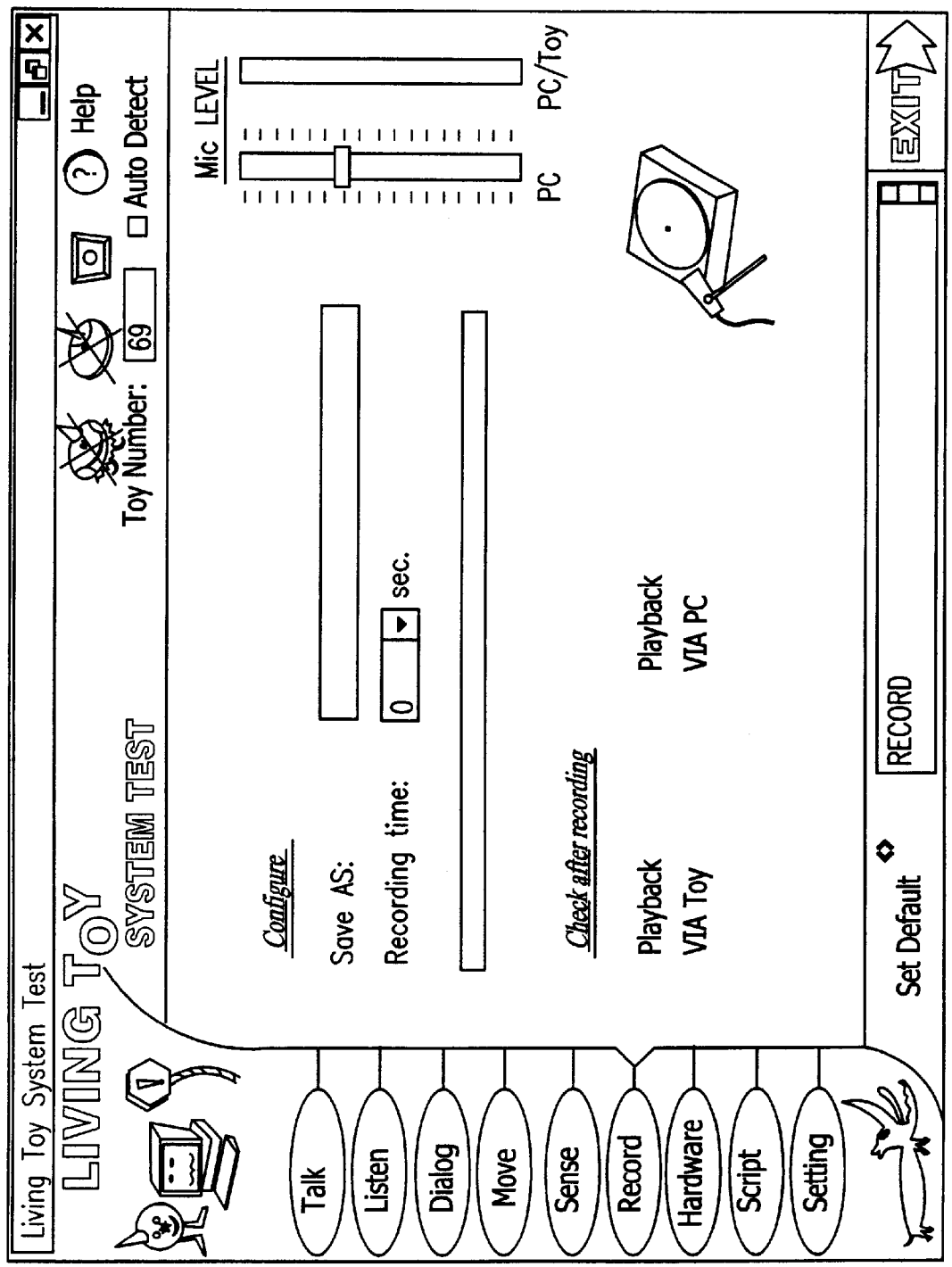
Figure 41:
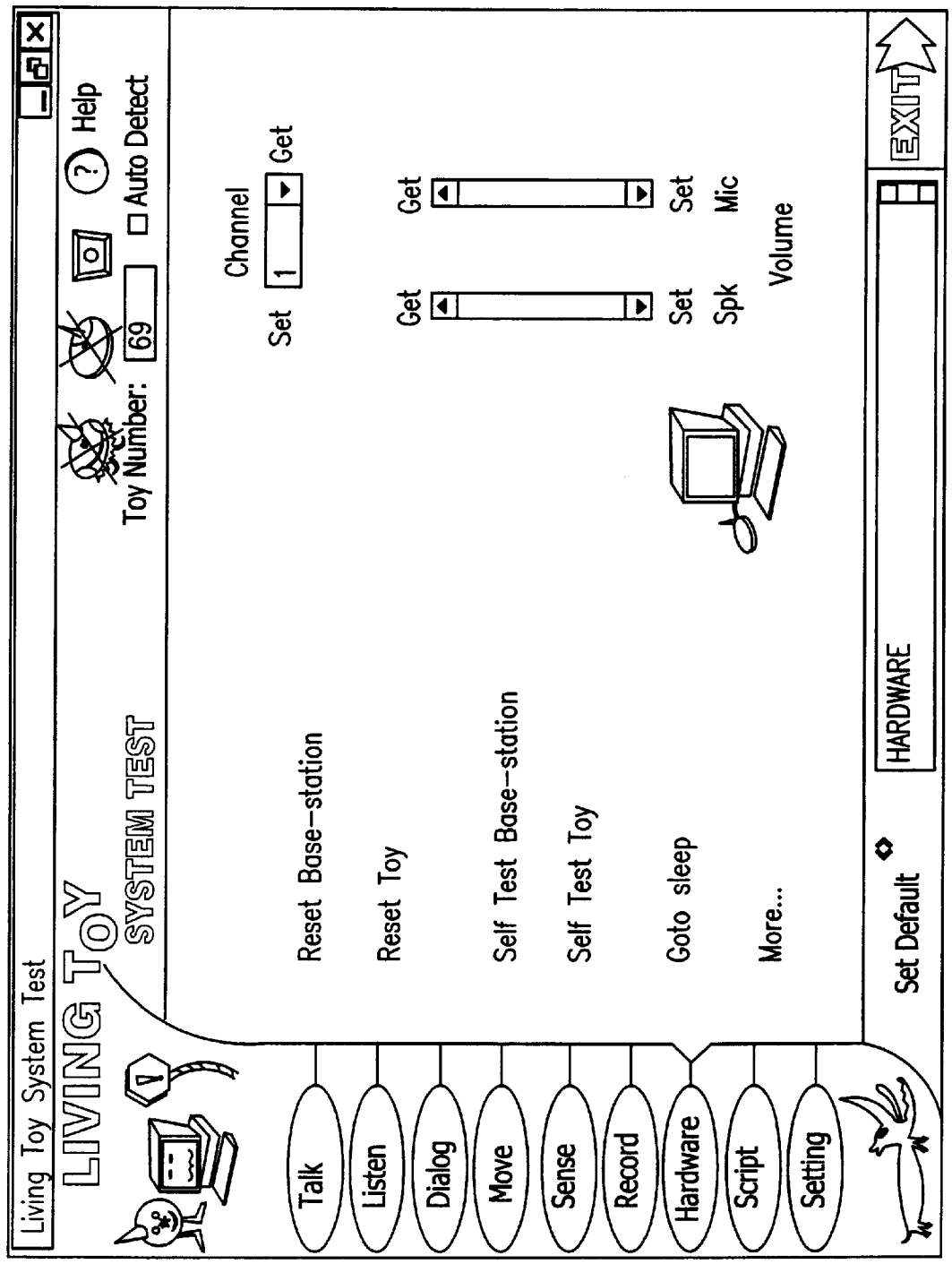
Figure 42:
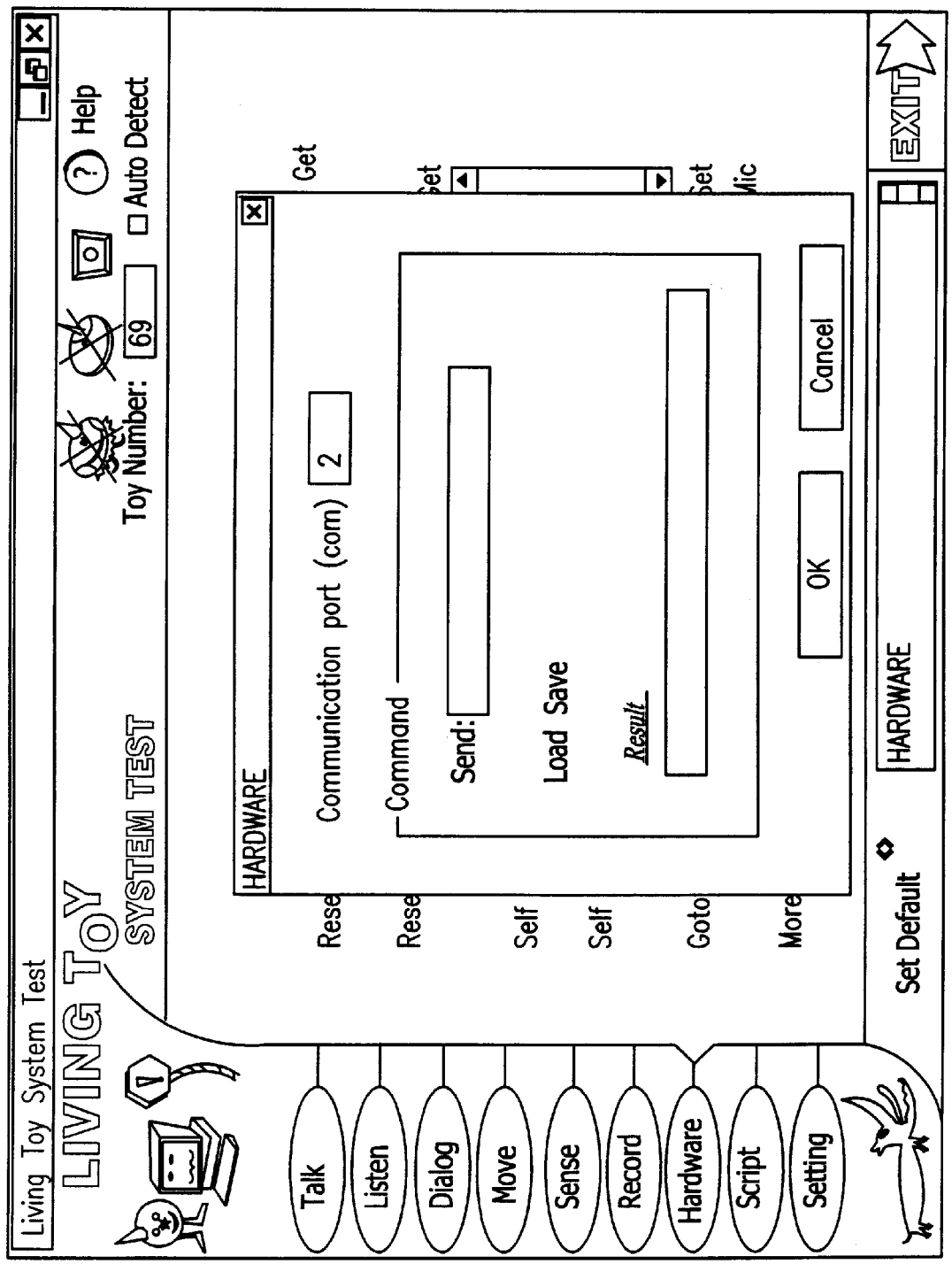
Figure 43:
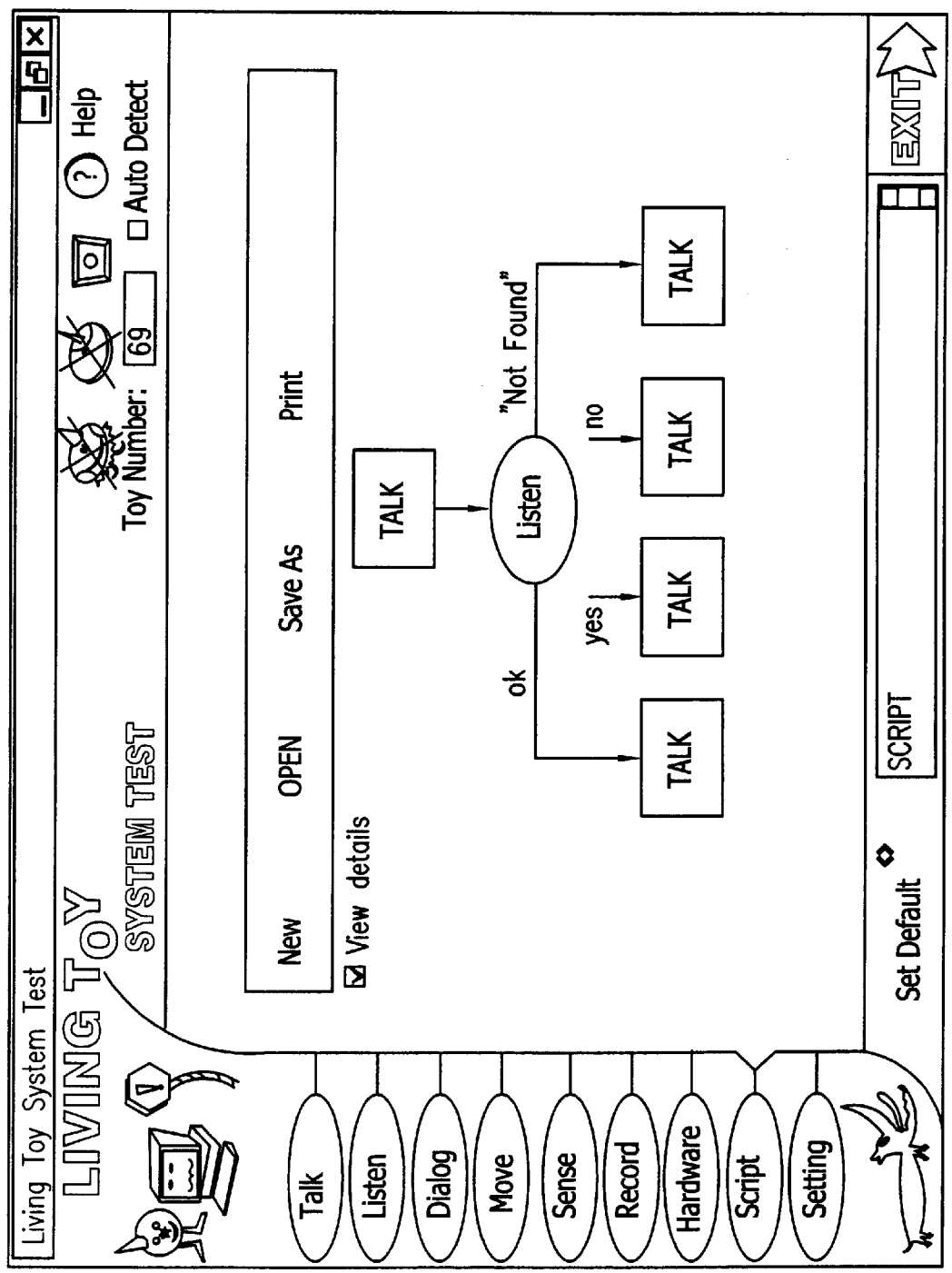
Figure 44:
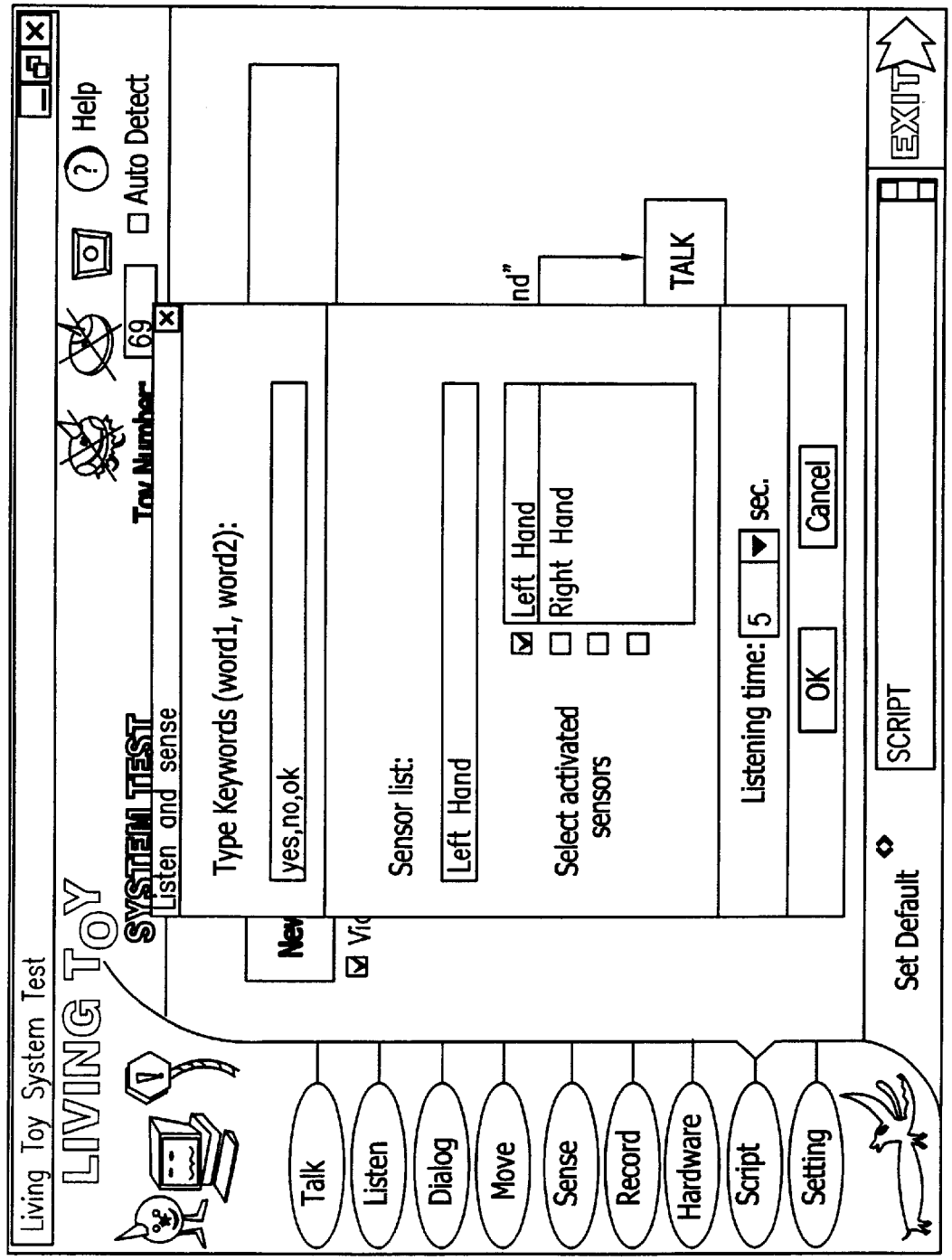
Figure 45:
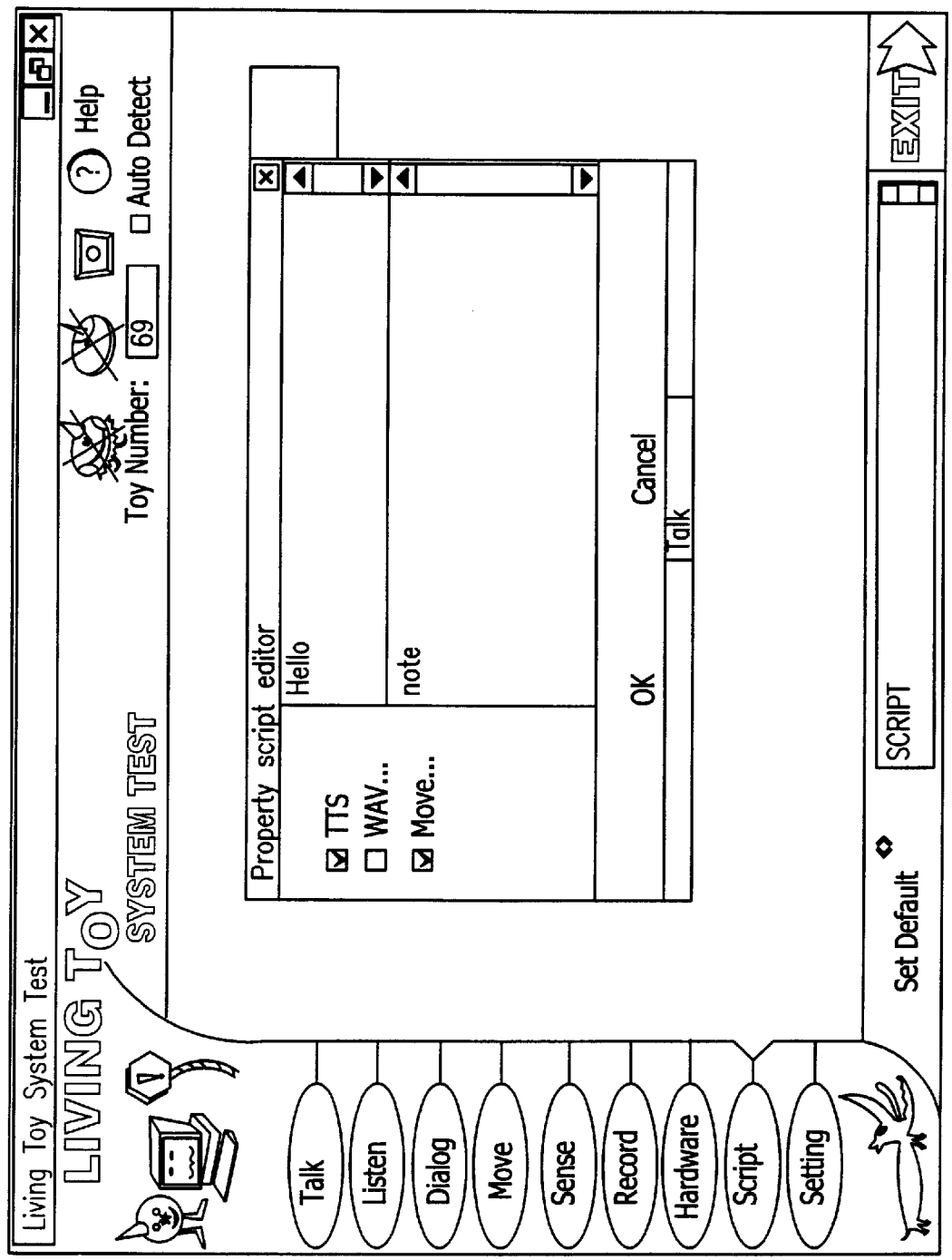
Figure 46:
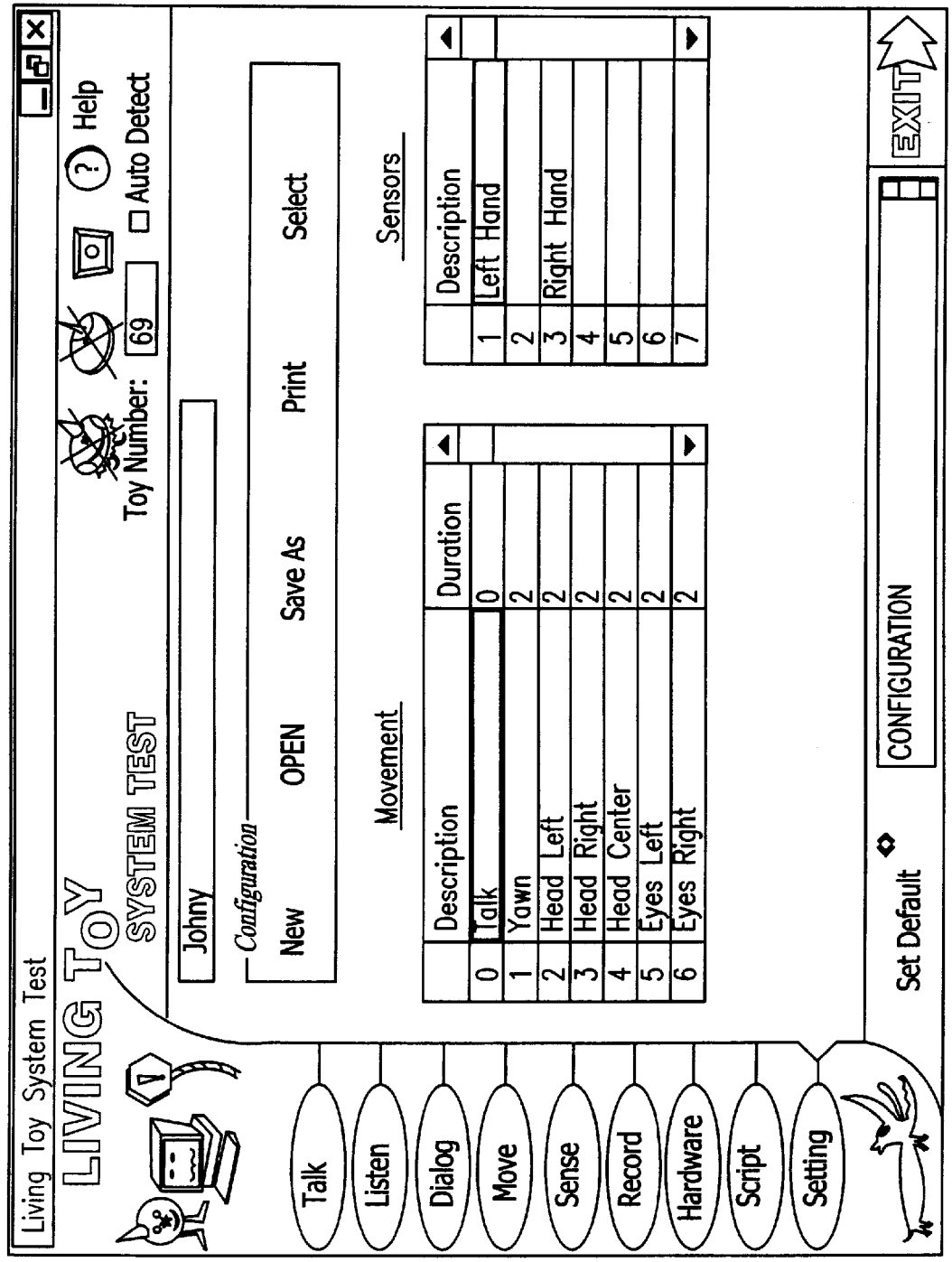
Figure 47:
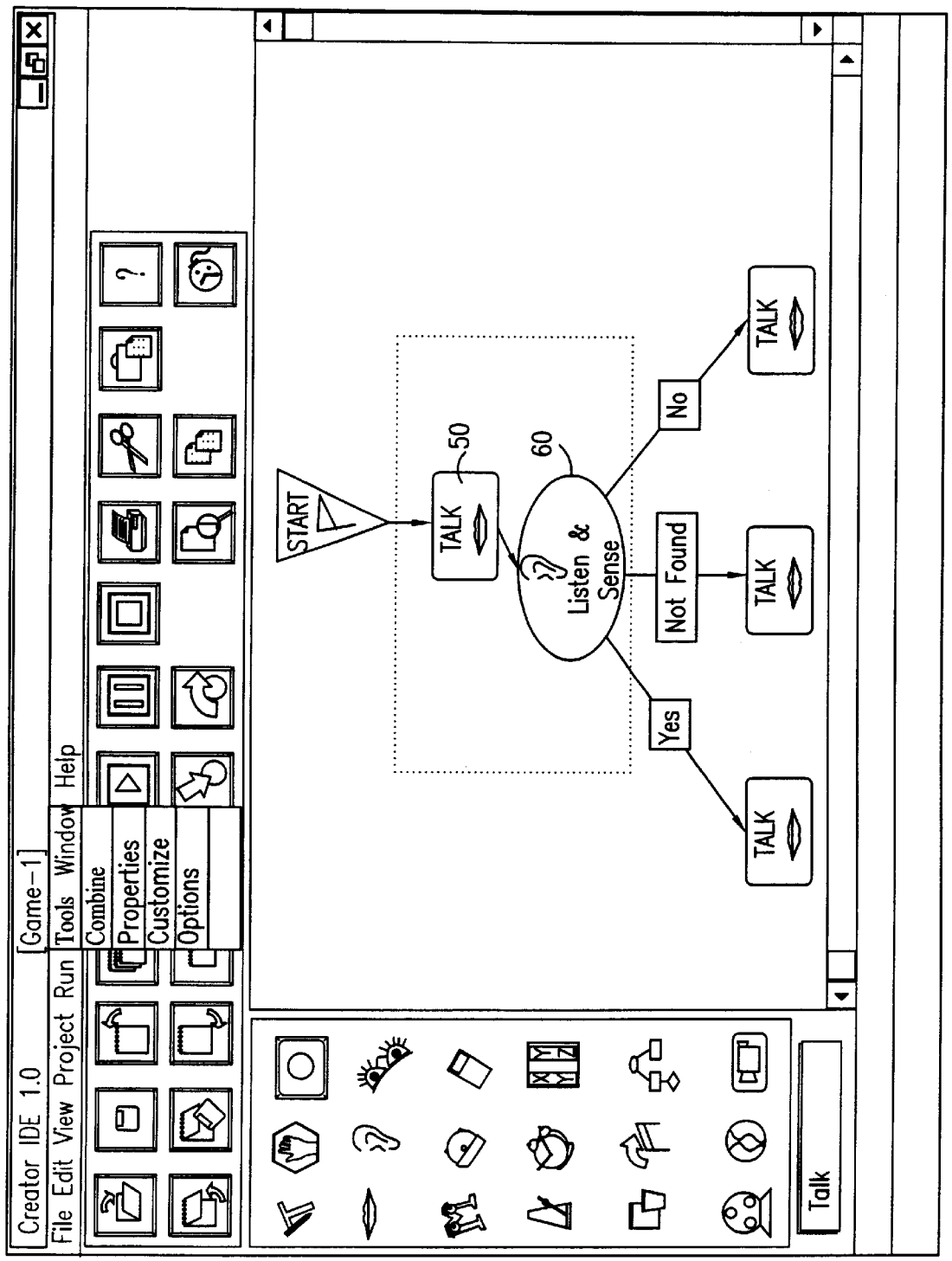
Figure 48:
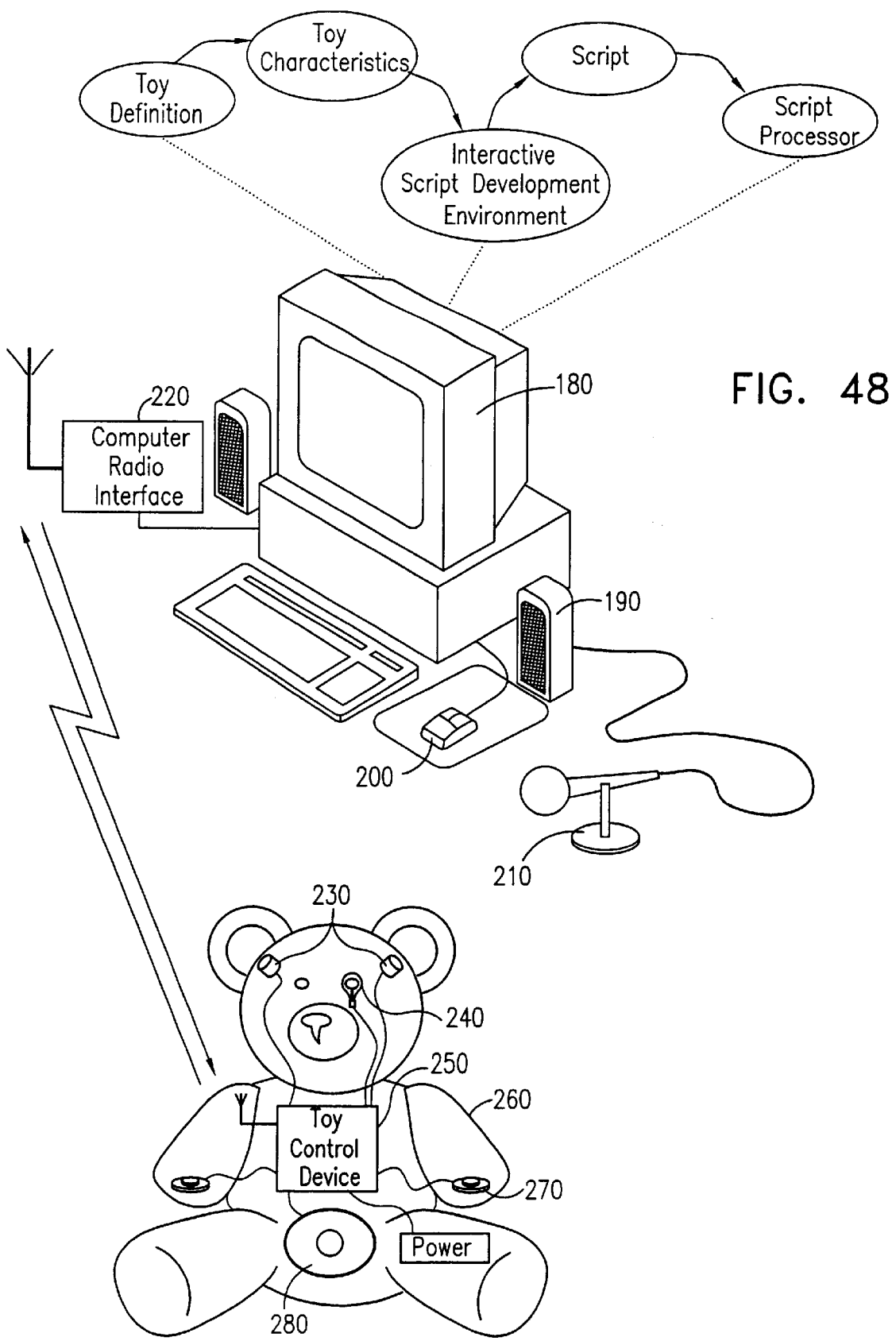
Figure 49:
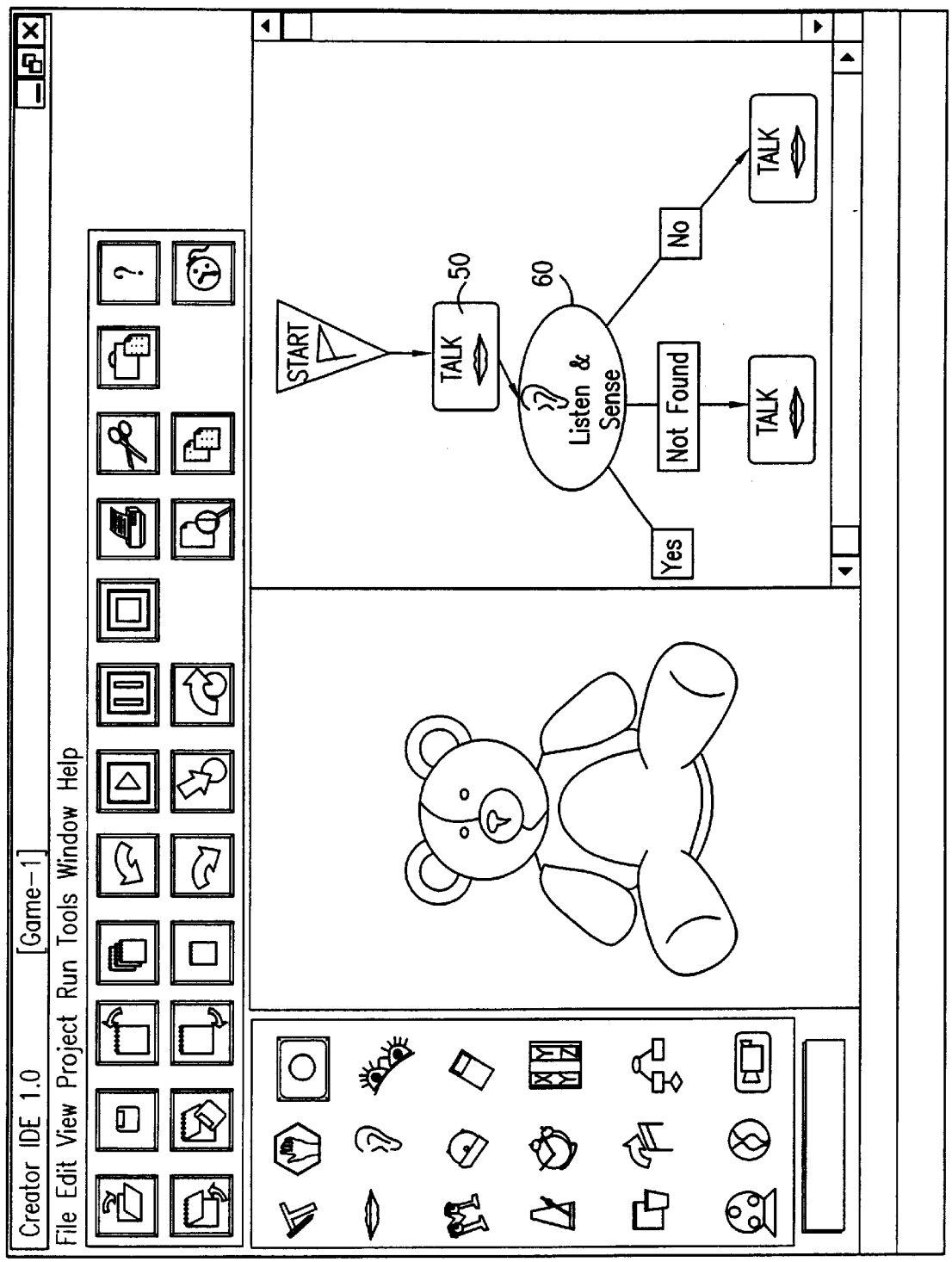
Figure 50:
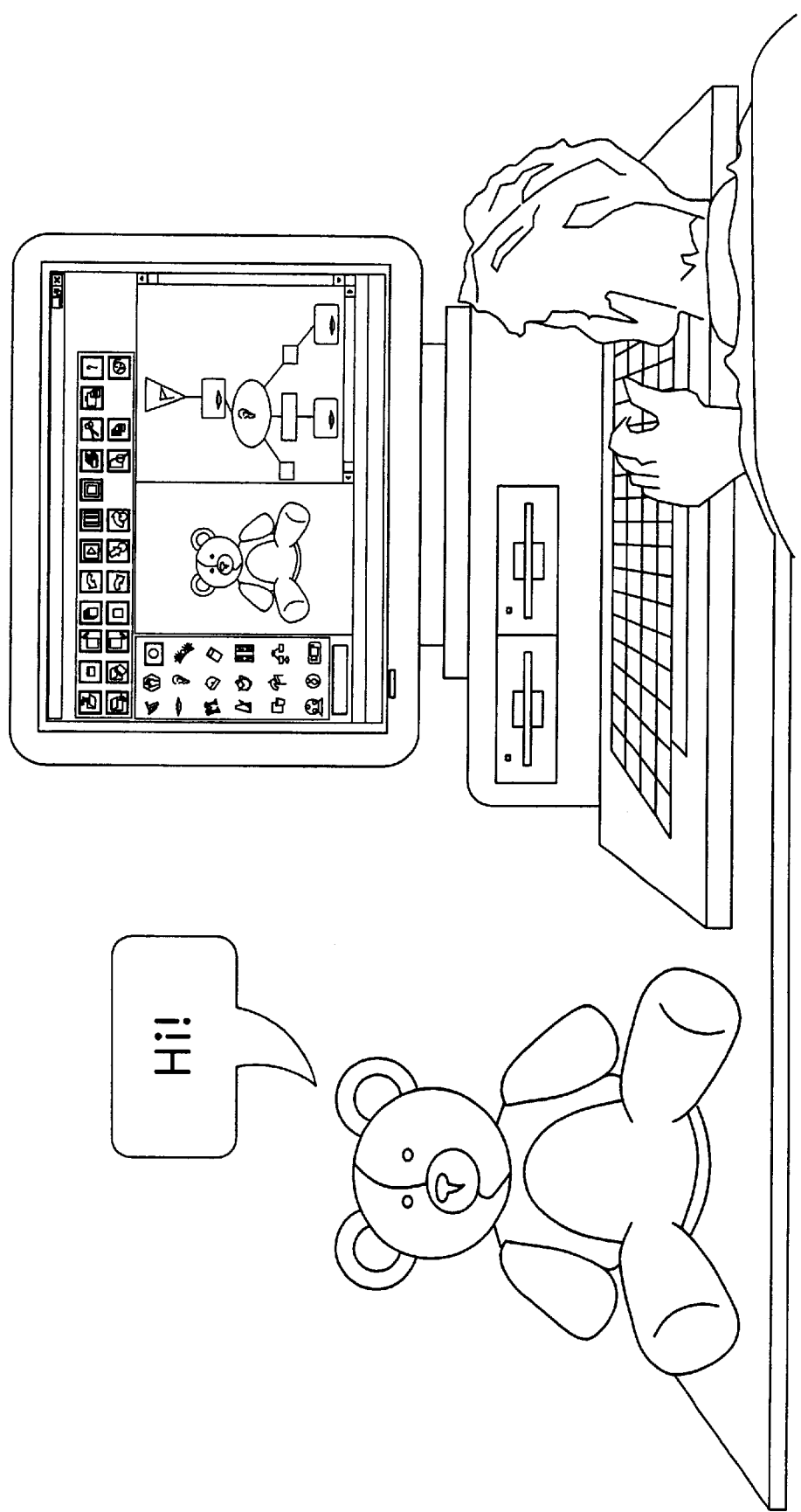
Figure 51:
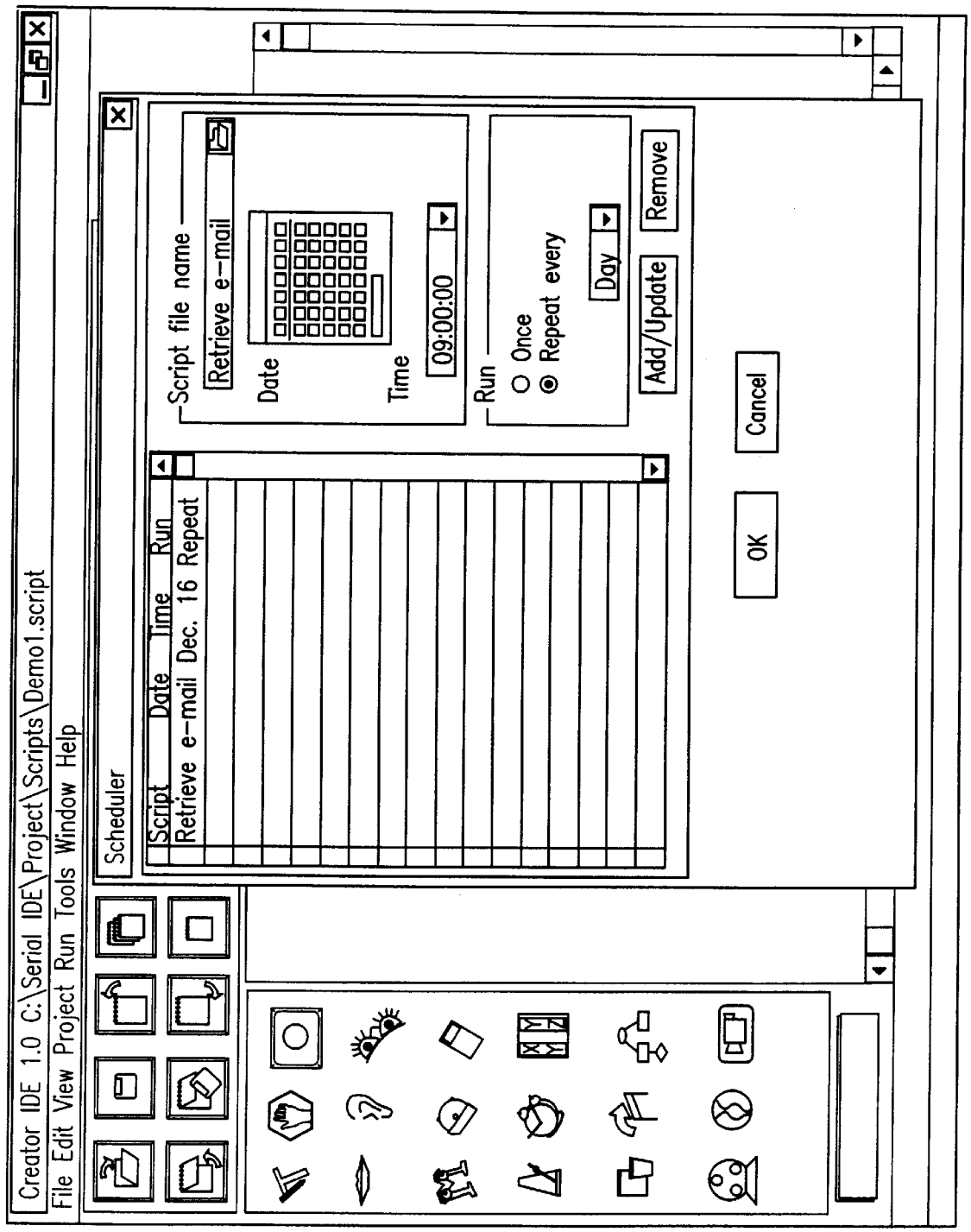
Figure 52:
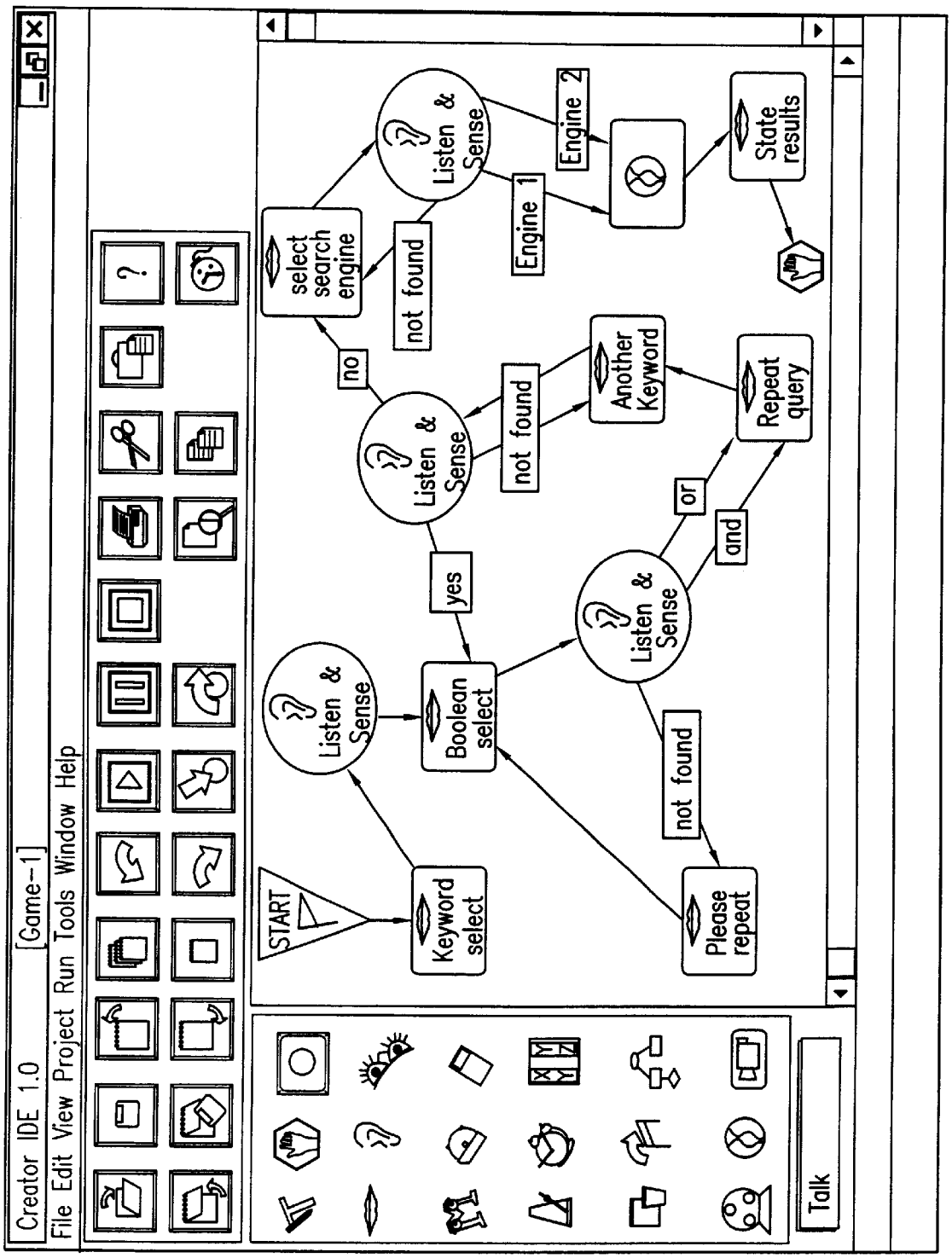

FIGS. 30A–30B, taken together, form a flowchart illustration of a main script for operating a toy called Storyteller, constructed and operative in accordance with a preferred embodiment of the present invention, the flowchart illustration being suitable for display in the work area of the display screen of FIG. 1;

FIGS. 31A–31B, taken together, form a flowchart illustration of the Game script called by the main script of FIGS. 30A–30B, the flowchart illustration being suitable for display in the work area of the display screen of FIG. 1;

FIGS. 32A–32B, taken together, form a flowchart illustration of the Song script called by the main script of FIGS. 30A–30B, the flowchart illustration being suitable for display in the work area of the display screen of FIG. 1;

FIGS. 33A–33B, taken together, form a flowchart illustration of the Story script called by the main script of FIGS. 30A–30B, the flowchart illustration being suitable for display in the work area of the display screen of FIG. 1;

FIG. 34 is a screen display of a main toy definition and testing menu;

FIG. 35 is a screen display which is displayed to a toy defining user responsive to selection by the toy defining user of the Talk option in the main menu of FIG. 34;

FIG. 36 is a screen display which is displayed to a toy defining user responsive to selection by the toy defining user of the Listen option in the main menu of FIG. 34;

FIG. 37 is a screen display which is displayed to a toy defining user responsive to selection by the toy defining user of the Dialog option in the main menu of FIG. 34;

FIG. 38 is a screen display which is displayed to a toy defining user responsive to selection by the toy defining user of the Move option in the main menu of FIG. 34;

FIG. 39 is a screen display which is displayed to a toy defining user responsive to selection by the toy defining user of the Sense option in the main menu of FIG. 34;

FIG. 40 is a screen display which is displayed to a toy defining user responsive to selection by the toy defining user of the Record option in the main menu of FIG. 34;

FIG. 41 is a screen display which is displayed to a toy defining user responsive to selection by the toy defining user of the Hardware option in the main menu of FIG. 34;

FIG. 42 is a screen display which is displayed to a toy defining user responsive to selection by the toy defining user of the "more" option in the menu of FIG. 41;

FIG. 43 is a screen display which is displayed to a toy defining user responsive to selection by the toy defining user of the Script option in the main menu of FIG. 34;

FIG. 44 is a screen display which is displayed to a toy defining user response to selection by the toy defining user of the Listen screen object in the screen display of FIG. 43;

FIG. 45 is a screen display which is displayed to a toy defining user response to selection by the toy defining user of the Talk screen object in the screen display of FIG. 43;

FIG. 46 is a screen display which is displayed to a toy defining user responsive to selection by the toy defining user of the Setting option in the main menu of FIG. 34;

FIG. 47 is a screen display which is displayed to a toy defining user who seeks to combine a plurality of interconnected script elements each representing an action performable by the toy;

FIG. 48 is a semi-pictorial semi-block diagram illustration of a script development system constructed and operative in accordance with a preferred embodiment of the present invention in which the toy actuated by the script is a physical toy;

FIG. 49 is a semi-pictorial semi-block diagram illustration of a script development system constructed and operative in accordance with a preferred embodiment of the present invention in which the toy actuated by the script is a virtual toy represented on a screen display;

FIG. 50 is a pictorial illustration of a script developer running a script;

FIG. 51 is a screen display of a time scheduler forming part of the system, according to a preferred embodiment of the present invention; and FIG. 52 is a screen display of an Internet searcher constructed and operative in accordance with a preferred embodiment of the present invention.

Attached herewith are the following appendices which aid in the understanding and appreciation of one preferred embodiment of the invention shown and described herein:

Appendix A is a computer listing, written in Delphi, of a software implementation of a toy definition and testing tool constructed and operative in accordance with a preferred embodiment of the present invention;

Appendix B is a computer listing, written in Delphi, of a software implementation of an interactive script development system constructed and operative in accordance with a preferred embodiment of the present invention and suitable for execution on a Personal Computer equipped with a Windows '95 or Windows '98 operating system and with Addflow software, commercially available from Patrick Lassalle, Lassalle Technologies, 247 Ave du Marechal, Juin 92100, Boulogne, France;

Appendix C is an output file of the tool of Appendix A, readable by Appendix B, and representing a first toy called Johnny; and Appendix D is an output file of the tool of Appendix A, readable by Appendix B, and representing a second toy called Storyteller.

DETAILED DESCRIPTION OF PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present specification uses the following terminology:
Speech recognition: Word-level interpretation of incoming speech data.
Speech comprehension: Phrase-level, sentence-level or idea-level interpretation of incoming speech data, preferably including emotional analysis.
Speech articulation: Word-level production of outgoing speech. Speech Generation: Phrase-level, sentence-level or idea-level production of outgoing speech data, preferably incorporating emotional content in the outgoing speech data.

FIG. 1 is a screen display generated by an interactive script development system constructed and operative in accordance with a preferred embodiment of the present invention.

As shown, the screen display of FIG. 1 includes a command bar 10, a control button array 20, a toolbox 30 and a work area 40. The command bar provides conventional file manipulation and project management options as well as editing tools. The control button array 20 preferably provides shortcuts to the commands in the command bar. The toolbox 30 preferably comprises a plurality of icons representing object types or script components for selection by a script creator (i.e. a human being using the system of FIG. 1 to create a script). Script component selection is typically effected by means of a conventional drag and drop operation, thereby to generate a script comprising a plurality of objects, typically associated with one another in flowchart form. A visual representation of the script is generated in the work area 40.

Figure 2:
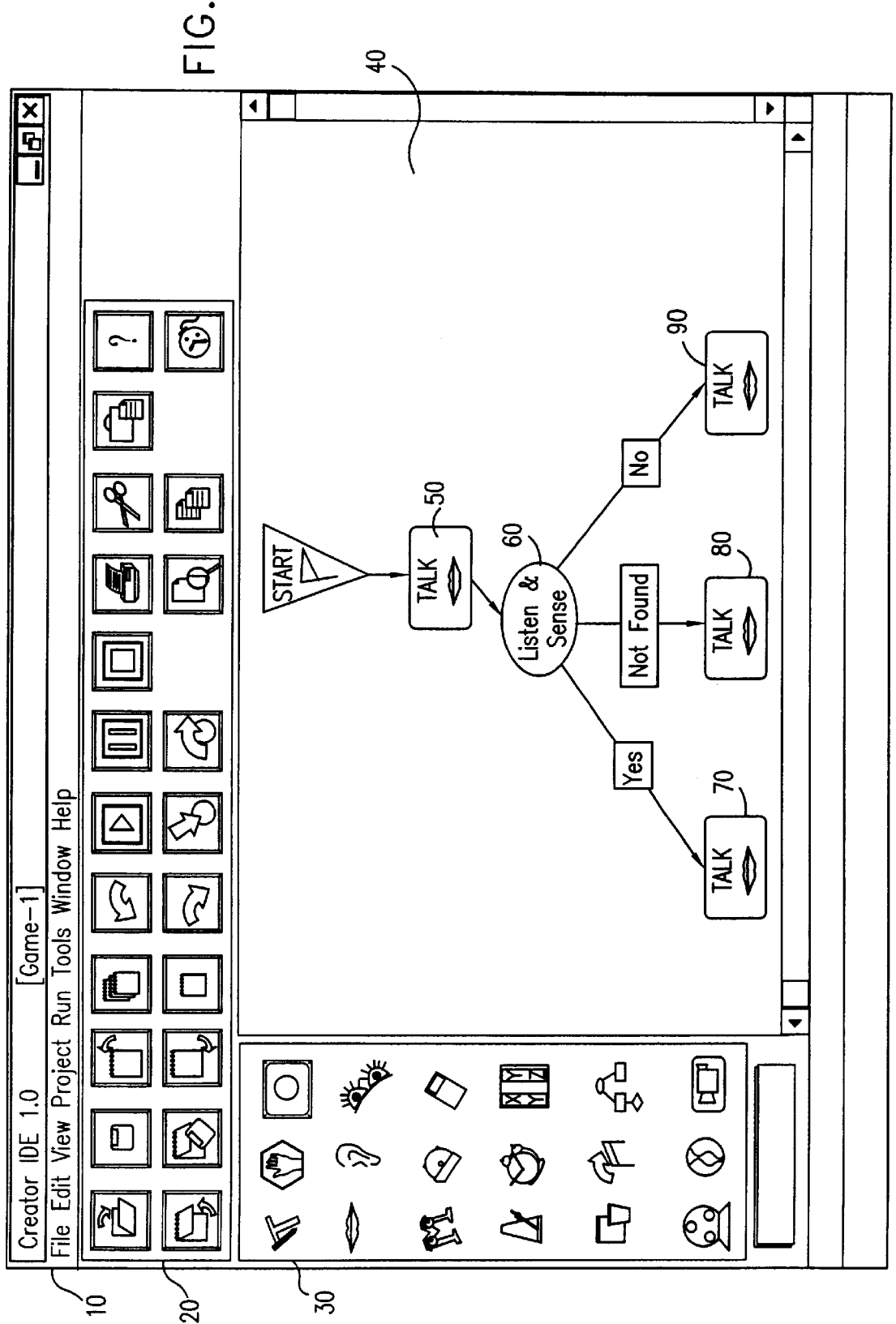
FIG. 2 is a screen display in which a script has been generated by dragging and dropping object types from the toolbox 30 into the work area 40.

FIG. 1 is an initial screen display in which the work area 40 is empty. In FIG. 2, a script has been generated by dragging and dropping object types from the toolbox 30. As shown, the script comprises an initial verbalization 50, a subsequent listening process 60, and three subsequent verbalizations 70, 80 and 90, activated depending on the user's vocalization, as spotted in the course of listening process 60. In the illustrated embodiment, the contents of the verbalizations are not shown in the work area except responsive to a user request therefor e.g. by double-clicking on the icon representing an individual verbalization.

However, alternatively, verbalization contents, as well as other features of each verbalization, may be displayed without waiting for a user request. For example, the identity of the speaker may be represented, for each verbalization, by displaying an icon of the speaker and a bubble in which the verbalization contents appears. If the verbalization contents is determined by selection of a wavefile rather than by keying in text, the user may be prompted to provide a title or precis of the wavefile for display on the screen. For example, a wavefile of Martin Luther King's "I have a dream" speech may be selected by a user in which case a bubble containing the words "I have a dream . . . " may be displayed on the screen, preferably in association with an icon of Martin Luther King.

Figure 3:
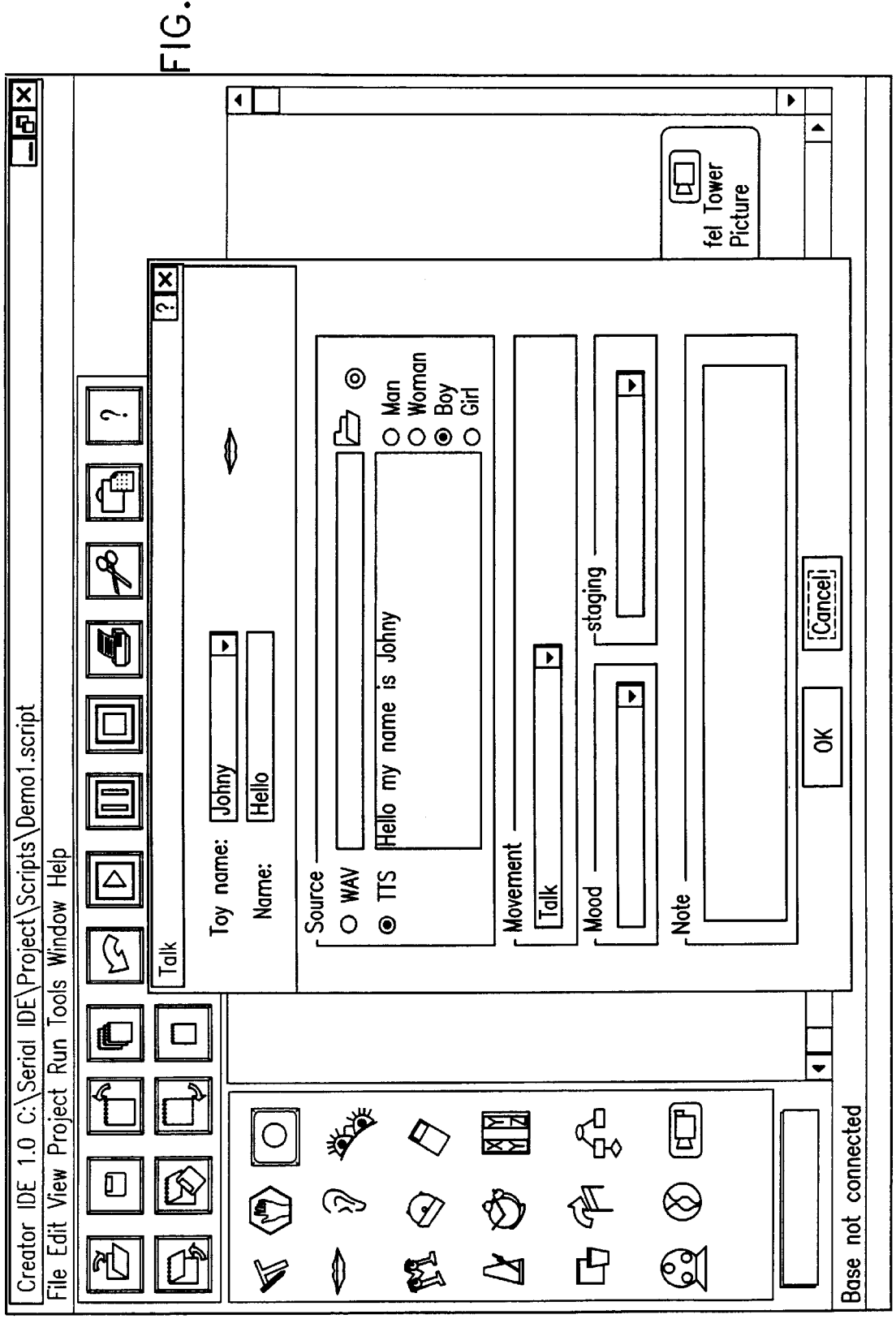
FIG. 3 is a display screen showing characteristics of a TALK/PLAY script component, in which a toy participant called Johnny says "Hello my name is Johnny"

In FIG. 3, for example, the script creator is prompted to assign a name to each talk object, and once this is done, the talk object may be displayed in association with its name.

The object types or script components provided in toolbox 30 may for example comprise the following:

START—of script

END—of script

RECORD—record user, preserve recording for later rendering of recording

TALK/PLAY—utter an input text or play a waveform file

LISTEN AND SENSE—listen to human player, typically in order to detect one of several script-creator-determined speech options and/or in order to determined that none of the speech options selected by the script-creator have been identified. "Sense" refers to operation of any sensor other than a microphone, such as a microswitch, motion sensor, light sensor, temperature sensor, and so on.

MOVE/MANIPULATE—body parts of toy participants in the script.

STORE IN LOCAL MEMORY—information such as a numerical value, for subsequent use later in the script.

STORE IN GLOBAL MEMORY—such as a hard disk, information such as a numerical value, for subsequent use later in the same execution of the script and/or in executions of other scripts and/or in a subsequent execution of the same script.

CALCULATE—Perform a computation.

WAIT—Wait.

TIME MARKER—in order to compute elapsed time subsequently in the same script, or in other scripts.

BOOLEAN OPERATOR—for generating conditional branching where the condition comprises a Boolean combination of simpler conditions.

EXECUTE A PROGRAM—load and execute any computer program such as a wordprocessor program.

GOTO—another script or another point within a current script.

CALL—another script, thereby generating a hierarchical relationship between the calling and called scripts.

RANDOM—selection of one option within a script-creator-defined set of options.

ACCESS INTERNET—Access a network such as the Internet.

DISPLAY GRAPHICS—Display an image or a video sequence, on the screen.

TEXT—Comment which is displayed but is not part of the flowchart.

Figure 4:
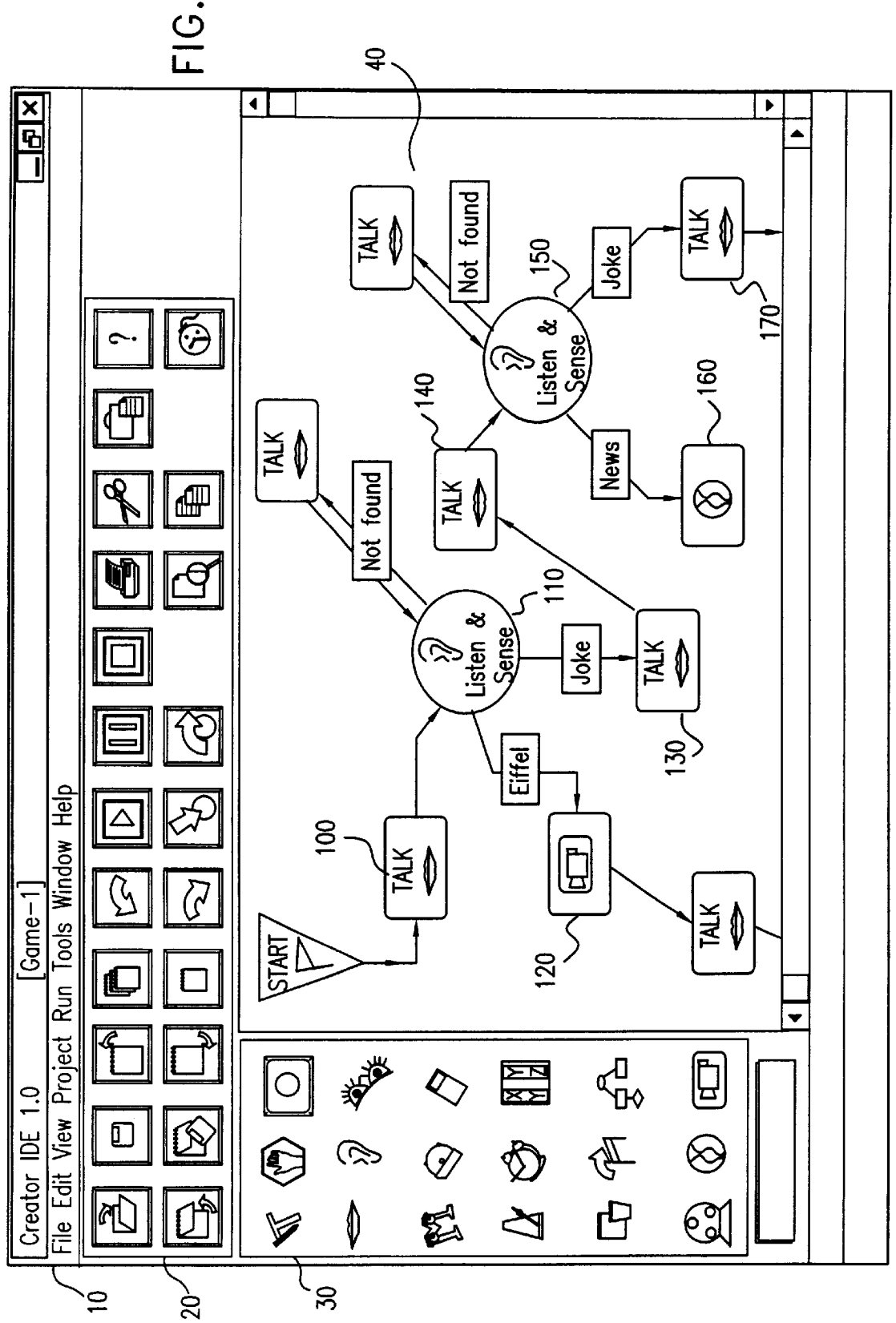
FIG. 4 is another screen display including a work area in which another script is represented.

FIG. 4 is another screen display including a work area in which another script is represented. The script of FIG. 4 includes a first question (100) to a human player, to which the human player is anticipated to respond either with the word "Eiffel" or "joke", indicating respectively a desire to view an image of the Eiffel tower on the computer display and a desire to hear a joke. If the human player responds with "Eiffel" or "joke" respectively, the computer displays (120) the Eiffel image or plays (130) a joke respectively. The script of FIG. 4 also includes a second question (140) to the human player, to which the human player is anticipated to respond either with the word "news" or "joke", indicating respectively a desire to see a news broadcast on the computer display and a desire to hear a joke. If the human player responds with "news" or "joke" respectively, the computer plays (160) the news or plays a joke (170) respectively. The news may be radio, television or Internet news. News may be played either by generating an on-line connection to news being currently broadcast, or by replaying a most recently stored news edition.

Preferably, when the script creator drags and drops the "listen and sense" script component, the system automatically generates a "not found" exit from "listen and sense". For example, if the script creator generates two exits from "listen and sense", such as "Eiffel" and "joke", the system typically generates 2+1=3 exits, the third exit being "not found". The script creator is thereby prompted to determine the eventuality, if none of the anticipated player inputs are sensed.

FIG. 3 is a display screen showing characteristics of a TALK/PLAY script component, in which a toy participant called Johnny says "Hello my name is Johnny". The script component of FIG. 3 includes the identity of the speaker, the source of the desired audio output (text rather than wavefile), and so on.

Figure 5:
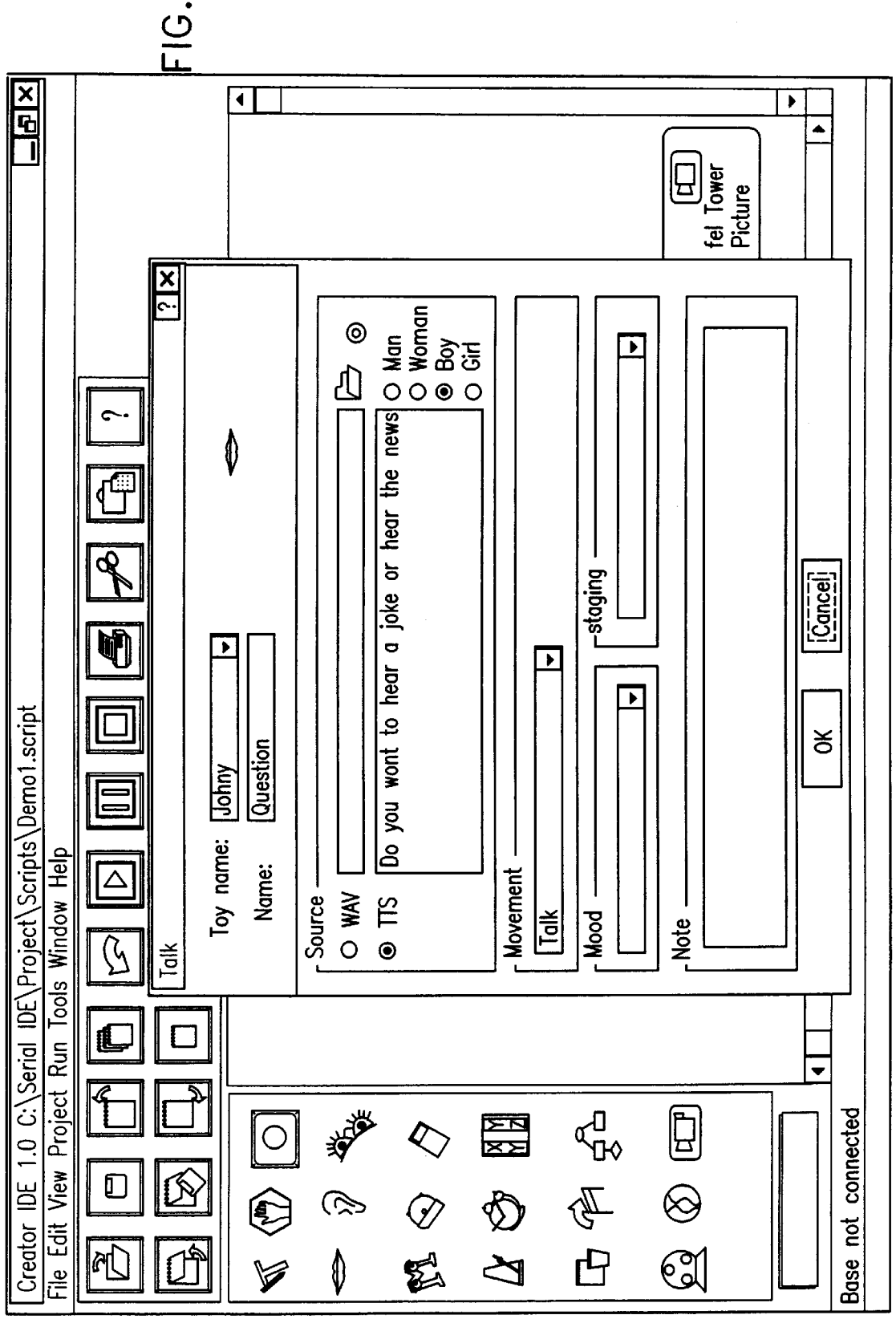
FIG. 5 is a display screen showing characteristics of a TALK/PLAY script component, in which Johnny asks a question, namely: "Do you want to hear a joke or hear the news"

FIG. 5 is a display screen showing characteristics of a TALK/PLAY script component, in which Johnny asks a question, namely: "Do you want to hear a joke or hear the news". The script component of FIG. 5 includes the identity of the speaker, the source of the desired audio output (text rather than wavefile), and so on.

Figure 6:
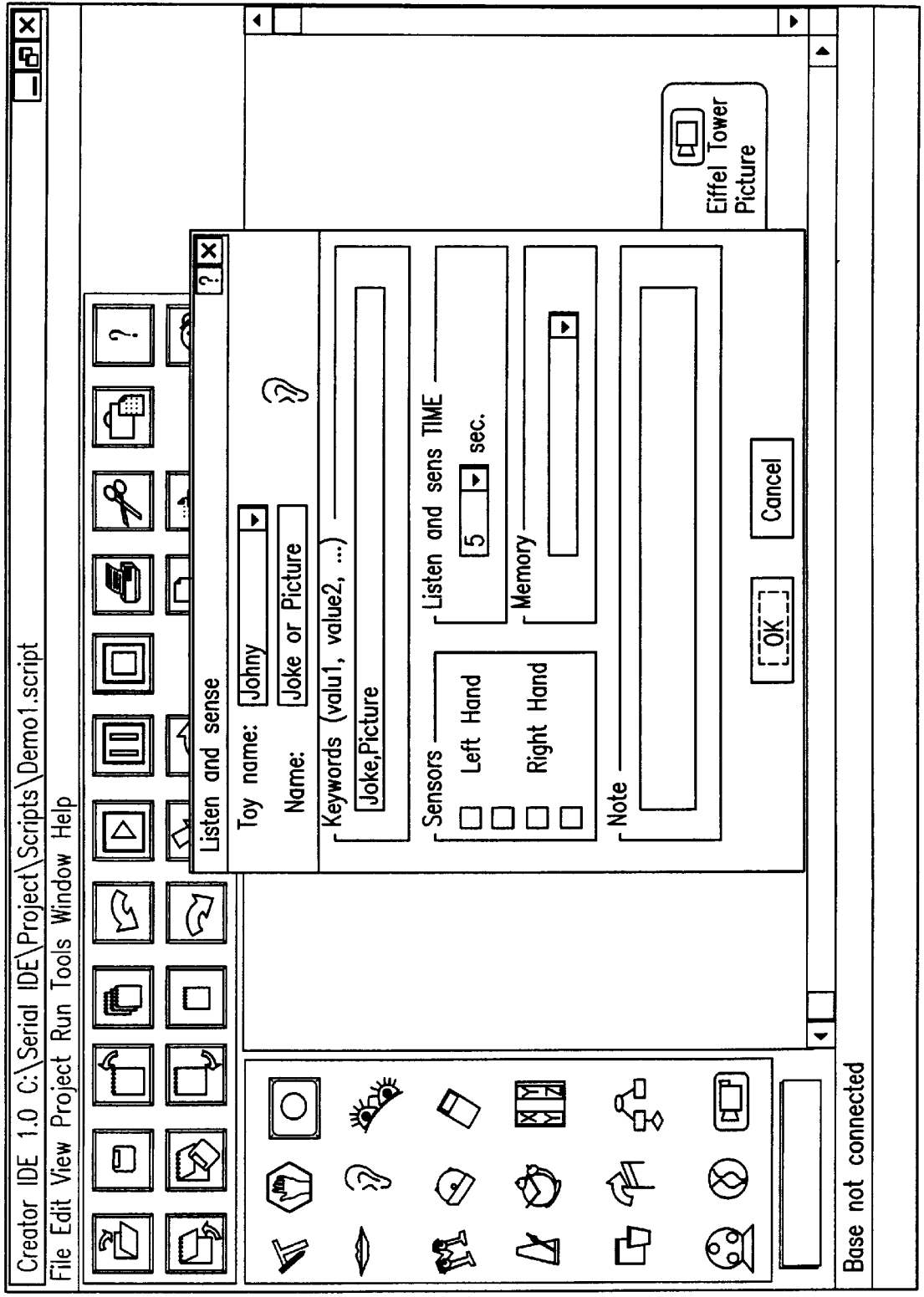
FIG. 6 is a display screen showing characteristics of a LISTEN AND SENSE script component, in which the system listens for one of the following keywords: "joke" or "picture"

FIG. 6 is a display screen showing characteristics of a LISTEN AND SENSE script component, in which the system listens for one of the following keywords: "joke" or "picture". By default, there is typically a third exit, apart from the two exits corresponding to the two above keywords, the third exit being "not found", i.e. neither of the two keywords is identified within 5 seconds (user-defined "listen and sense" time).

Figure 7:
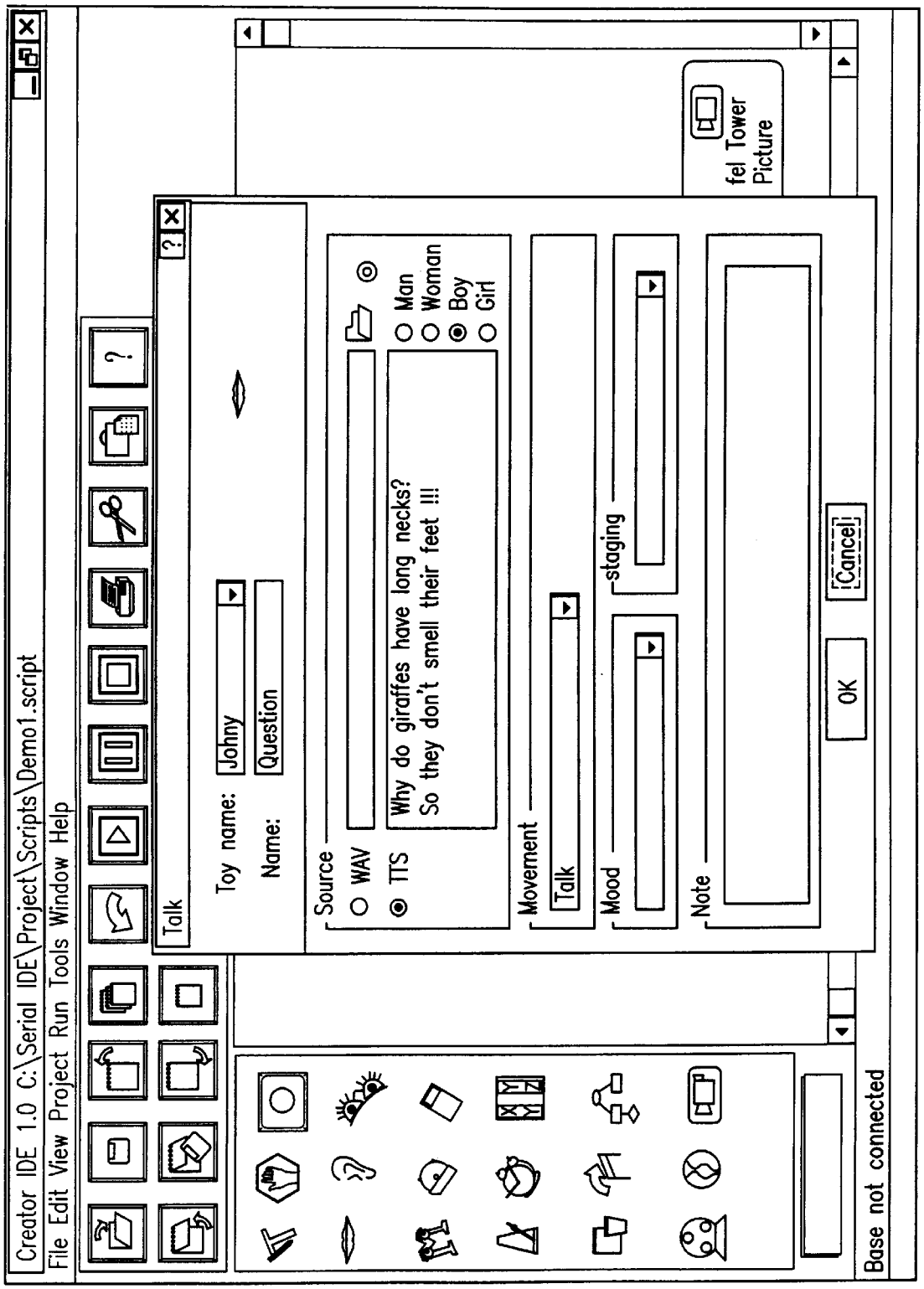
FIG. 7 is a display screen showing characteristics of a TALK/PLAY script component, in which Johnny tells a joke.

FIG. 7 is a display screen showing characteristics of a TALK/PLAY script component, in which Johnny tells a joke. The script component of FIG. 7 includes the identity of the speaker, the source of the desired audio output (text rather than wavefile), and so on.

Figure 8:
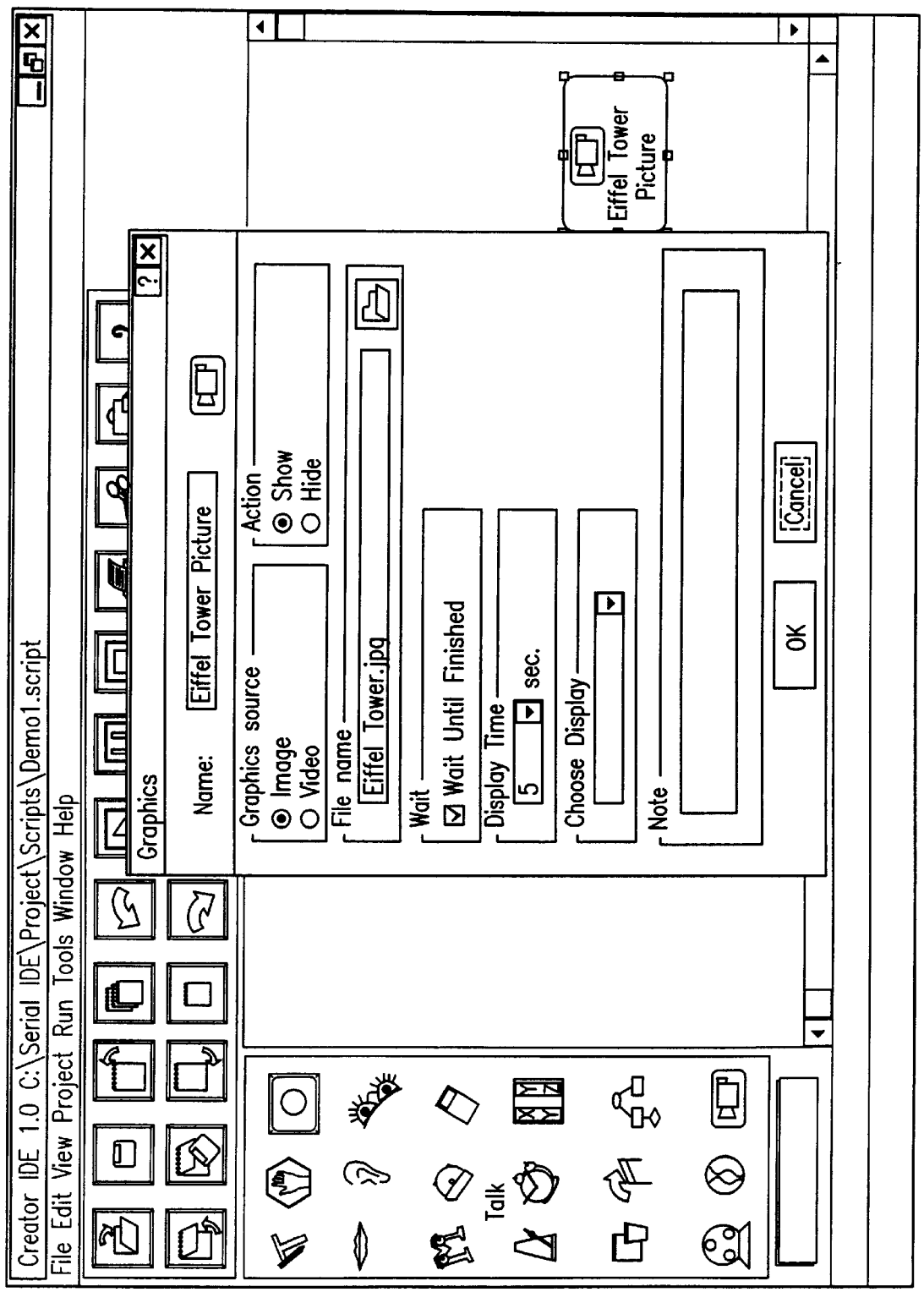
FIG. 8 is a display screen showing characteristics of a DISPLAY GRAPHICS script component.

FIG. 8 is a display screen showing characteristics of a DISPLAY GRAPHICS script component.

Figure 9:
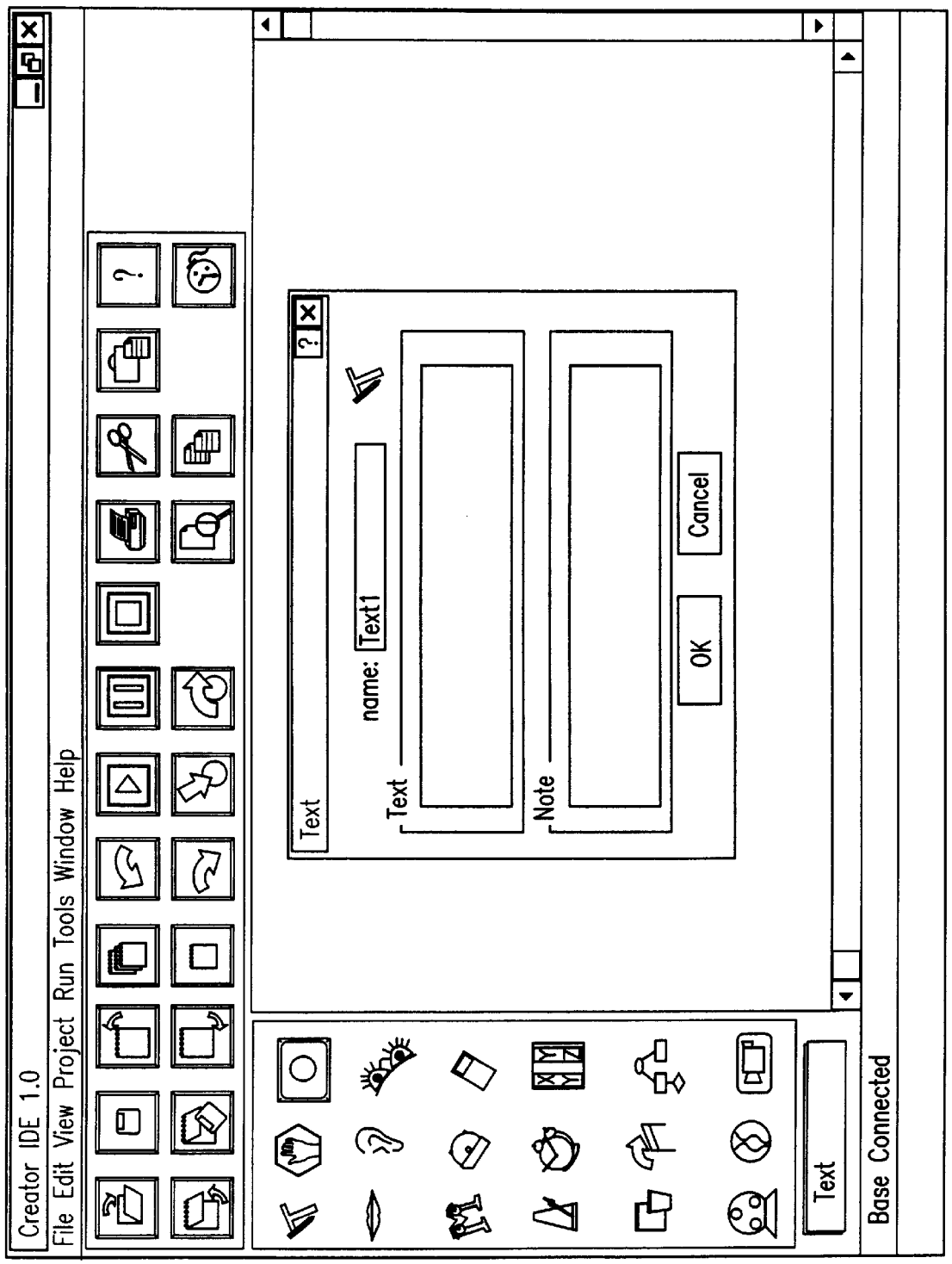
FIG. 9 is a display screen which is shown when a script creator selects TEXT.

FIG. 9 is a display screen which is shown when a script creator selects TEXT.

Figure 10:
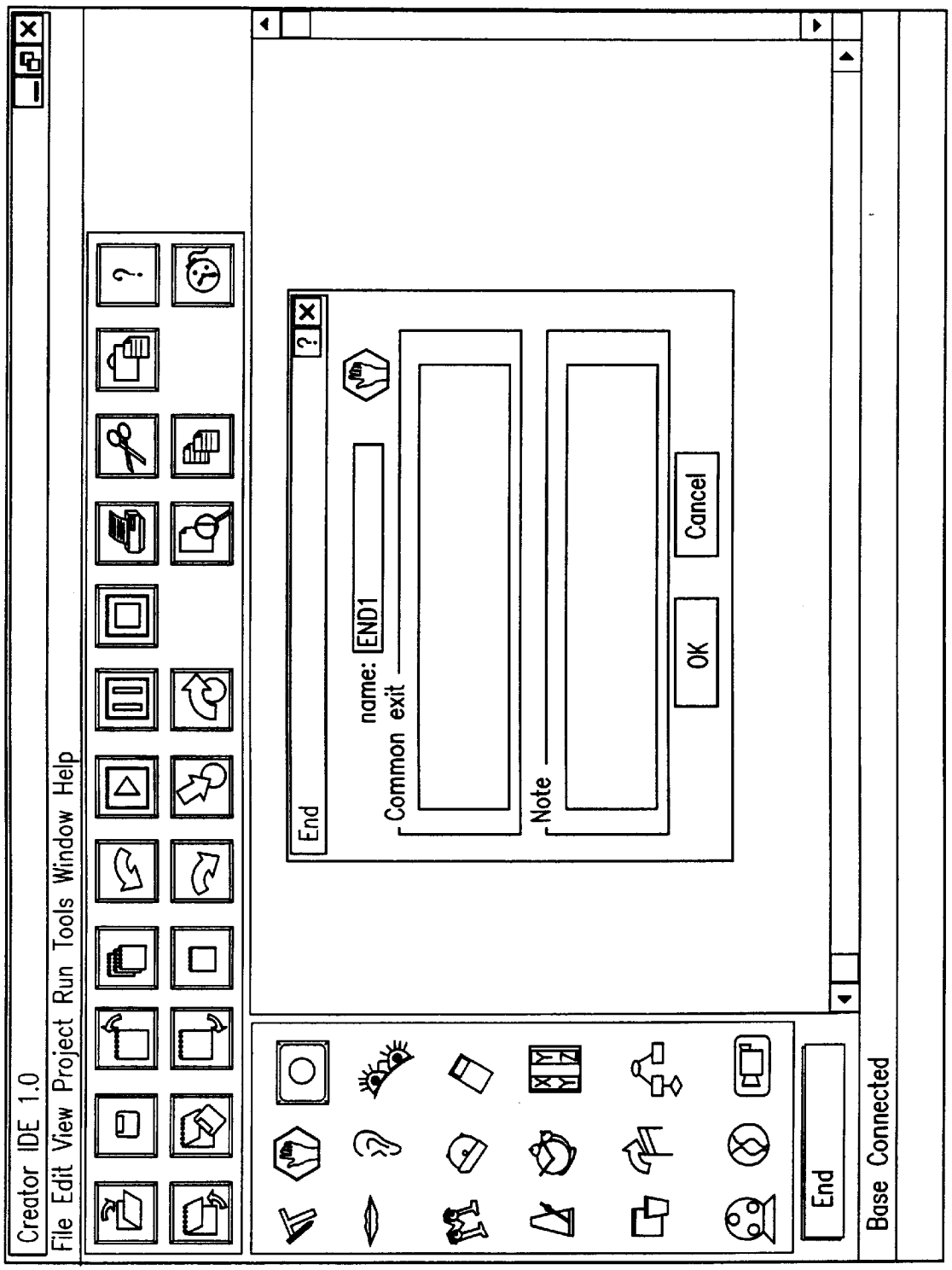
FIG. 10 is a display screen showing fields via which properties of a selected END script component may be defined.

FIG. 10 is a display screen showing fields via which properties of a selected END script component may be defined.

Figure 11:
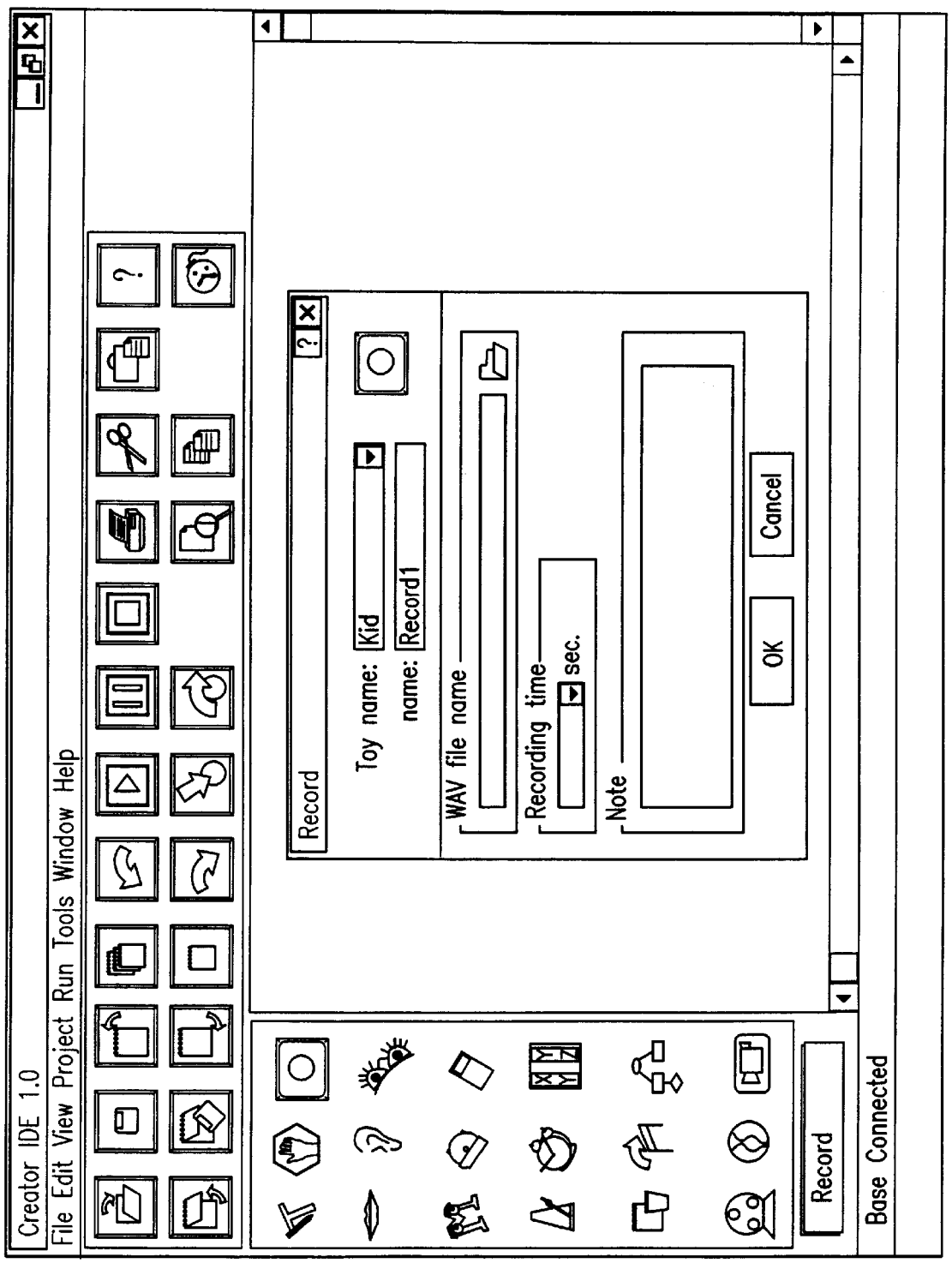
FIG. 11 is a display screen showing fields via which properties of a selected RECORD script component may be defined.

FIG. 11 is a display screen showing fields via which properties of a selected RECORD script component may be defined.

Figure 12:
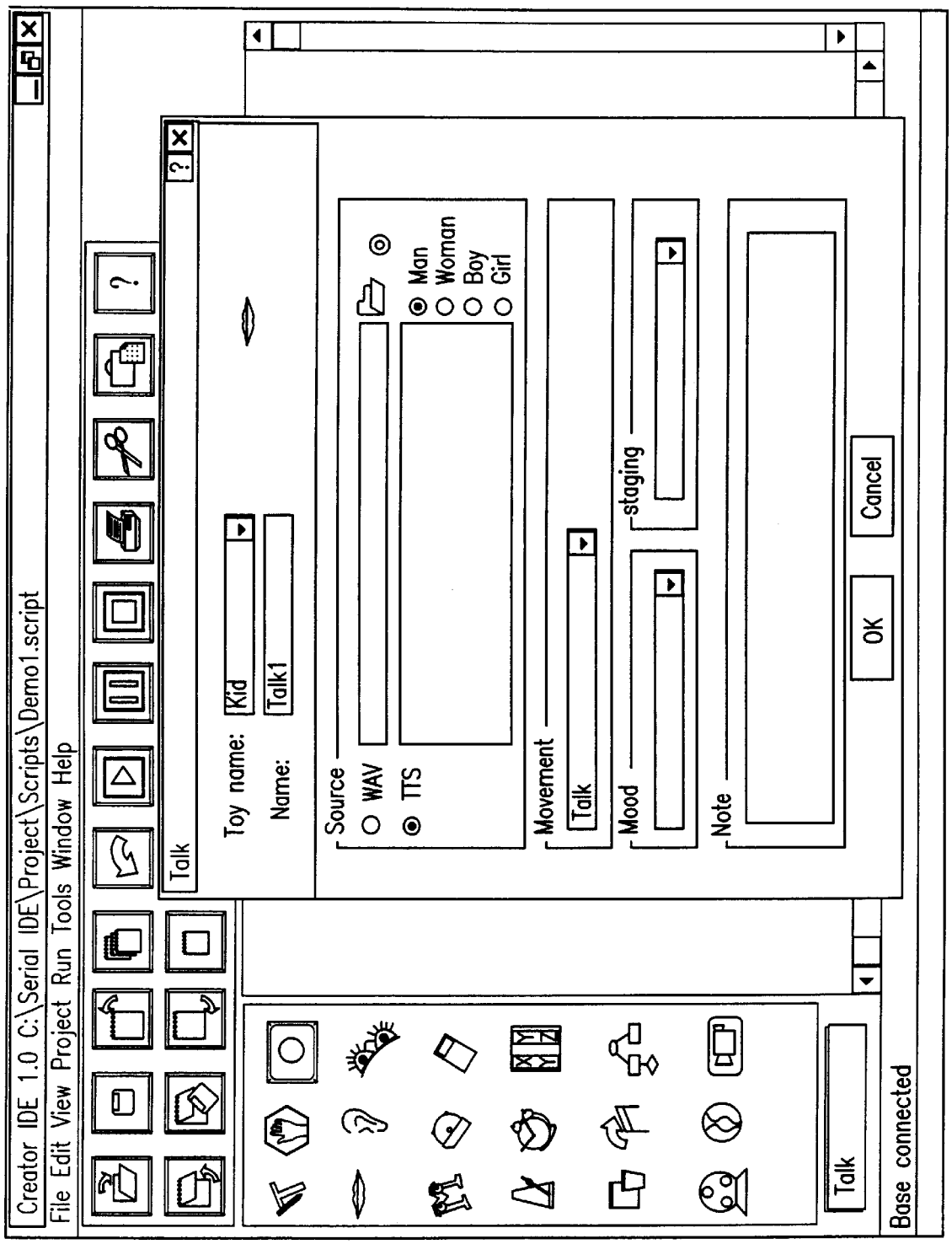
FIG. 12 is a display screen showing fields via which properties of a selected TALK script component may be defined.

FIG. 12 is a display screen showing fields via which properties of a selected TALK script component may be defined.

Figure 13:
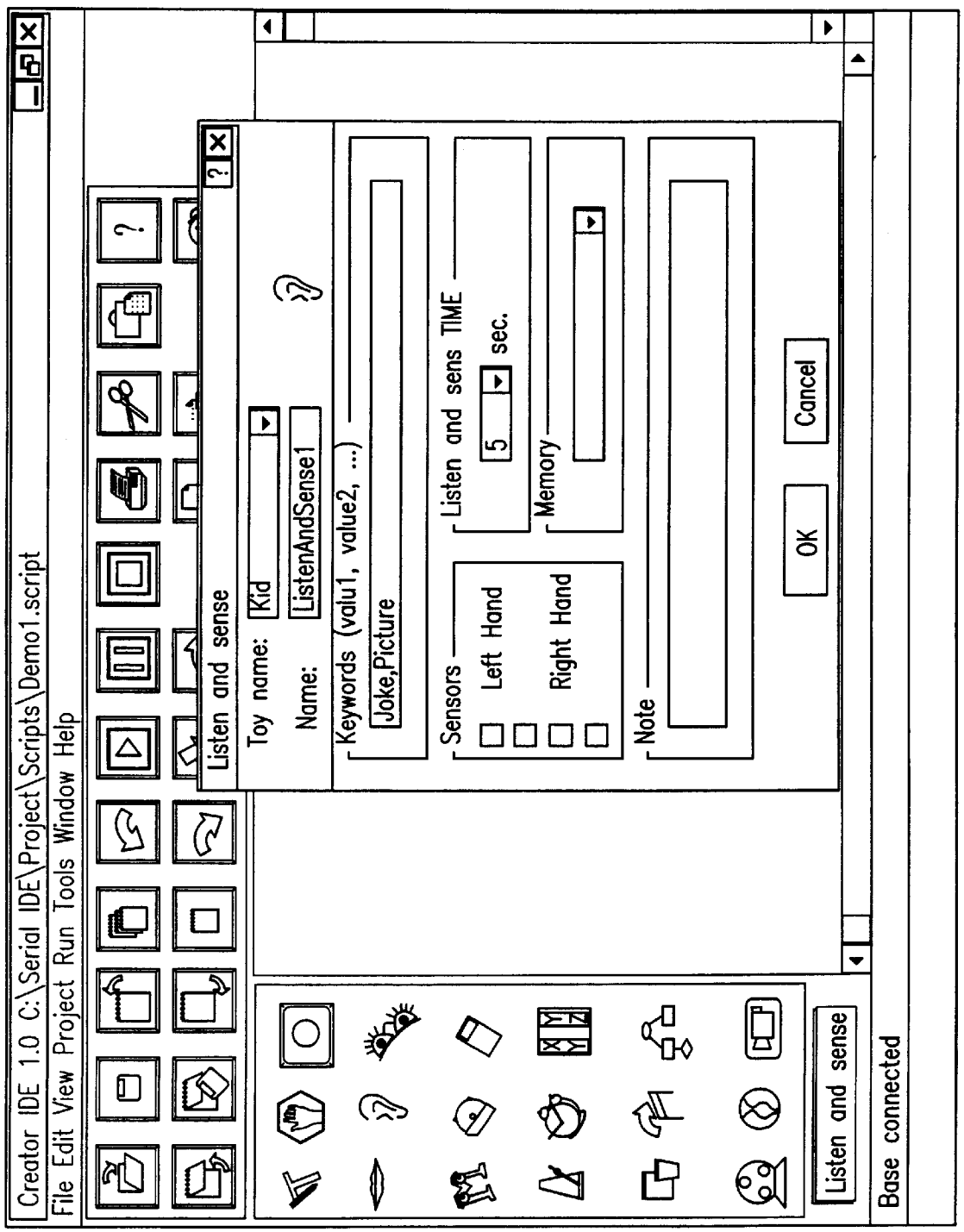
FIG. 13 is a display screen showing fields via which properties of a selected LISTEN AND SENSE script component may be defined.

FIG. 13 is a display screen showing fields via which properties of a selected LISTEN AND SENSE script component may be defined.

Figure 14:
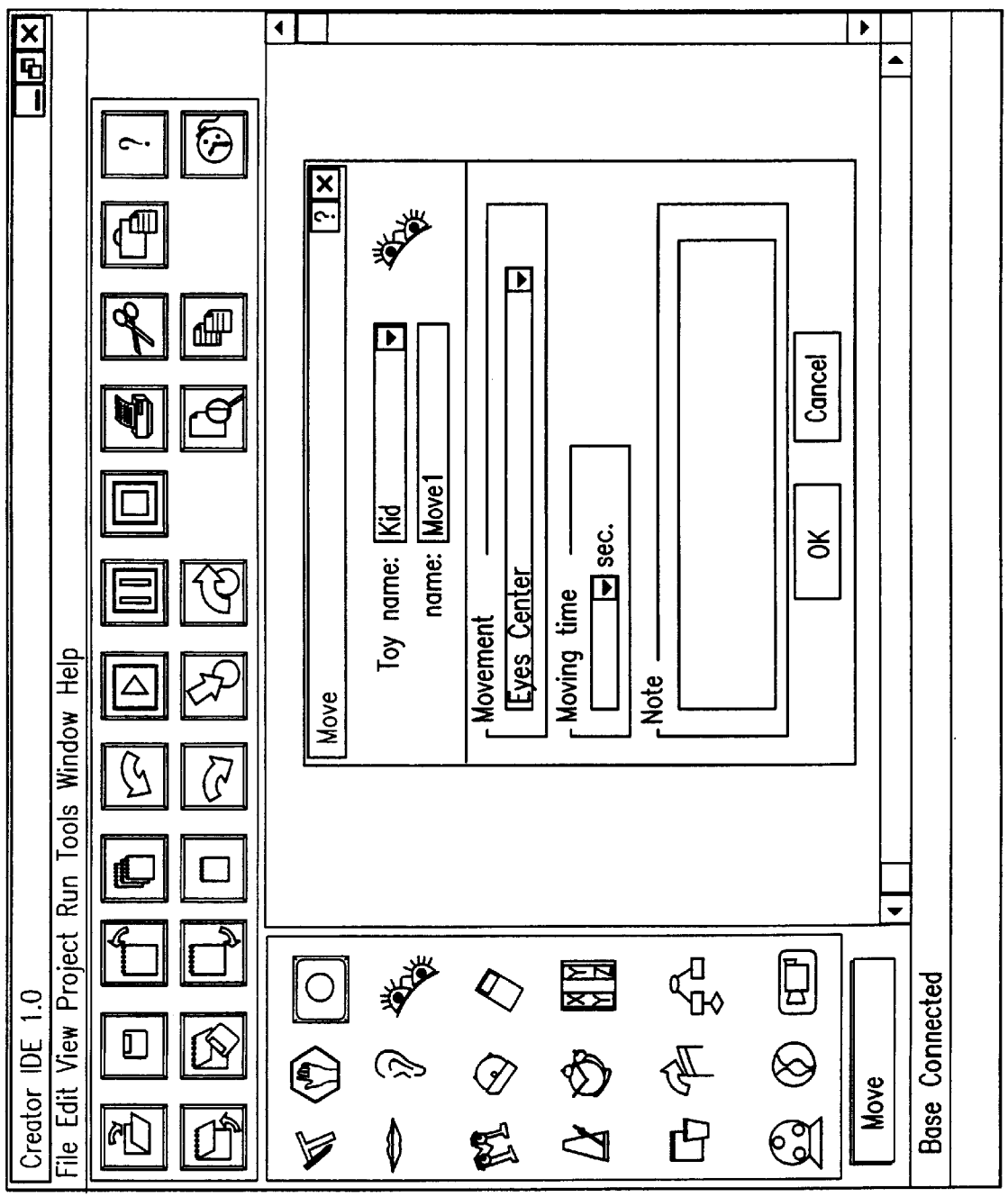
FIG. 14 is a display screen showing fields via which properties of a selected MOVE script component may be defined.

FIG. 14 is a display screen showing fields via which properties of a selected MOVE script component may be defined.

Figure 15:
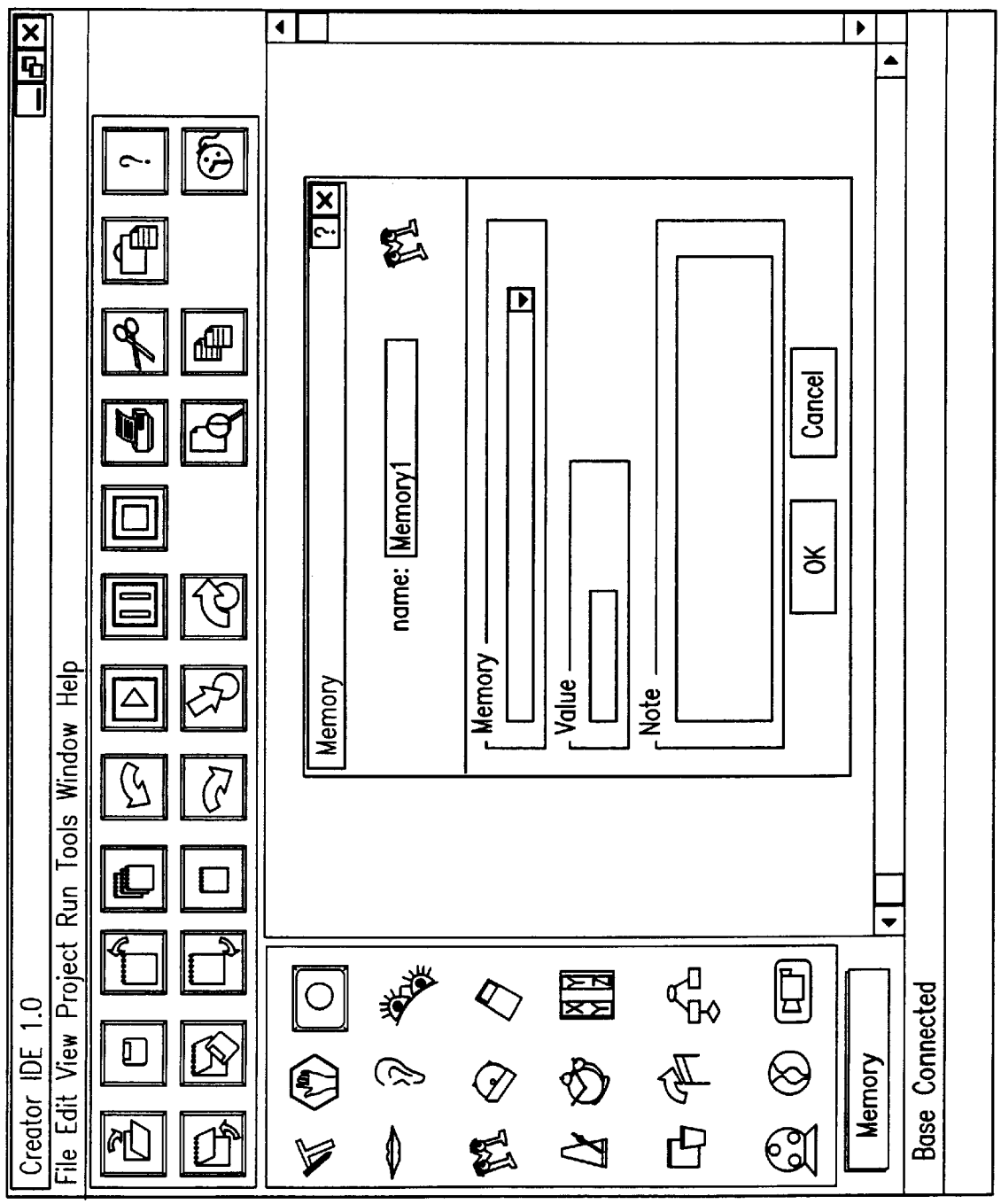
FIG. 15 is a display screen showing fields via which properties of a selected LOCAL MEMORY script component may be defined.

FIG. 15 is a display screen showing fields via which properties of a selected LOCAL MEMORY script component may be defined.

Figure 16:
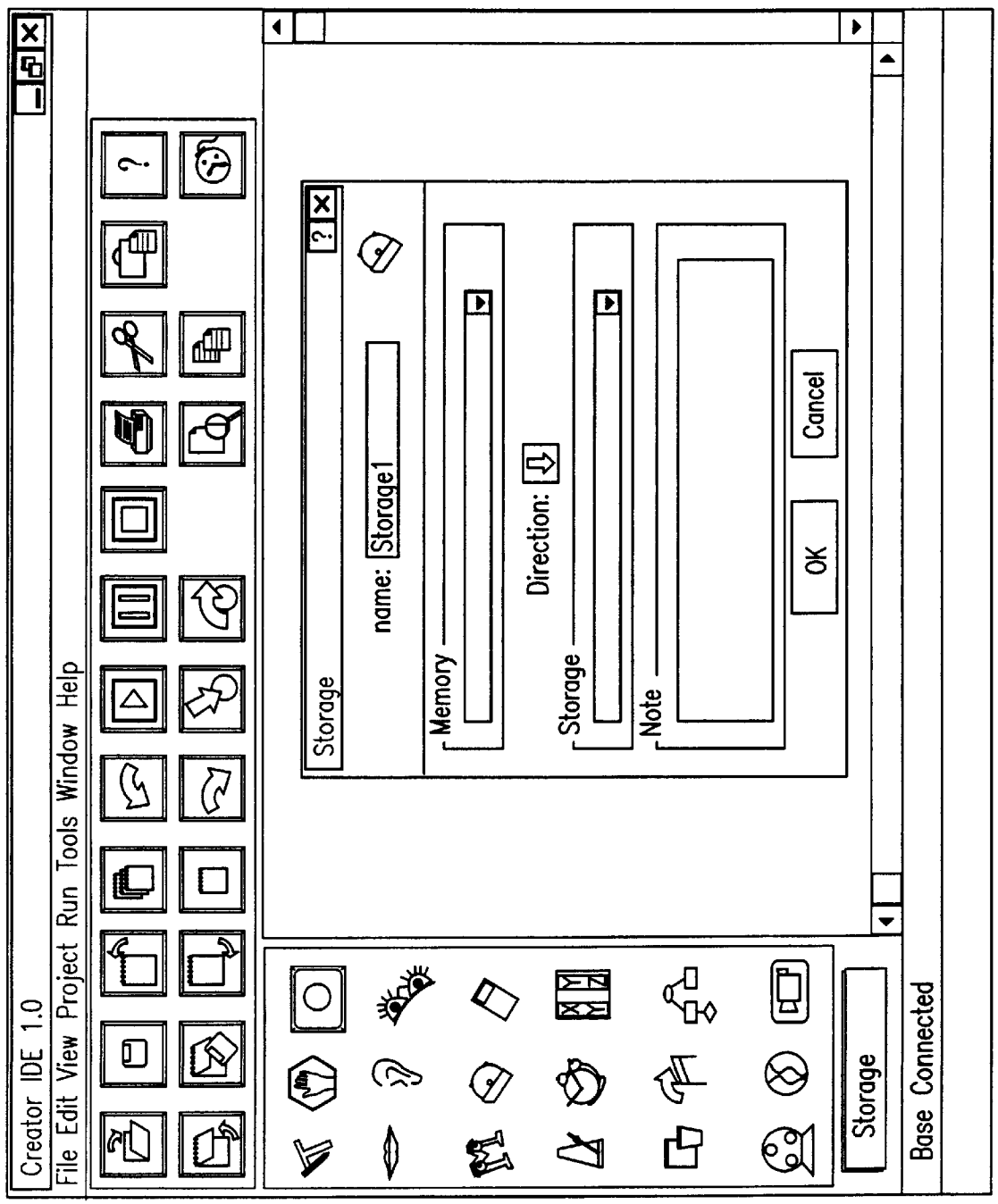
FIG. 16 is a display screen showing fields via which properties of a selected GLOBAL MEMORY (STORAGE) script component may be defined.

FIG. 16 is a display screen showing fields via which properties of a selected GLOBAL MEMORY (STORAGE) script component may be defined.

Figure 17:
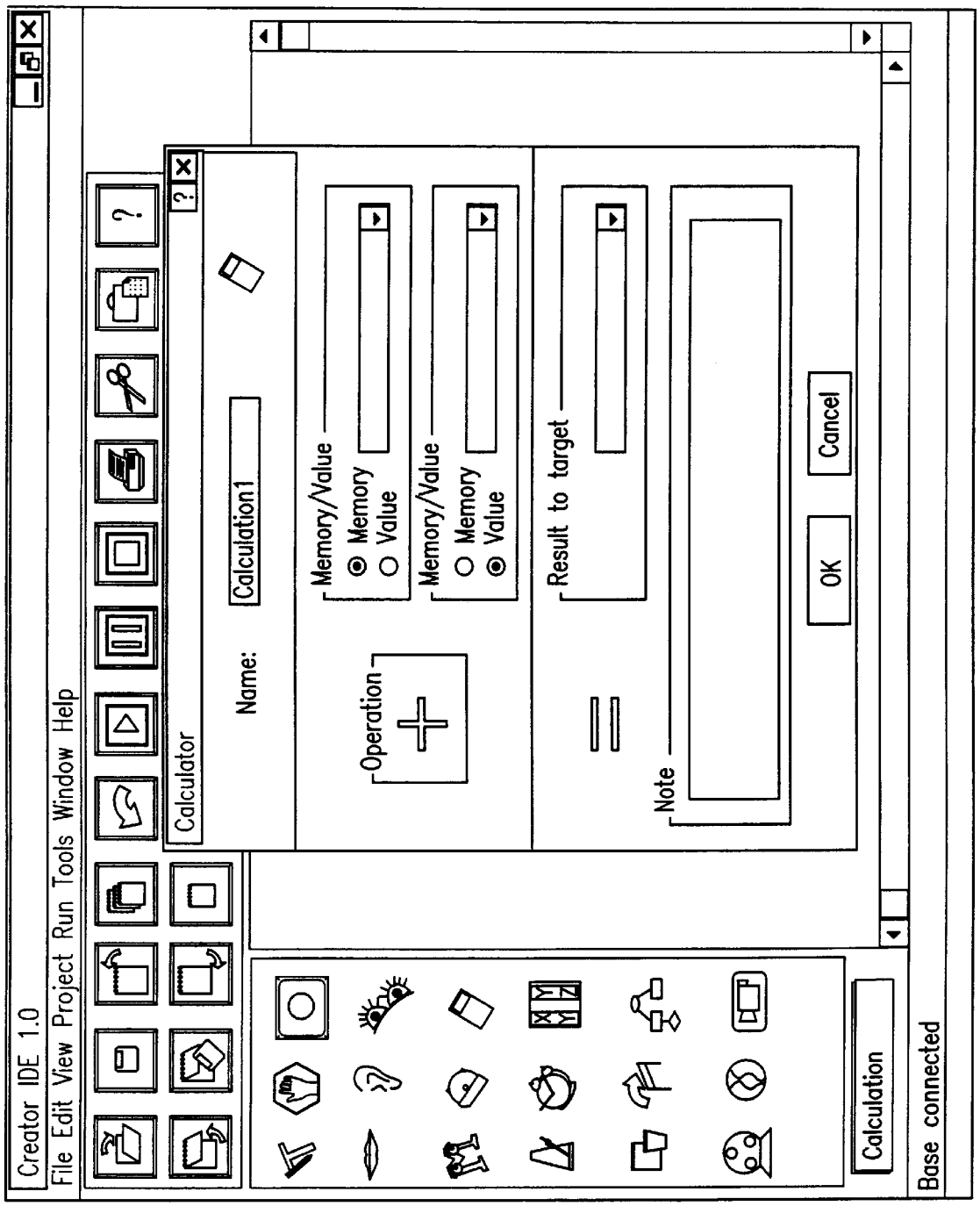
FIG. 17 is a display screen showing fields via which properties of a selected CALCULATE script component may be defined.

FIG. 17 is a display screen showing fields via which properties of a selected CALCULATE script component may be defined.

Figure 18:
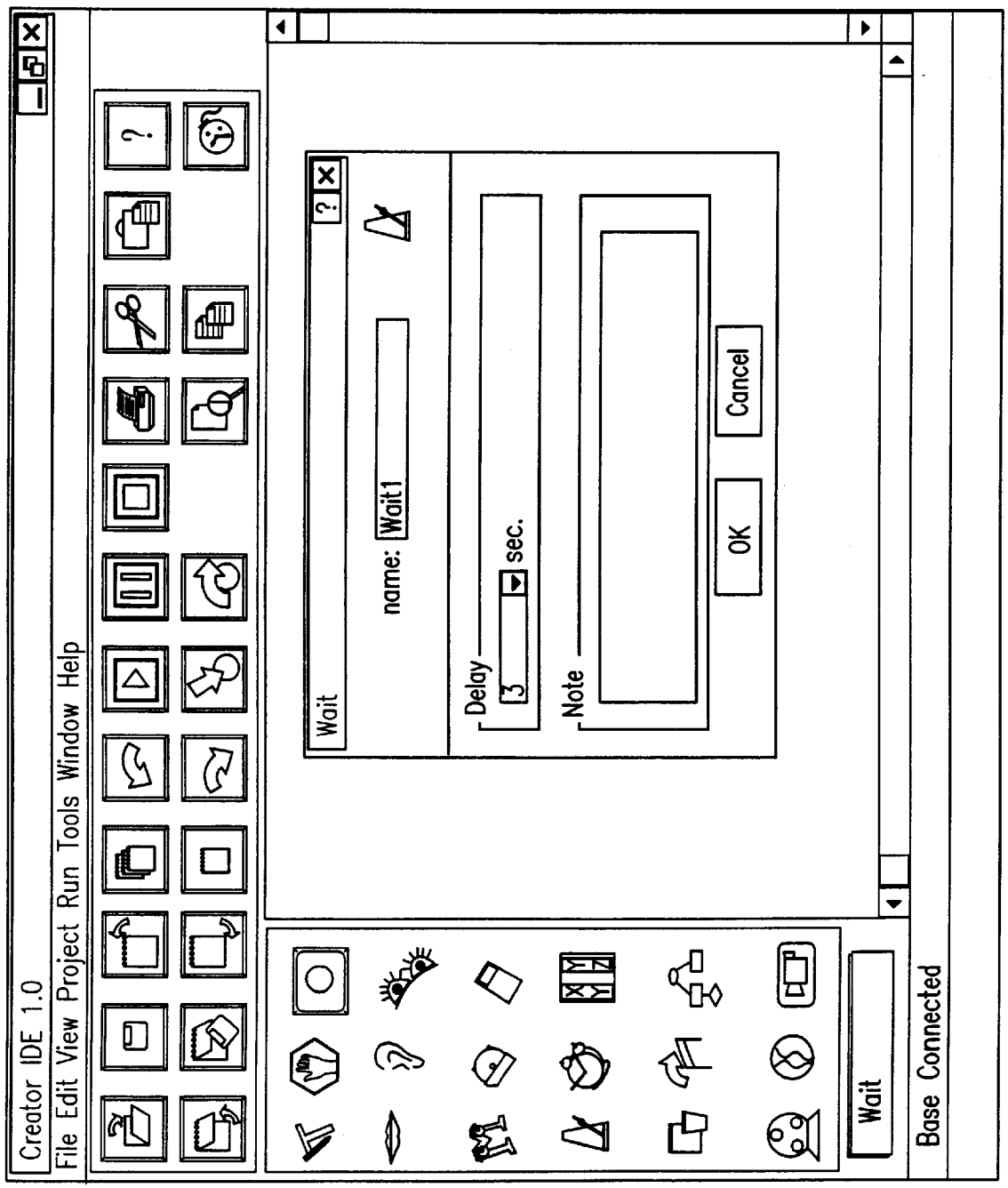
FIG. 18 is a display screen showing fields via which properties of a selected WAIT script component may be defined.

FIG. 18 is a display screen showing fields via which properties of a selected WAIT script component may be defined.

Figure 19:
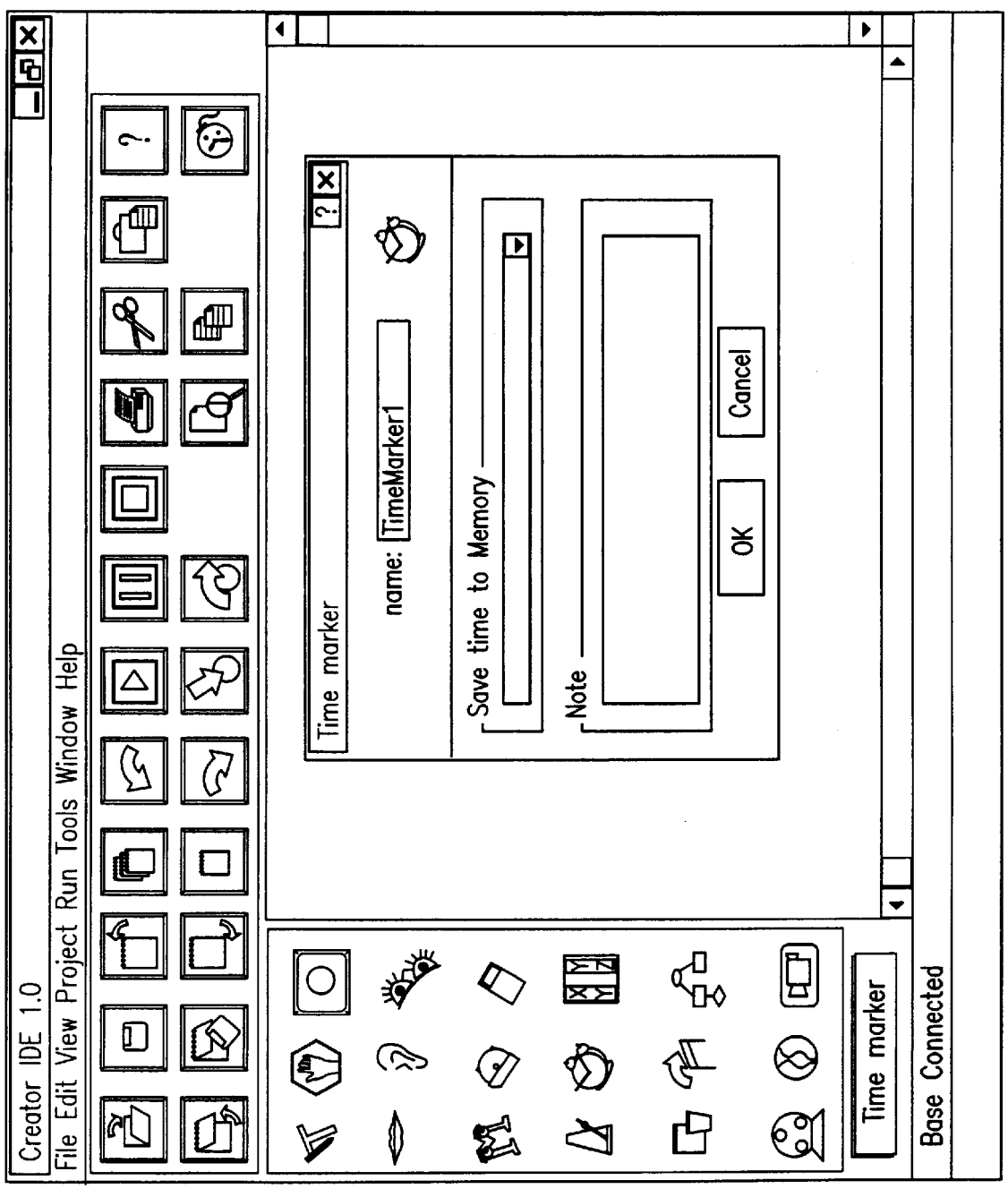
FIG. 19 is a display screen showing fields via which properties of a selected TIME MARKER script component may be defined.

FIG. 19 is a display screen showing fields via which properties of a selected TIME MARKER script component may be defined.

Figure 20:
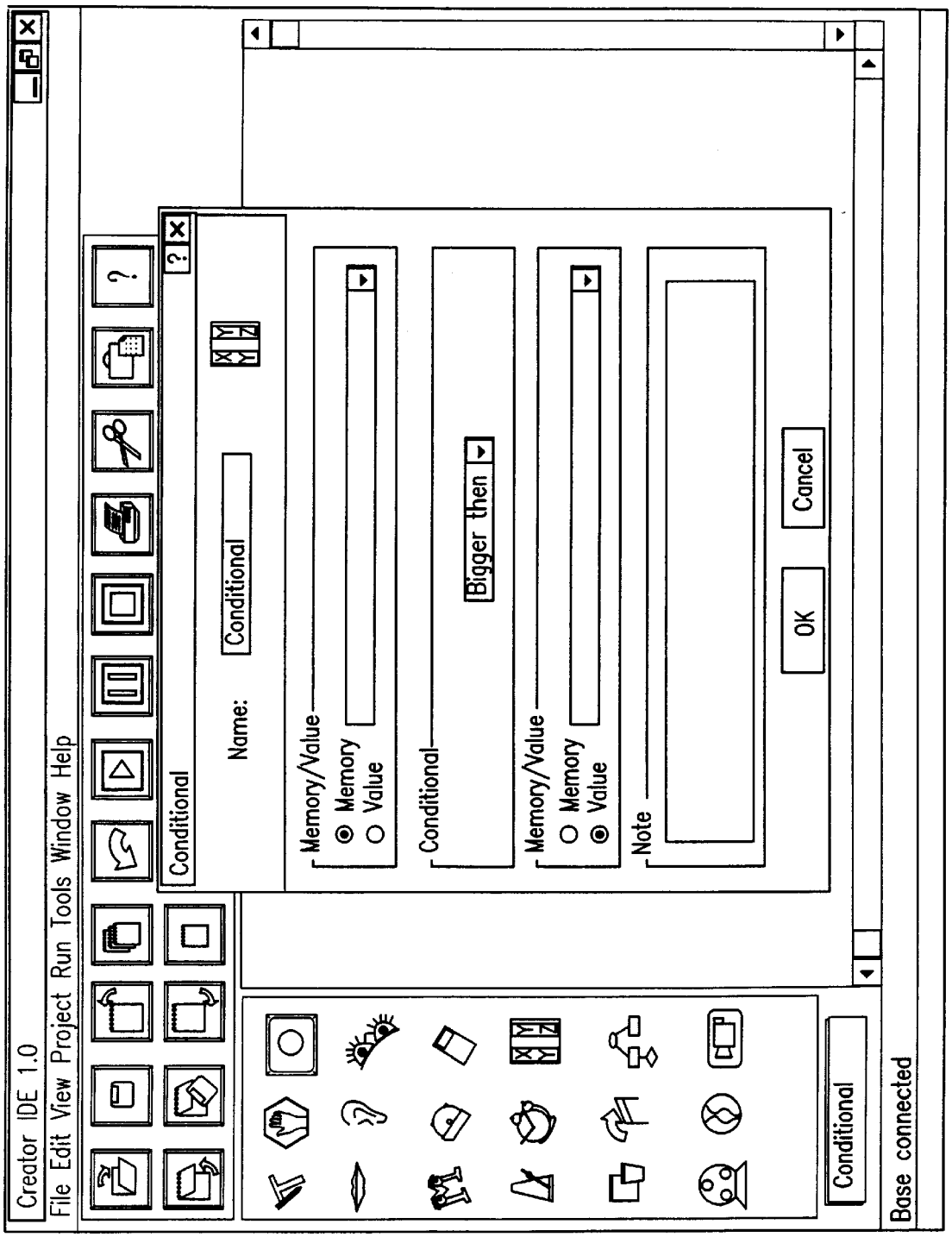
FIG. 20 is a display screen showing fields via which properties of a selected BOOLEAN (CONDITION) script component may be defined.

FIG. 20 is a display screen showing fields via which properties of a selected BOOLEAN (CONDITION) script component may be defined.

Figure 21:
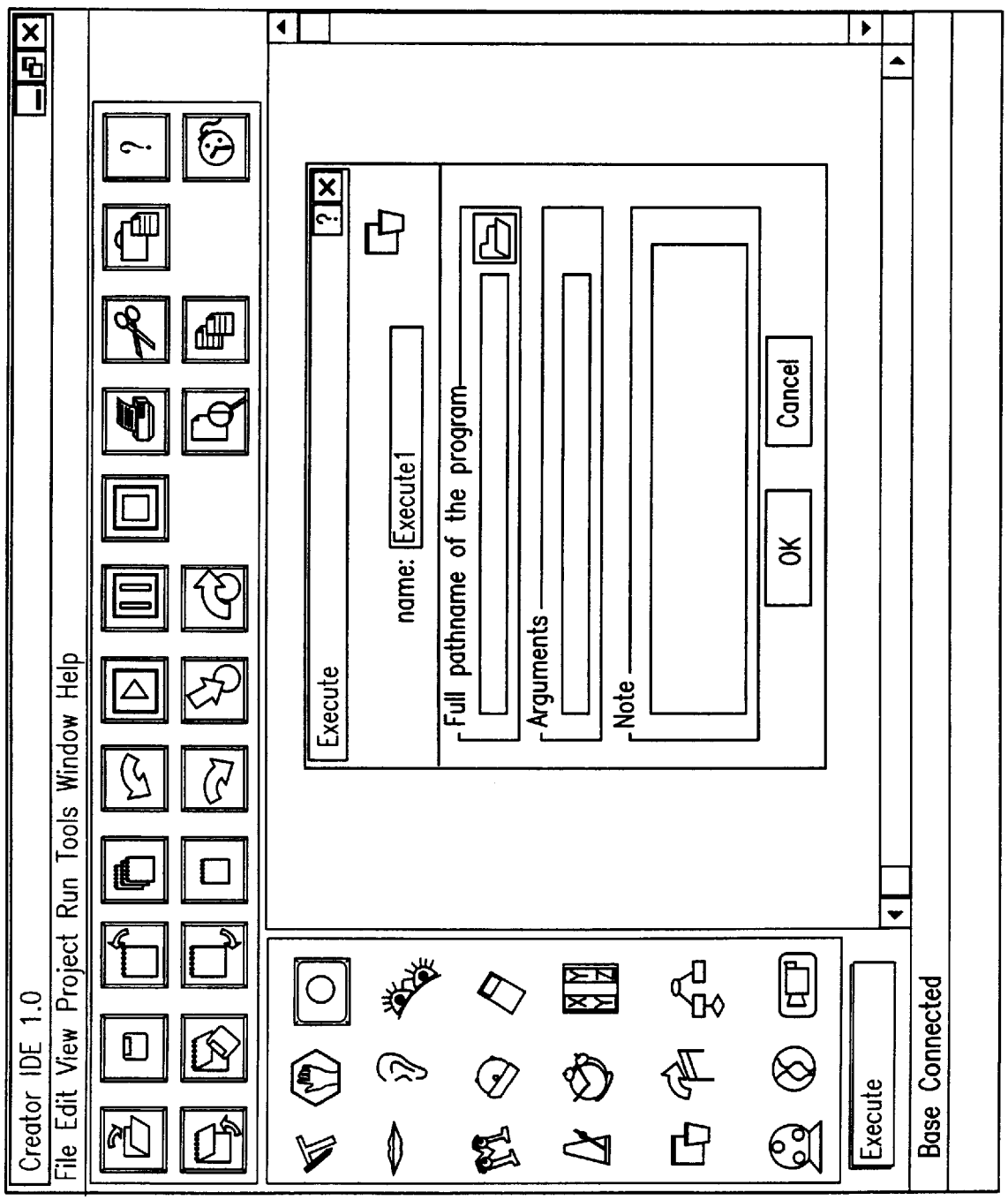
FIG. 21 is a display screen showing fields via which properties of a selected EXECUTE script component may be defined.

FIG. 21 is a display screen showing fields via which properties of a selected EXECUTE script component may be defined.

Figure 22:
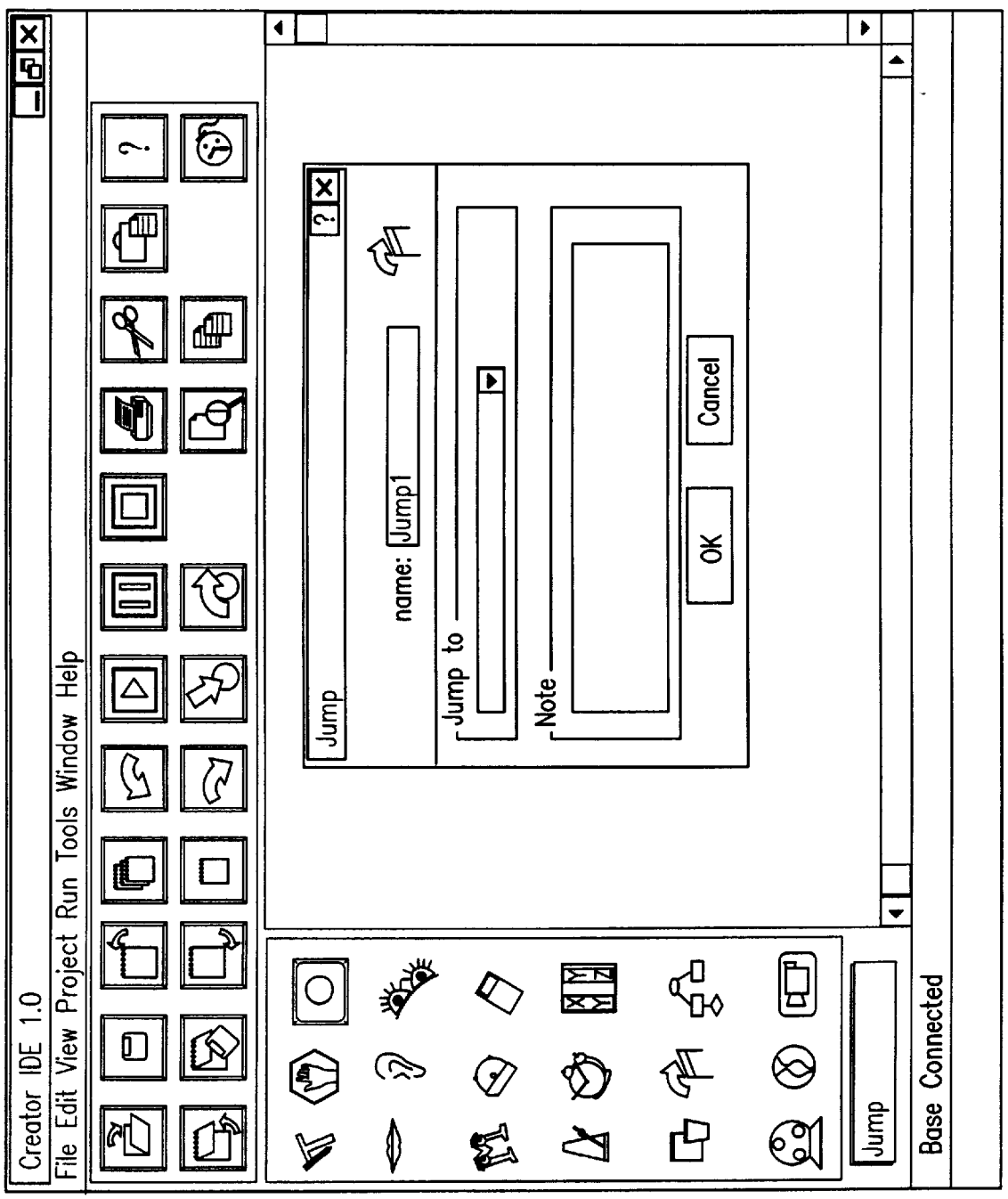
FIG. 22 is a display screen showing fields via which properties of a selected GOTO (JUMP) script component may be defined.

FIG. 22 is a display screen showing fields via which properties of a selected GOTO (JUMP) script component may be defined.

Figure 23:
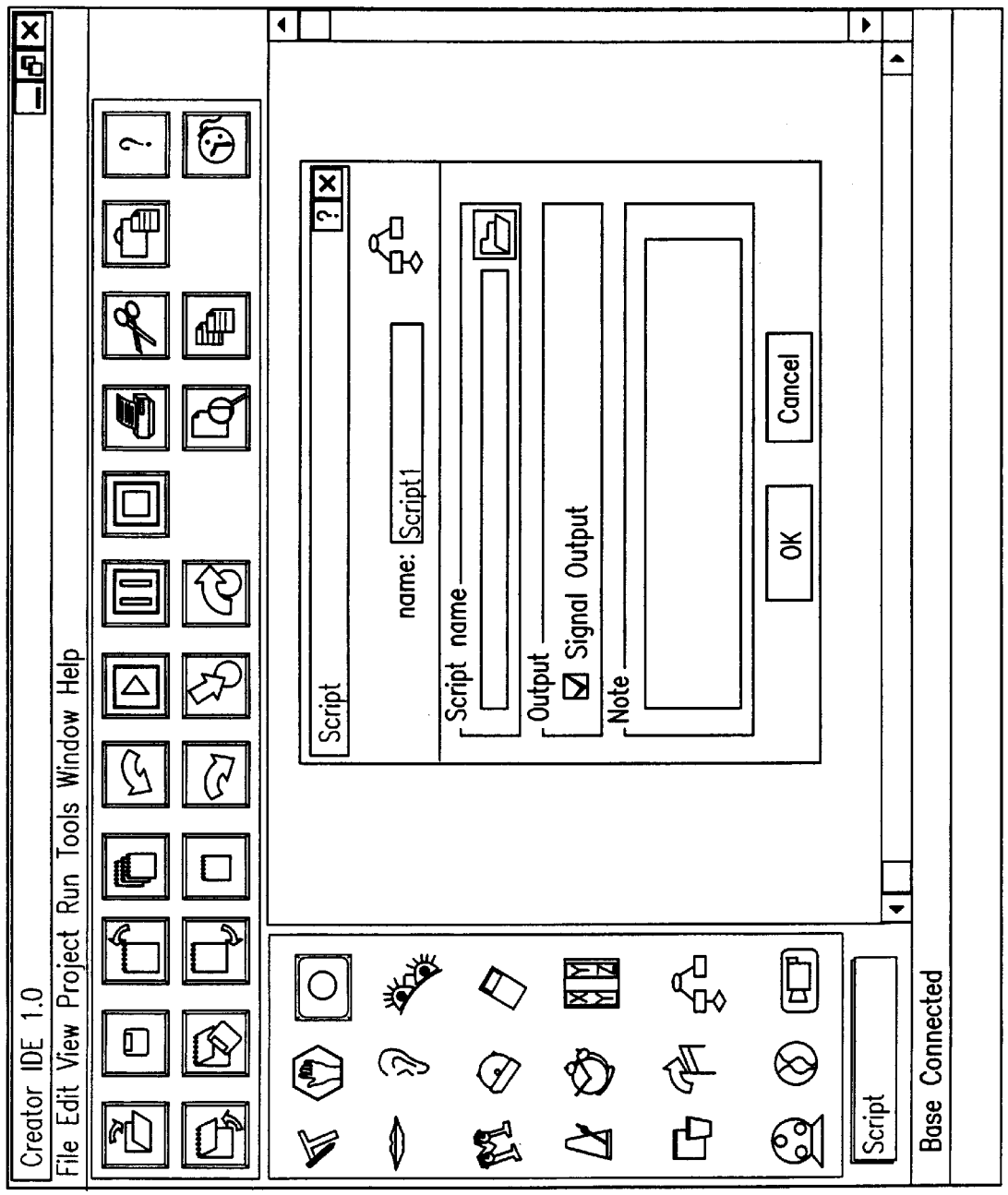
FIG. 23 is a display screen showing fields via which properties of a selected CALL SCRIPT script component may be defined.

FIG. 23 is a display screen showing fields via which properties of a selected CALL SCRIPT script component may be defined.

Figure 24:
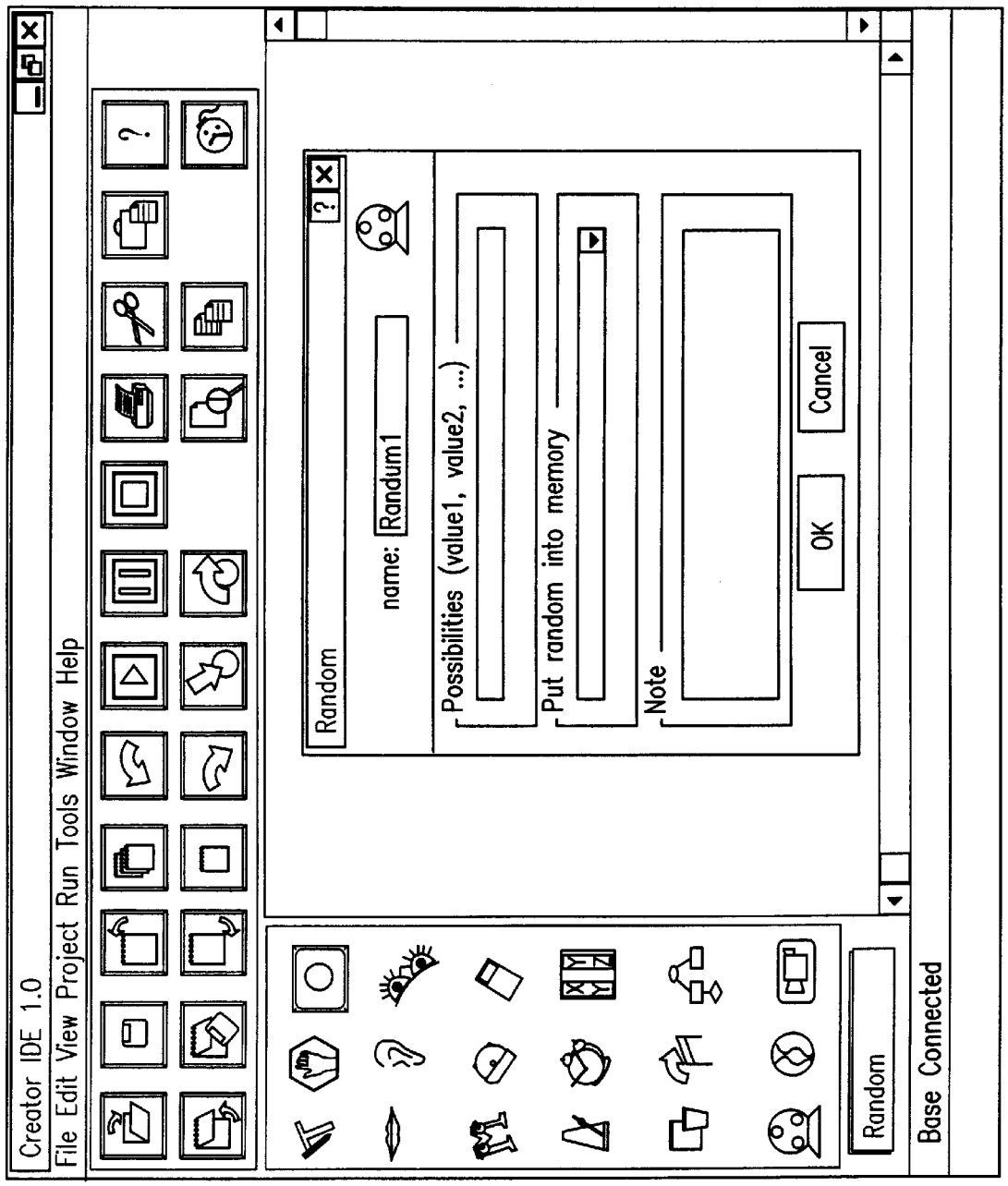
FIG. 24 is a display screen showing fields via which properties of a selected RANDOM script component may be defined.

FIG. 24 is a display screen showing fields via which properties of a selected RANDOM script component may be defined.

Figure 25:
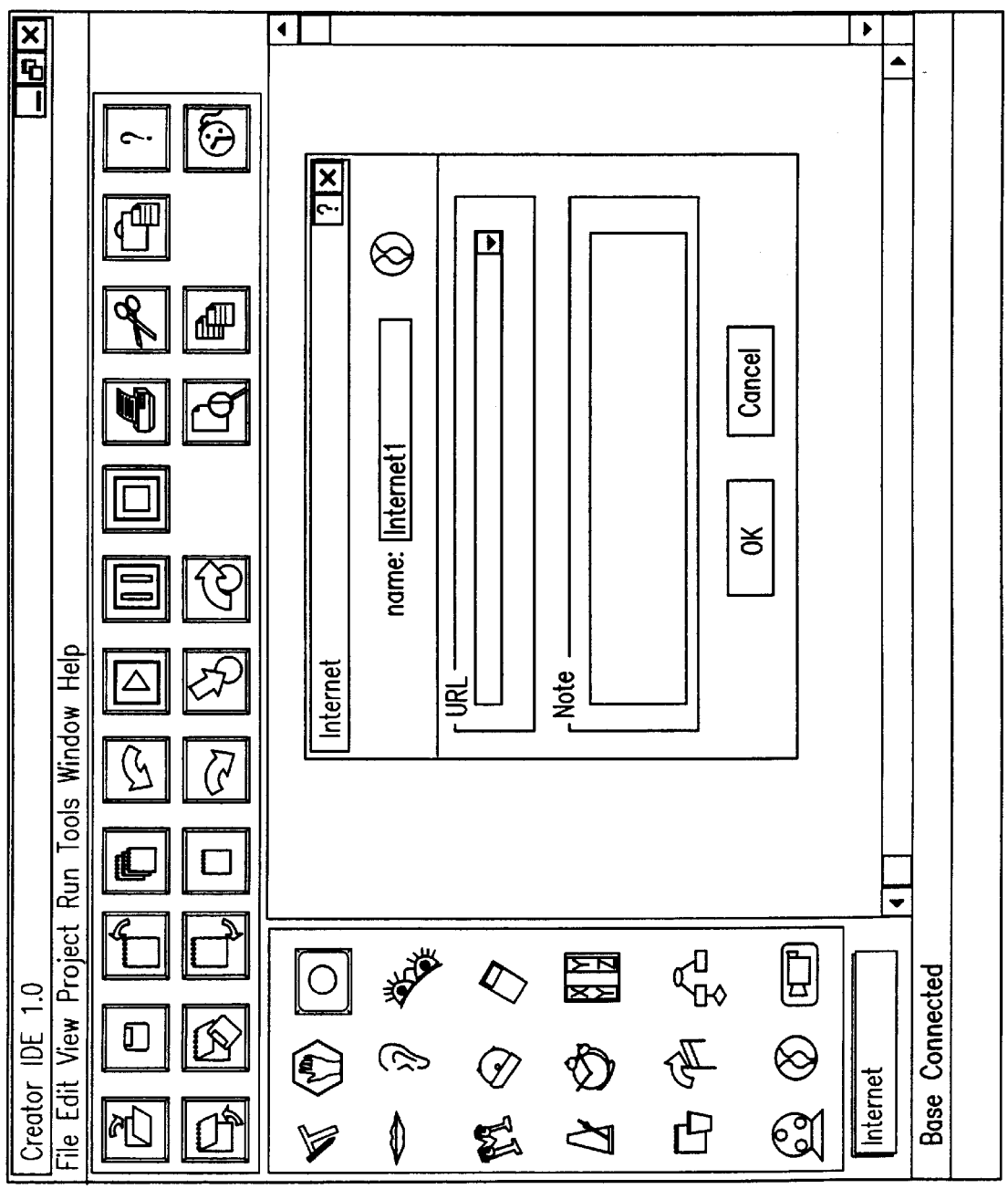
FIG. 25 is a display screen showing fields via which properties of a selected INTERNET script component may be defined.

FIG. 25 is a display screen showing fields via which properties of a selected INTERNET script component may be defined.

Figure 26:
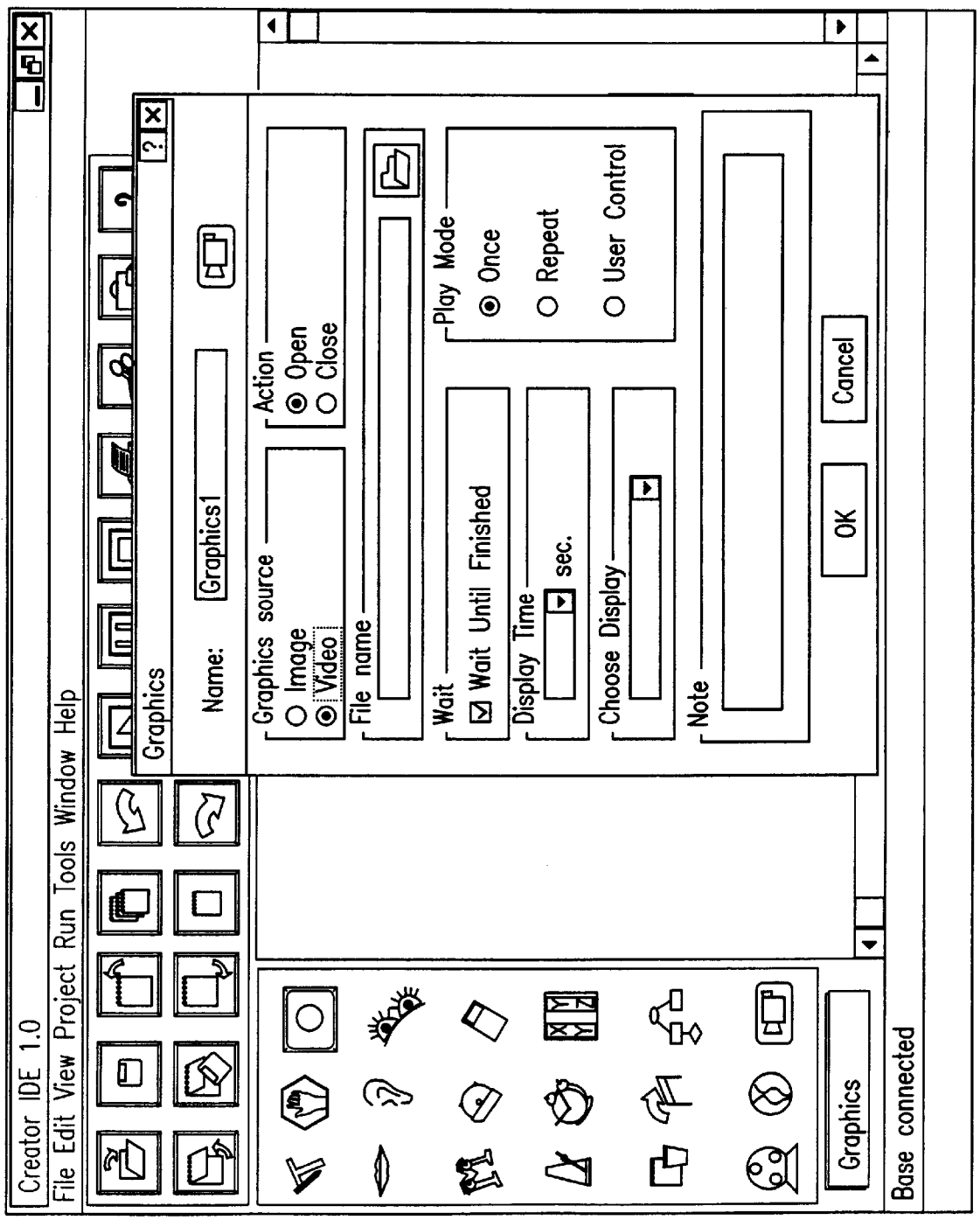
FIG. 26 is a display screen showing fields via which properties of a selected GRAPHICS script component may be defined.

FIG. 26 is a display screen showing fields via which properties of a selected GRAPHICS script component may be defined.

Figure 27:
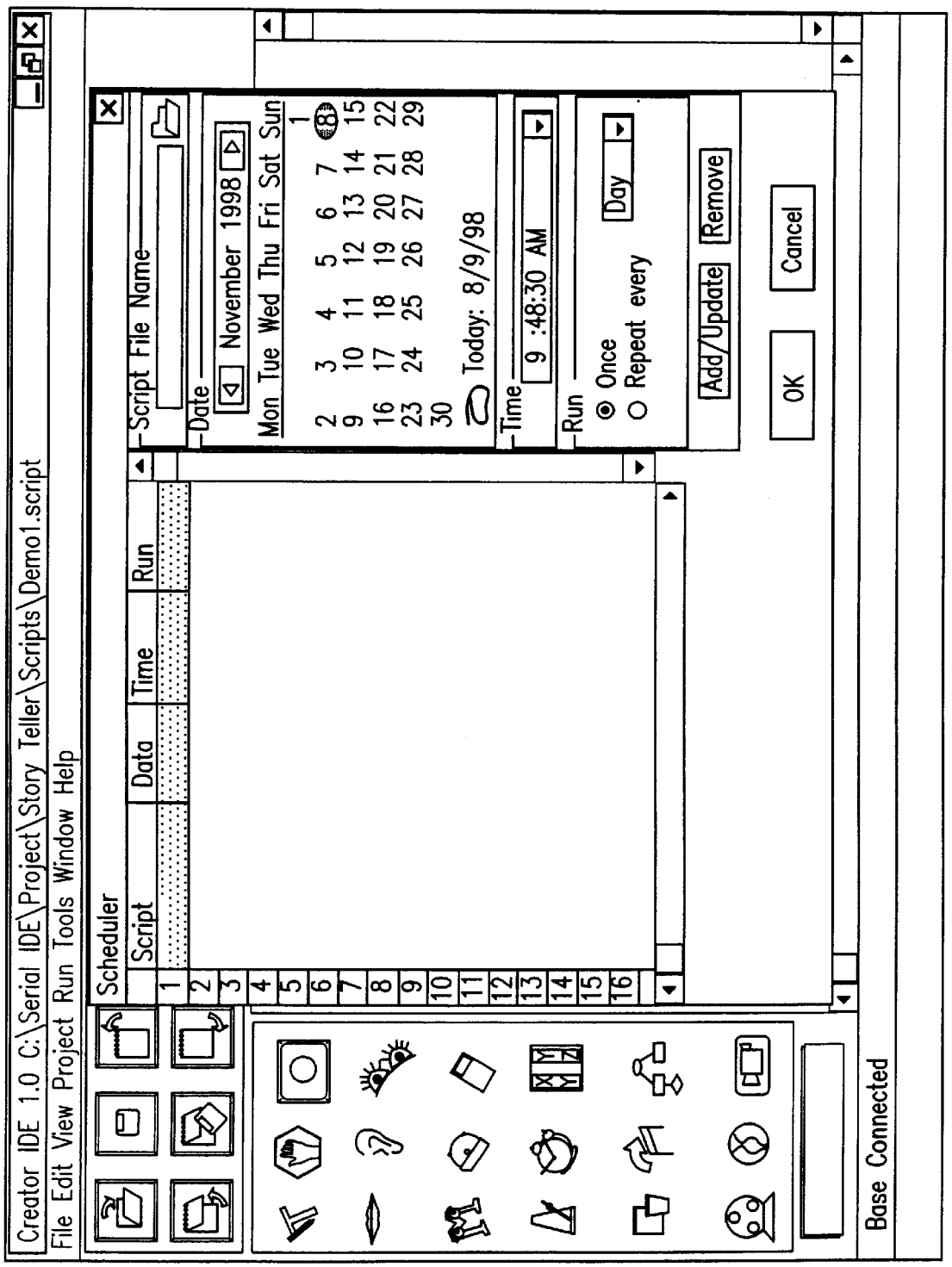
FIG. 27 is a display screen showing fields via which a script creator may define properties of a SCHEDULER option, selected by means of a Scheduler control button in control button array 20.

FIG. 27 is a display screen showing fields via which a script creator may define properties of a SCHEDULER option, selected by means of a Scheduler control button in control button array 20. As shown, the properties of the scheduler typically comprise a selection of at least one script, identified by file name, to be executed and a corresponding selection of dates and times at which the script/s are to be implemented.

Figure 28:
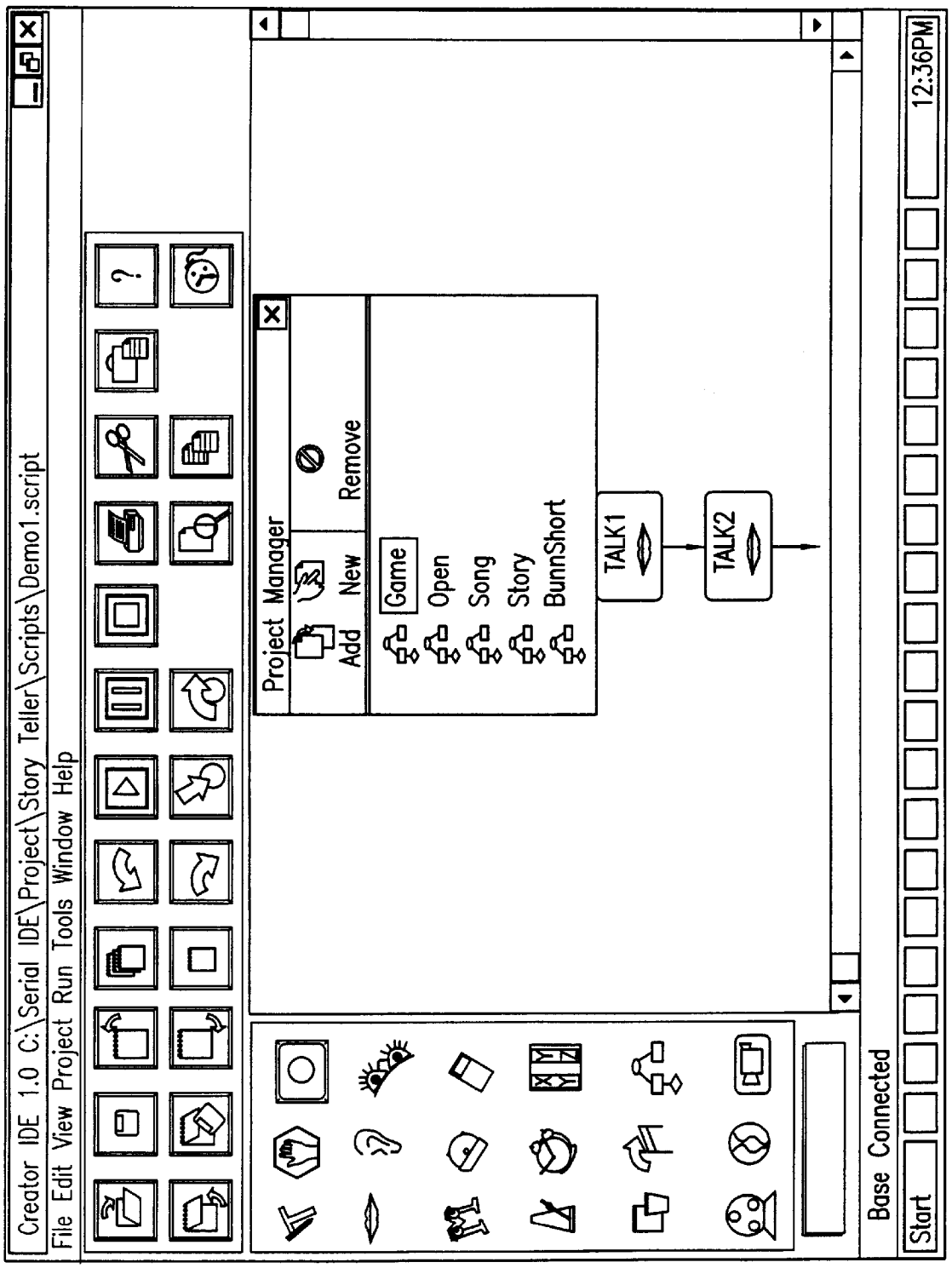
FIG. 28 is a display screen of a Project Manager option which may for example be selected by pushing a manager button located hierarchically below the Project command in the command bar 10.

FIG. 28 is a display screen of a Project Manager option which may for example be selected by pushing a manager button located hierarchically below the Project command in the command bar 10. The Project Manager provides a list of all scripts and means of adding new scripts and removing old ones.

Figure 29:
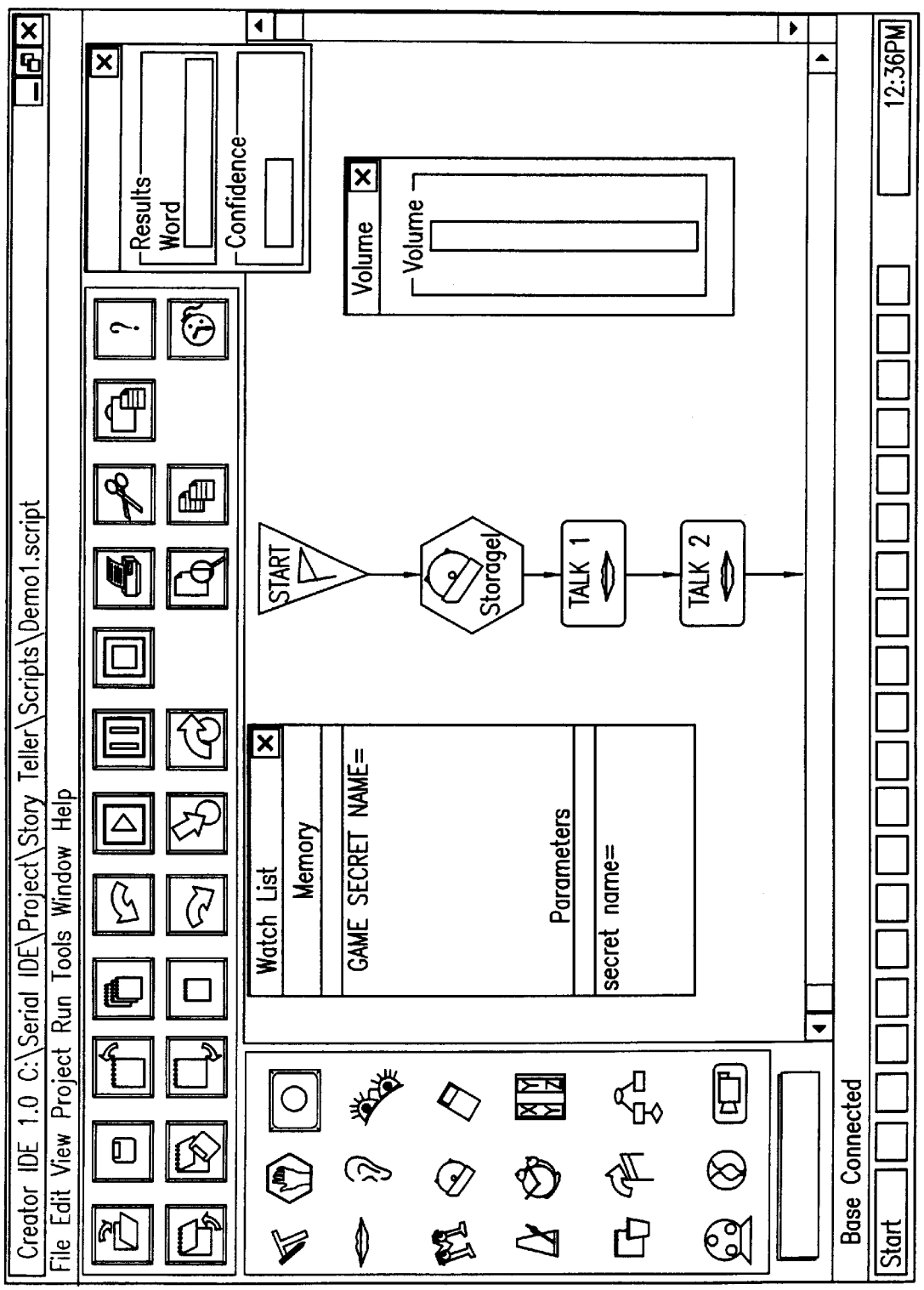
FIG. 29 is a display screen which is typically generated during run time of a script, responsive to a command from a script creator who wishes to monitor the operation of the toys executing the script.

FIG. 29 is a display screen which is typically generated during run time of a script, responsive to a command from a script creator who wishes to monitor the operation of the toys executing the script. The display screen of FIG. 29 preferably includes at least the following information:

a. The volume of the verbal interaction or sound;
b. An indication of words spotted by the speech recognition function and the level of confidence thereof;
c. A list of memory fields with their values.

FIGS. 30A–30B, taken together, form a flowchart illustration of a main script for operating a toy called Storyteller, constructed and operative in accordance with a preferred embodiment of the present invention, the flowchart illustration being suitable for display in the work area of the display screen of FIG. 1. The main script of FIGS. 30A–30B calls three other scripts, namely Game, Song and Story. The Storyteller toy is defined in Appendix D.

A description of the main script illustrated in FIGS. 30A–30B is as follows, where each paragraph is a description of an individual object:

Startl(Start): Starting point for execution.

CurrentTime(TimeMarker): Sets memory cell <CurrentTime> with the current date and time.

Memory():

Condition1(Condition): Follow the true branch if the value of memory cell <CURRENTTIME> is greater than "04:00:00 PM", or the false branch, otherwise.

Condition2(Condition): Follow the true branch if the value of memory cell <CURRENTTIME> is smaller than "11:59:00 AM", or the false branch, otherwise.

Talk_Evening(Talk): Play WAV file F:\Creator\storyteller\Audio\Op025m.wav using the computer's sound card.

Talk_morning(Talk): Play WAV file F:\Creator\storyteller\Audio\Op015m.wav using the computer's sound card.

Talk_afternoon(Talk): Play WAV file F:\Creator\storyteller\Audio\Op020m.wav using the computer's sound card.

ListenAndSense1(ListenAndSense): Listens for one of the keywords (rainbow,bubble gum) for 5 seconds and put the result in memory cell <SET SECRET NAME>.

Welcome rainbow(Talk): Play WAV file F:\Creator\storyteller\Audio\Op045m.wav using the computer's sound card.

Welcome bubble gum(Talk): Play WAV file F:\Creator\storyteller\Audio\Op050m.wav using the computer's sound card.

Welcome default(Talk): Play WAV file F:\Creator\storyteller\Audio\Op036m.wav using the computer's sound card.

ListenAndSense2(ListenAndSense): Listens for one of the keywords (story,game,song) for 5 seconds.

Talk7(Talk): Play WAV file F:\Creator\storyteller\Audio\Op060.wav using the computer's sound card.

Script_story(Script): Runs the "C:\Serial IDE Storyteller\StoryTeller\Scripts\story.script" script.

Script_game(Script): Runs the "C:\Serial IDE Storyteller\StoryTeller\Scripts\story.game" script.

Script_song(Script): Runs the "C:\Serial IDE Storyteller\StoryTeller\Scripts\song.script" script.

ListenAndSense3(ListenAndSense): Listens for one of the keywords (story,game,song) for 5 seconds.

Wait1(Wait): Does nothing.

Storage1(Storage): Sets global storage cell "secret name" to the same value as memory cell <SET SECRET NAME>.

Memory1(Memory): Sets memory cell <SET SECRET NAME> to "rainbow".

Condition secret name(Condition): Follow the true branch if the value of memory cell <SET SECRET NAME> is equal to "rainbow", or the false branch, otherwise.

Jump1(Jump): Execution continues at node "Welcome rainbow".

Jump2(Jump): Execution continues at node "Welcome bubble gum".

Wait2(Wait): Does nothing.

Wait3(Wait): Does nothing.

FIGS. 31A–31B, taken together, form a flowchart illustration of the Game script called by the main script of FIGS. 30A–30B, the flowchart illustration being suitable for display in the work area of the display screen of FIG. 1.

FIGS. 32A–32B, taken together, form a flowchart illustration of the Song script called by the main script of FIGS. 30A–30B, the flowchart illustration being suitable for display in the work area of the display screen of FIG. 1.

FIGS. 33A–33B, taken together, form a flowchart illustration of the Story script called by the main script of FIGS. 30A–30B, the flowchart illustration being suitable for display in the work area of the display screen of FIG. 1.

Appendix A is a computer listing, written in Delphi, of a software implementation of a toy definition and testing tool constructed and operative in accordance with a preferred embodiment of the present invention.

Appendix B is a computer listing, written in Delphi, of a software implementation of an interactive script development system constructed and operative in accordance with a preferred embodiment of the present invention and suitable for execution on a Personal Computer equipped with a Windows '95 or Windows '98 operating system and with Addflow software, commercially available from Patrick Lassalle, Lassalle Technologies, 247 Ave du Marechal, Juin 92100, Boulogne, France.

Appendix C is an output file of the tool of Appendix A, readable by Appendix B, and representing a first toy called Johnny.

Appendix D is an output file of the tool of Appendix A, readable by Appendix B, and representing a second toy called Storyteller.

A preferred method for using the system of the present invention to create a script and to subsequently manipulate toys in accordance with that script, is now described.

a. Develop computer controlled toys having talking capacity and/or motion capacity and/or listening capacity. Preferred computer controlled toys and techniques for making toys are described in the Gabai et. al. Patent documents mentioned in the Background section and also in the following U.S. patent applications Ser. Nos. to Gabai et. al.: 09/081,889; 09/062,502; 09/062,547; 09/062,500; 09/062,499; 09/062,579; and 09/081,255.

Operatively associate the toys, initially with a workstation (for the purposes of steps (c) and (d) below) and subsequently with a suitable personal computer such as a home personal computer (for the purposes of step (e) below).

b. Define the above toys using the program of Appendix A running on the workstation which may also comprise a personal computer.

c. Use the program of Appendix B on the workstation to generate a script file and executable file representing a desired script to be executed by the personal computer in conjunction with the toys.

d. While the toys are operatively associated with the workstation, run the script file on the workstation to test whether the toys are programmed as desired.

e. While the toys are operatively associated with the personal computer, run the executable file on the personal computer to manipulate the toys in accordance with the desired script.

A preferred method for performing step (b), using the program of Appendix A, is as follows:

Battery, Identify Record, and Help Icons

Several icons appear at the top of the System Test screen: battery icon (under certain conditions), toy icon, base station icon, Record button, and Help icon.

Battery icon: Appears and flashes when the base station detects that a Living Toy's batteries are low.

Toy icon: Searches for a Living Toy. When a toy is not found, a red "X" appears over the icon. When a toy is found, the toy's number is entered automatically in the Toy Number field and the system detects and notes the communications channel in use by the toy.

To search for a toy and its channel:

1. Delete the value that appears in the Toy Number field.
2. Click on the Toy icon.
3. The PC automatically searches for a connected toy. When it finds a toy, the toy emits a beeping noise and the toy's number appears in the Toy Number field. The system registers the RF channel on which the toy is communicating. The system is now able to communicate with the toy.
4. After the system locates a toy, the red "X" that covered the Toy icon disappears.
5. To find another toy, repeat from Step 1.

Base station icon: Searches for a connected base station. When a base station is not found, a red "X" appears over the icon. After the system locates the base station, the red "X" that covered the Base Station goes away.

Record button: Opens the default recording program that resides on your computer. You use this program to record and save WAV files for use in your system test activities. When you are recording, make sure you set the recording properties of the program as follows: 8 KHz ; m-Law or 16 bits ; mono Toy Number: Enter here the number assigned to the toy you are using. (You will find the number on the back of the toy.) OR: Delete the value that appears in this field and click on the Toy icon. The system will perform an automatic search for the toy number and the RF channel at which it is communicating, and will enter this toy number in the Toy Number field. See Toy icon, above.

Test icons

Three test icons appear at the top left of the System Test screen: a toy icon, a PC icon, and a Stop sign icon.

Toy icon: Runs the selected function through the toy.

PC icon: Runs the selected function through the PC.

Stop sign icon: Stops function that is currently running.

Function buttons

A column of buttons appear along the left side of the System Test screen. You use these buttons to perform the different functions that make up the system test.

Talk: Tests the toy's ability to speak. You need to select a WAV file or enter text in the Text-to-Speech box, fill in the other values on the screen, and run the test through the toy or the PC.

Listen: Tests the toy's ability to recognize an answer. You need to specify the words you want the toy to recognize, run the test through the toy or PC, state the words, and view the results.

Dialog: Tests the toy's ability to talk, wait for an answer, and recognize the answer. You need to specify what the toy will say and recognize, run the test through the toy or PC, state the words, and view the results.

Move: Tests the toy's ability to move. You need to specify the kind of movement you want the toy to make and run the test through the toy or PC.

Sense: Tests the toy's sensors. You need to define the source of output for the test (the toy or the simulation), press on a sensor on the toy itself or on an onscreen simulation of the toy, and view the results.

Record: Enables the toy to record the user and then tests the recording. You need to specify the name of the file, record the speech, and test the recording by playing it back via the toy or PC.

Hardware: Tests various hardware components that make up your Living Toy system.

Script: Lets you build and test a script, using graphical objects.

Setting: Lets you modify and add descriptions to the sensor and movement lists. You then use your customized list when assigning sensors and/or movements to the toy, in the Talk, Dialog, Move, and Sense pages.

Other: Several features at the bottom of the screen assist you during the testing process.

Events window (long white box at bottom of screen): Displays ongoing chronology of events during each test. Refer to this window to see if a test is successful. Note any error messages.

Set Default: Reverts all settings to system default settings.

You: Toy defining user

Exit: Leaves the Living Toy System Test and returns to your desktop.

Reference is now made to FIGS. 34–46 which are typical screen displays generated during toy definition and testing.

FIG. 34 is a screen display of a main toy definition and testing menu.

FIG. 35 is a screen display which is displayed to a toy defining user responsive to selection by the toy defining user of the Talk option in the main menu of FIG. 34.

FIG. 36 is a screen display which is displayed to a toy defining user responsive to selection by the toy defining user of the Listen option in the main menu of FIG. 34.

FIG. 37 is a screen display which is displayed to a toy defining user responsive to selection by the toy defining user of the Dialog option in the main menu of FIG. 34.

FIG. 38 is a screen display which is displayed to a toy defining user responsive to selection by the toy defining user of the Move option in the main menu of FIG. 34.

FIG. 39 is a screen display which is displayed to a toy defining user responsive to selection by the toy defining user of the Sense option in the main menu of FIG. 34.

FIG. 40 is a screen display which is displayed to a toy defining user responsive to selection by the toy defining user of the Record option in the main menu of FIG. 34.

FIG. 41 is a screen display which is displayed to a toy defining user responsive to selection by the toy defining user of the Hardware option in the main menu of FIG. 34.

FIG. 42 is a screen display which is displayed to a toy defining user responsive to selection by the toy defining user of the More option in the menu of FIG. 41.

FIG. 43 is a screen display which is displayed to a toy defining user responsive to selection by the toy defining user of the Script option in the main menu of FIG. 34.

FIG. 44 is a screen display which is displayed to a toy defining user response to selection by the toy defining user of the Listen screen object in the screen display of FIG. 43.

FIG. 45 is a screen display which is displayed to a toy defining user response to selection by the toy defining user of the Talk screen object in the screen display of FIG. 43.

FIG. 46 is a screen display which is displayed to a toy defining user responsive to selection by the toy defining user of the Setting option in the main menu of FIG. 34.

Reference is now made to FIG. 47 which is a screen display which is displayed to a toy defining user who seeks to combine a plurality of interconnected script elements each representing an action performable by the toy. The system is operative to generate an integrated command, for transmission to the toy, which command combines at least two adjacent or successive script elements. In FIG. 47, the toy defining user has selected, by outlining, two (or more) adjacent script elements, namely Talk (50) and Listen&Sense (60). The user then selects a Combine function (under the Tool menu in the illustrated embodiment), responsive to which the system generates a single command integrating both script elements. It is advantageous to combine a Talk operation, prompting a human player to make an oral response, and the subsequent Listen&Sense operation which is intended to pick up that oral response, because otherwise, the oral response may occur before the Listen&Sense operation has been actuated, due to the time required for the system to complete the Talk operation and subsequently initiate the Listen&Sense operation.

Another example of operations which are advantageously combined is a Talk operation and a motion operation simulating the mechanics of talking, such as a Move Lips operation. These operations are advantageously combined because it is desired that the motion occur substantially simultaneously with the emission of speech.

An example of operations which are advantageously combined although they are not adjacent, is two or more operations to be performed by two or more respective toys, where it is desired that both operations be performed simultaneously. In this type of situation, selection of the two screen objects (operations) to be combined typically occurs by clicking on one of the objects and subsequently pressing SHIFT and clicking on the other object.

Reference is now made to FIG. 48 which is a semi-pictorial semi-block diagram illustration of a script development system constructed and operative in accordance with a preferred embodiment of the present invention in which the toy actuated by the script is a physical toy.

Reference is now made to FIG. 49 which is a semi-pictorial semi-block diagram illustration of a script development system constructed and operative in accordance with a preferred embodiment of the present invention in which the toy actuated by the script is a virtual toy represented on a screen display.

Reference is now made to FIG. 50 which is a pictorial illustration of a script developer running a script. As shown, progress through the script is apparent to the script developer. In FIG. 50, the virtual or physical toy is speaking and therefore the appropriate Talk operation, i.e. the current Talk operation, is highlighted.

FIG. 51 is a screen display of a time scheduler forming part of the system, according to a preferred embodiment of the present invention. The time scheduler optionally schedules an e-mail retrieval script.

FIG. 52 is a screen display of an Internet searcher constructed and operative in accordance with a preferred embodiment of the present invention. The screen display includes a representation of a script which actuates the Internet searcher. The script representation comprises a flowchart having, among other objects, Talk objects. Typically, each Talk object on the screen includes a brief title indicative of the speech content of that Talk object.

For example, the title "Keyword select" would be appropriate for a script element which prompts the user to pronounce a keyword to be searched. The title "Boolean select" would be appropriate for a script element which prompts the user to select a Boolean relationship between one or more keywords which the user has indicated that s/he desires to search. The title "Repeat" would be appropriate for a script element which prompts the user to repeat at oral selection which was not heard by the system. The title "more keywords?" would be appropriate for a script element which prompts the user to decide to continue defining keywords. The Globe screen object in the script of FIG. 52 indicates execution of an Internet search function defined previously or subsequently using the screen display of FIG. 25. The title "state results" would be appropriate for a script element presenting to the user the results of the Internet search.

It is appreciated that the apparatus of the present invention is useful for generating scripts not only for toys but also for any computer-controllable object.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A system for generating scripts having verbal content, the system comprising:
   a computer having a user input receiver operative to receive a user's definition of a script for at least one computer-controllable animated physical figure, the script including a plurality of interconnected script elements each representing an action performable by the computer-controllable animated figure, the script comprising at least one verbal script element representing a verbal action performable by the computer-controllable animated figure;
   a graphics interface operative to generate a pictorial image of the script as the script is generated by the user, the graphics interface including a drag and drop facility operative to drag and drop script elements and a flowchart generating facility, said facilities being operative to provide a flowchart of script elements including illustrated connections, having respective illustrated directions, interconnecting illustrations of each dragged and dropped script element; and
   a verbal output generator controlled by the user's definition of the script and operative to generate verbal output as defined in the script, which includes at least verbal action in response to verbal inputs received by the computer-controllable animated physical figure from a user.

2. Apparatus according to claim 1 wherein said animated figure comprises a virtual animated figure on a computer screen.

3. Apparatus according to claim 1 wherein said animated figure comprises a physical animated figure.

4. Apparatus according to claim 3 wherein the physical animated figure is wirelessly connected to the computer.

5. A system according to claim 1 wherein the computer comprises a simulator operative to simulate at least a portion of the script without utilizing the animated figure.

6. A system according to claim 5 wherein the computer comprises a computer speaker and wherein the simulator is operative to simulate speech of the animated figure by activating the computer speaker.

7. A system according to claim 5 wherein the computer comprises a computer microphone and wherein the simulator is operative to simulate reception of speech by the animated figure by activating the computer microphone.

8. A system according to claim 5 wherein the computer comprises a computer screen and a stored representation of the figure's performance of individual physical-action script elements and wherein the simulator is operative to simulate physical action of the animated figure by displaying, on the computer screen, an image of at least a portion of the figure performing the physical action.

9. A system according to claim 5 wherein the computer comprises at least one input device and wherein the simulator is operative to simulate sensing activities of the animated figure by receiving mock sensory inputs via the input device.

10. A system according to claim 1 and also comprising an Internet searcher.

11. A system according to claim 1 and also comprising a computerized scheduler operative to control the animated figure according to a user-determined schedule received by the scheduler.

12. A script definition method comprising:
   accepting a user's definition of a speech recognition script element including a designation of a plurality of keywords to be recognized; and
   providing a flowchart generation user interface operative to facilitate generation of a flowchart by a user representing a script defined by the user, the script including at least one verbal response by at least one figure to at least verbal input analyzed with speech recognition, the flowchart including a conditional flowchart element representing the speech recognition script element, the providing step comprising prompting the user to associate each branch of the conditional flowchart element with one of the plurality of keywords,
   wherein the script involves at least one physical animated figure.

13. A method according to claim 12 and also comprising automatically running the script.

14. A verbal interaction development system providing a visual environment for developing a verbal interaction, the system comprising:
   a visual computing environment within which a user of the system can visually program a verbal interaction,
   the visual computing environment including a visual representation of at least one of a speech recognition function and a speech articulation function, the verbal interaction including at least one verbal response by at least one figure to at least verbal input analyzed with speech recognition, wherein the verbal interaction involves at least one physical animated figure.

15. A verbal interaction development system providing a visual environment for developing a verbal interaction, the system comprising:

a computing environment within which a user of the system can program a verbal interaction, the computing environment including a representation of at least one of a speech recognition function and a speech articulation function, the speech recognition function comprising:
a speech template generator operative to accept, for at least one speech input, a user's definition of a set of templates, to each of which the speech input is to be compared; and
a template recognition probability evaluator operative to evaluate the probability of correct matching of at least one speech input to each of the templates in the set, the verbal interaction including at least one verbal response by at least one figure to at least verbal input analyzed with speech recognition, wherein the verbal interaction involves at least one physical animated figure.

16. A script definition method comprising:

accepting a user's definition of a speech recognition script element including a designation of a plurality of keywords to be recognized; and providing a flowchart generation user interface operative to facilitate generation of a flowchart by a user representing a script defined by the user, the script including at least one verbal response by at least one figure to at least verbal input analyzed with speech recognition, the flowchart including a conditional flowchart element representing the speech recognition script element, the providing step comprising prompting the user to associate each branch of the conditional flowchart element with one of the plurality of keywords, wherein the script involves at least one figure wirelessly connected to a computer receiving the script.

17. A verbal interaction development system providing a visual environment for developing a verbal interaction, the system comprising:

a visual computing environment within which a user of the system can visually program a verbal interaction, the visual computing environment including a visual representation of at least one of a speech recognition function and a speech articulation function, the verbal interaction including at least one verbal response by at least one figure to at least verbal input analyzed with speech recognition, wherein the verbal interaction involves at least one figure wirelessly connected to a computer receiving the script.

18. A verbal interaction development system providing a visual environment for developing a verbal interaction, the system comprising:

a computing environment within which a user of the system can program a verbal interaction, the computing environment including a representation of at least one of a speech recognition function and a speech articulation function, the speech recognition function comprising:
a speech template generator operative to accept, for at least one speech input, a user's definition of a set of templates, to each of which the speech input is to be compared; and
a template recognition probability evaluator operative to evaluate the probability of correct matching of at least one speech input to each of the templates in the set, the verbal interaction including at least one verbal response by at least one figure to at least verbal input analyzed with speech recognition, wherein the verbal interaction involves at least one figure wirelessly connected to a computer receiving the script.

* * * * *